United States Patent [19]
Sugiura et al.

[11] Patent Number: 5,483,358
[45] Date of Patent: Jan. 9, 1996

[54] COLOR IMAGE COMMUNICATION APPARATUS AND METHOD

[75] Inventors: Susumu Sugiura, Atsugi; Yoshinobu Mita, Kawasaki; Junichi Shishizuka, Tokyo; Makoto Takaoka, Kawasaki; Yukari Shimomura, Yokohama; Kentaro Matsumoto, Higashi Kurume; Toyokazu Uda, Yokohama; Mitsumasa Sugiyama, Yokohama; Shigetada Kobayashi, Yokohama; Katsutoshi Hisada, Tokyo; Yoji Kaneko; Hiroyuki Nakanishi, both of Yokohama, all of Japan

[73] Assignee: Canon Kabushiki Kaisha, Tokyo, Japan

[21] Appl. No.: 676,117

[22] Filed: Mar. 27, 1991

[30] Foreign Application Priority Data

| Mar. 27, 1990 | [JP] | Japan | 2-80015 |
| Mar. 27, 1990 | [JP] | Japan | 2-80016 |
| Mar. 27, 1990 | [JP] | Japan | 2-80017 |

[51] Int. Cl.$^6$ .................................................. H04N 1/46
[52] U.S. Cl. ........................ 358/508; 358/539; 358/426
[58] Field of Search ................ 358/75, 79, 426, 358/427, 261.2, 262.3, 439, 434, 435, 406, 468, 488, 500, 517, 539, 530, 524, 515, 508, 504

[56] References Cited

U.S. PATENT DOCUMENTS

| 4,571,634 | 2/1986 | Caneschi et al. | 358/261.3 |
| 4,739,397 | 4/1988 | Hayashi | 358/501 |
| 4,862,254 | 8/1989 | Takada | 358/434 |
| 4,872,062 | 10/1989 | Nanba | 358/75 |
| 4,897,799 | 1/1990 | Le Gall et al. | 358/400 |
| 4,939,767 | 7/1990 | Saito et al. | 358/438 |
| 4,970,603 | 11/1990 | Kanai | 358/434 |
| 5,016,097 | 5/1991 | Shimano | 358/75 |
| 5,220,417 | 6/1993 | Sugiura | 358/508 |
| 5,276,509 | 1/1994 | Mizuno et al. | 358/500 |

Primary Examiner—Edward L. Coles, Sr.
Assistant Examiner—Fan Lee
Attorney, Agent, or Firm—Fitzpatrick, Cella, Harper & Scinto

[57] ABSTRACT

It is provided an image communication apparatus which comprises multi-level generation section for generating multi-level data from received image data, color conversion section for color-converting the multi-level data from the multi-level generation section, and setting section for setting a single color mode, in which the received image data is dealt with as single color data irrespective of the color conversion section, when it is determined by communication protocol that the communication mode is the single color mode, so as to ensure satisfactory communication even with a single color image.

27 Claims, 56 Drawing Sheets

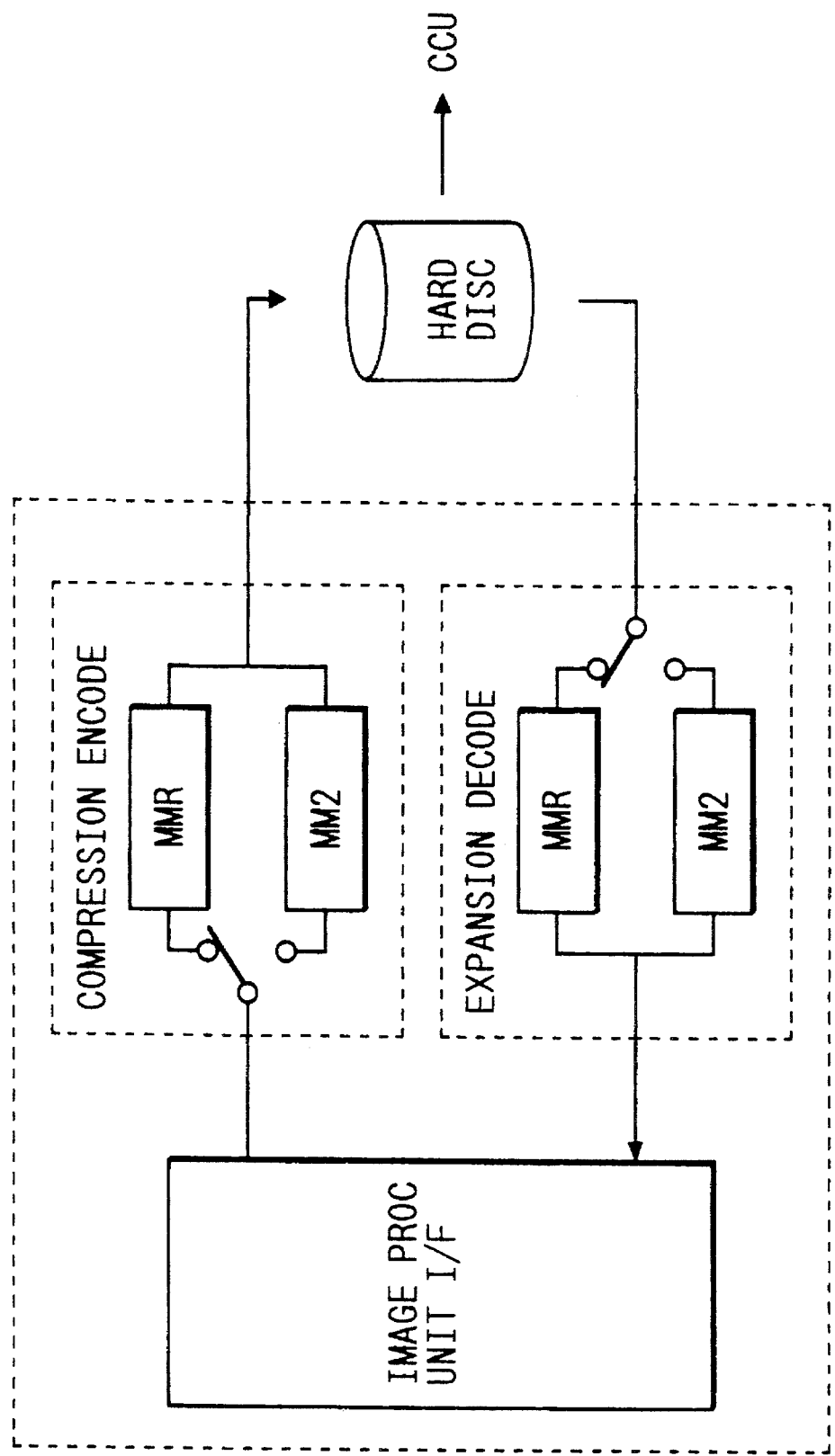

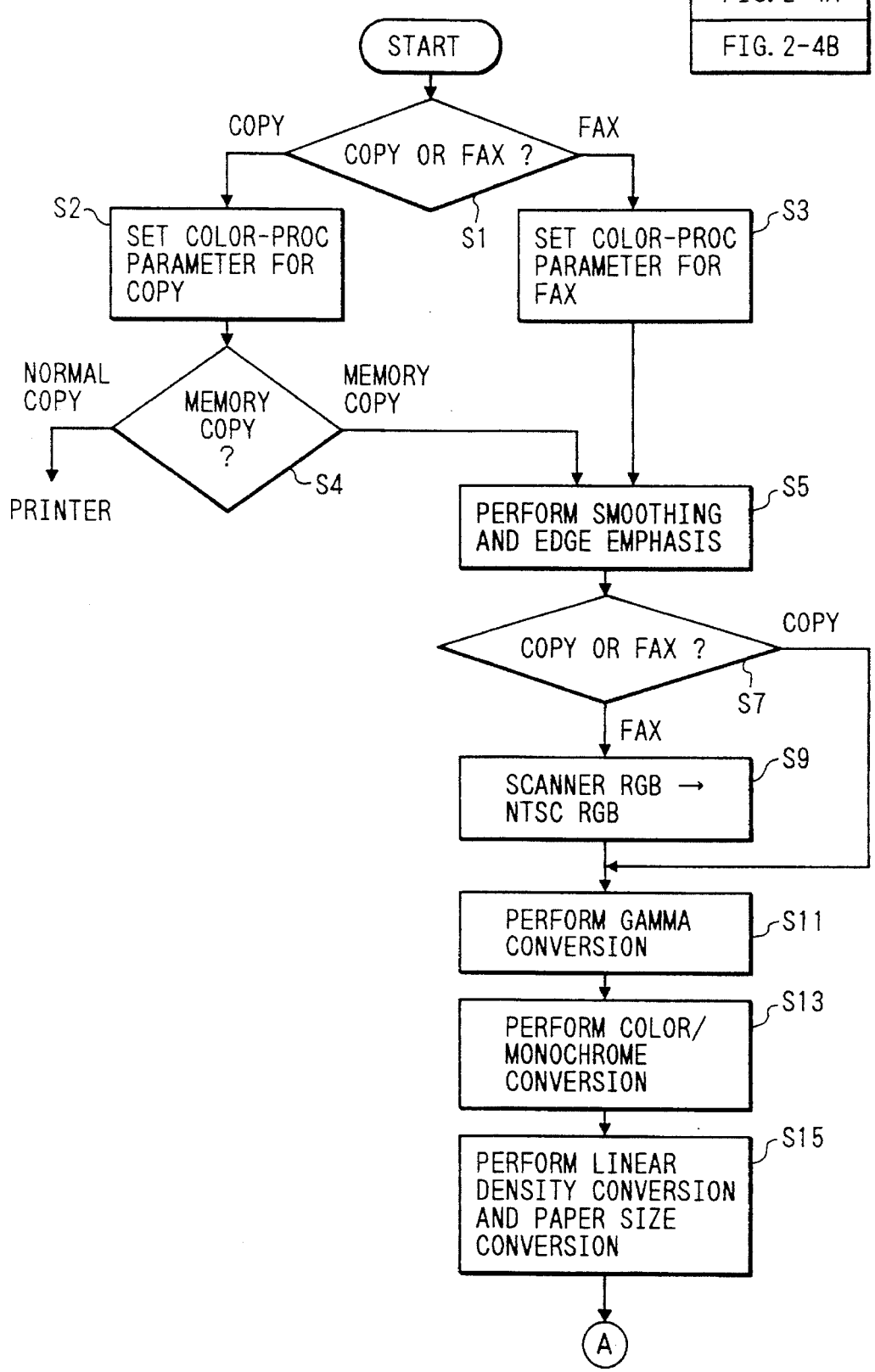

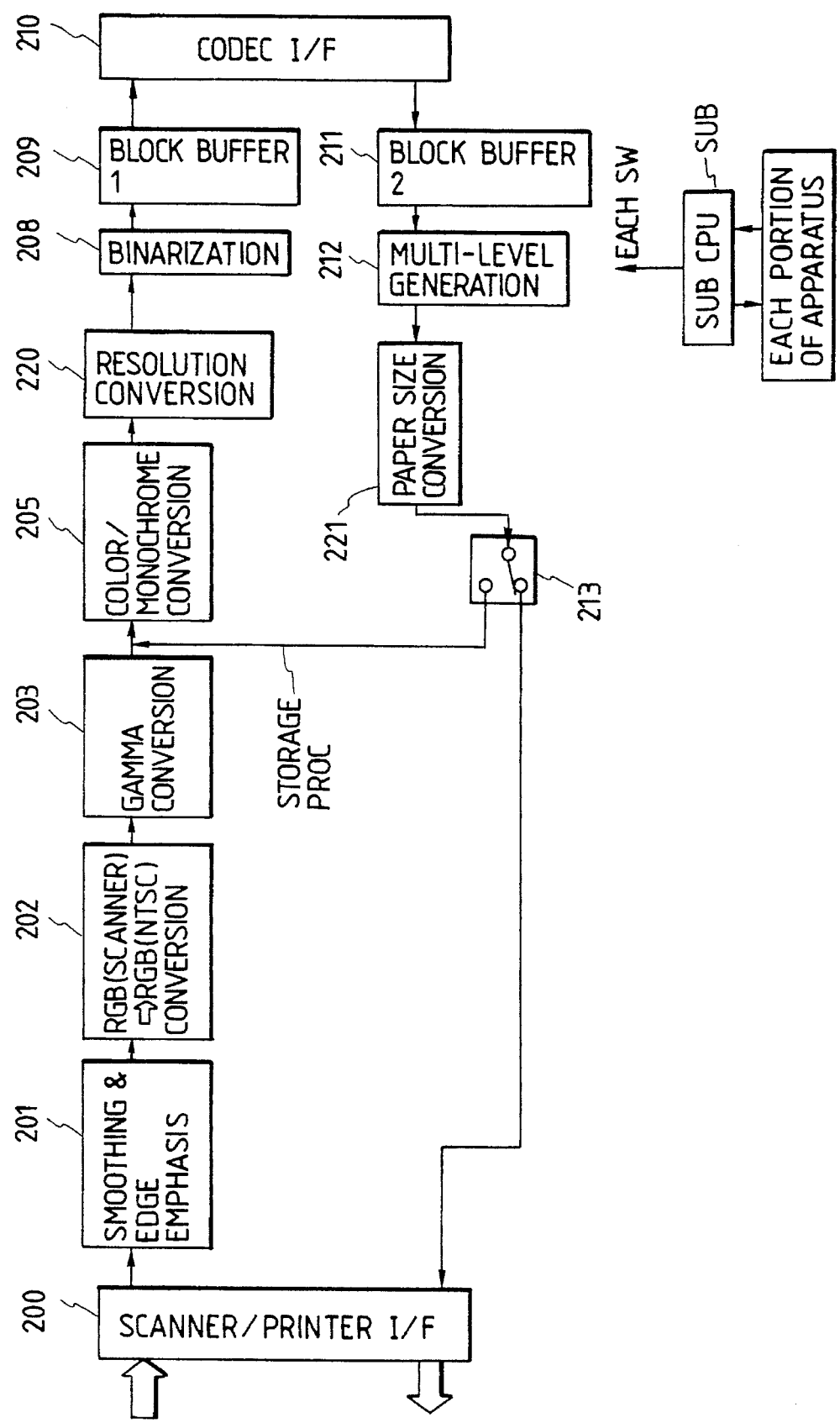

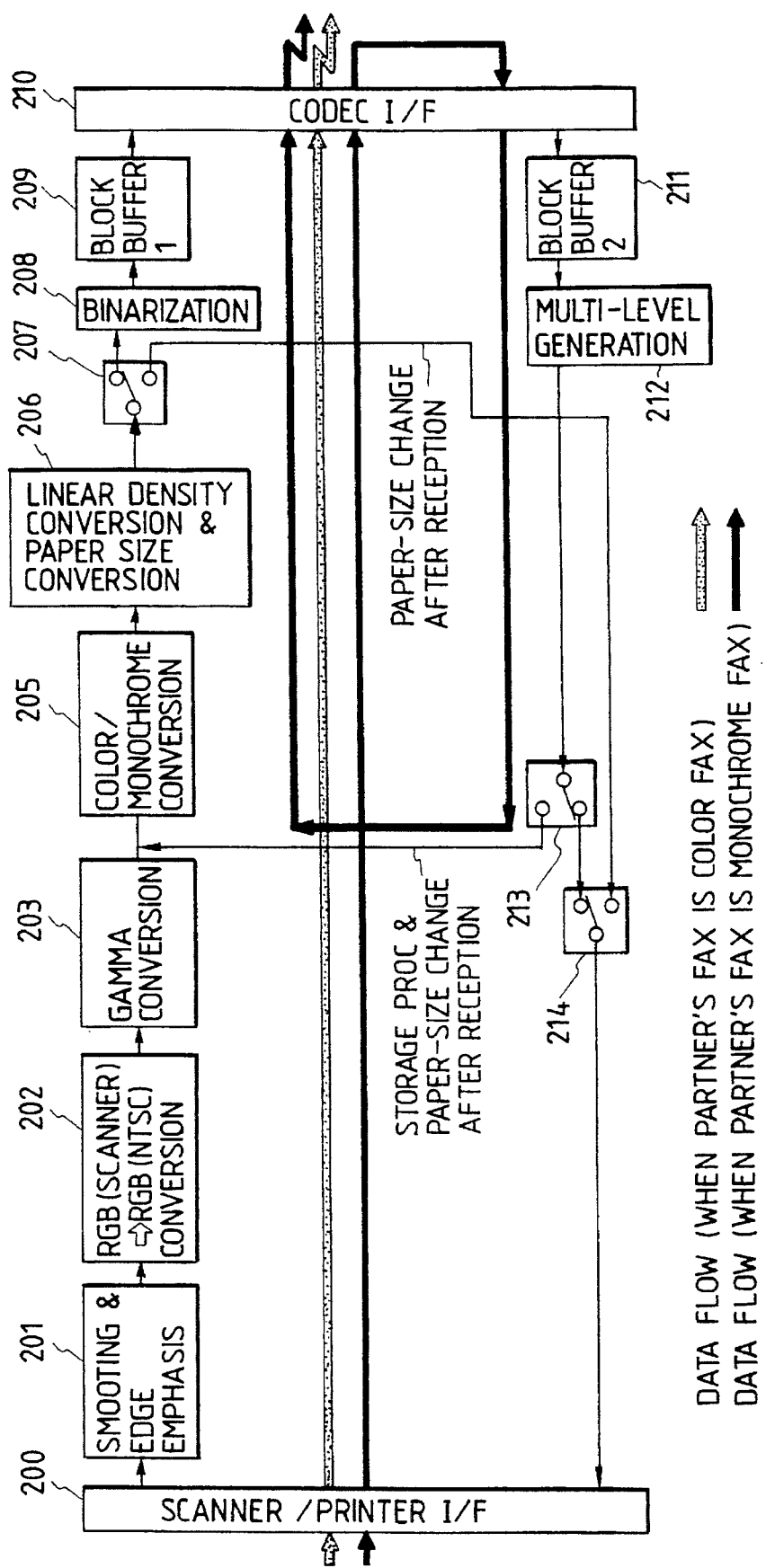

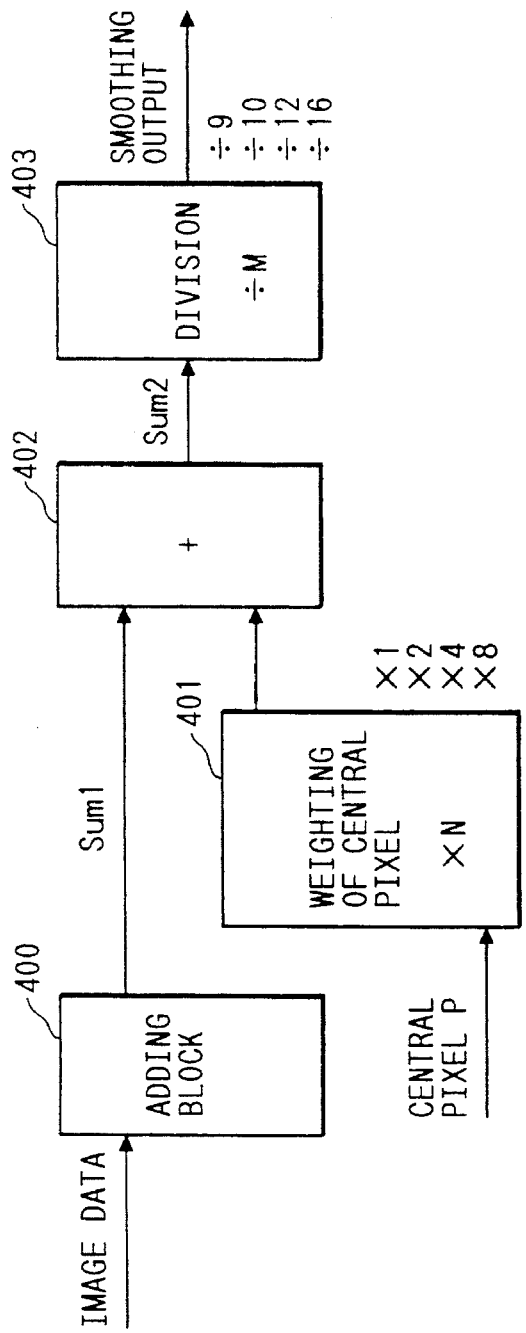

E1: PROPAGATION ERROR FROM DIRECT-PREVIOUS PIXEL
E2: PROPAGATION ERROR FROM 1-LINE PREVIOUS PIXEL
e1: PROPAGATION ERROR TO NEXT PIXEL
e2: PROPAGATION ERROR TO 1-LINE NEXT PIXEL

D: OBJECTIVE PIXEL
SHUTTLE SCAN DIRECTION
PROC DIRECTION
BJ HEAD DIRECTION

FIG. 4-7-4A
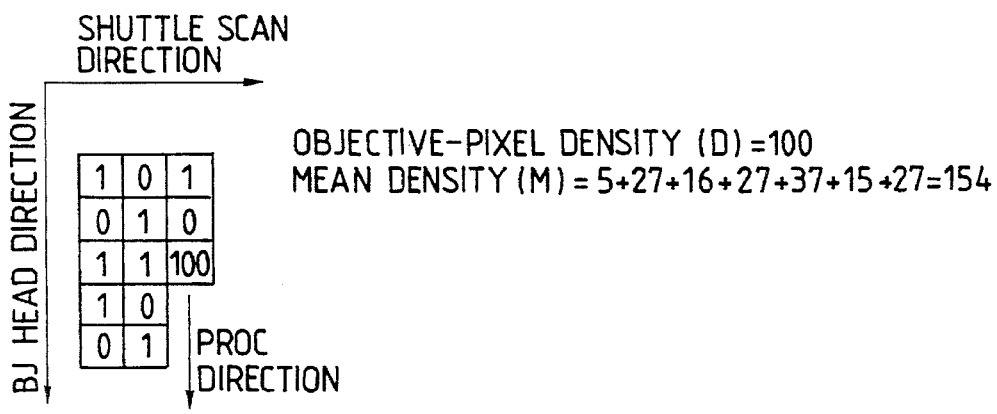
OBJECTIVE-PIXEL DENSITY (D) =100
MEAN DENSITY (M) = 5+27+16+27+37+15+27=154
FIG. 4-7-4B
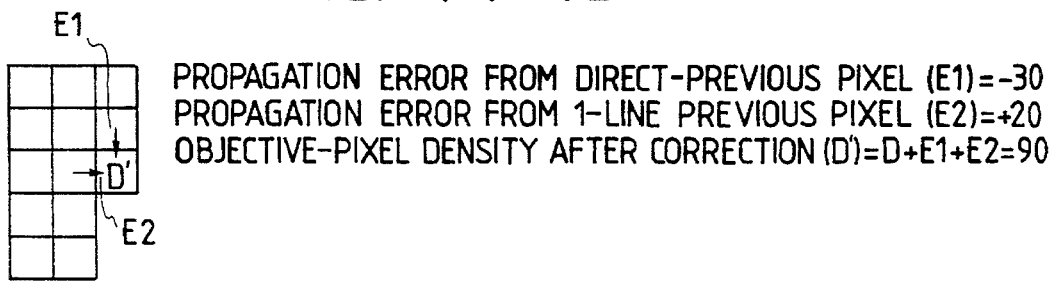
PROPAGATION ERROR FROM DIRECT-PREVIOUS PIXEL (E1)=-30
PROPAGATION ERROR FROM 1-LINE PREVIOUS PIXEL (E2)=+20
OBJECTIVE-PIXEL DENSITY AFTER CORRECTION (D')=D+E1+E2=90
FIG. 4-7-4C
D'-M = 90-154 = -64 < 0
BINARIZATION RESULT B = 0
DISPERSION ERROR e1 = e2 = -32
(ERROR DIVISION RATIO IS FIXED AS 1/2, 1/2)

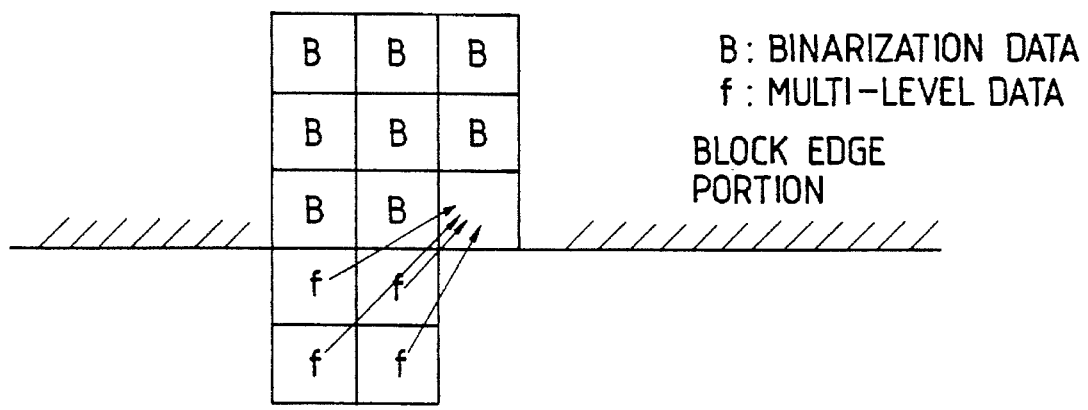

FIG. 4-7-6C
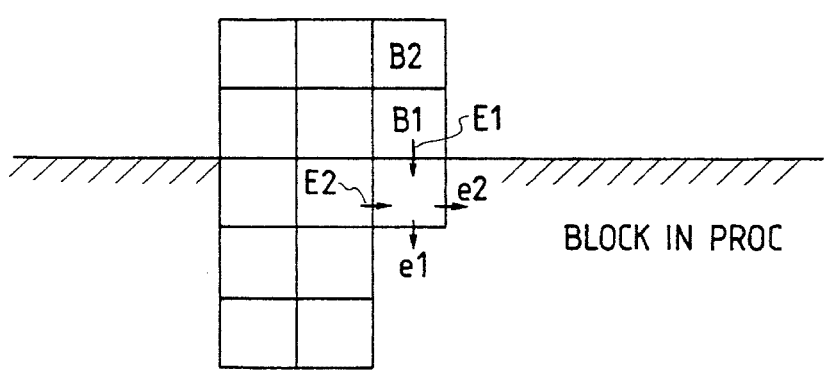
BLOCK IN PROC
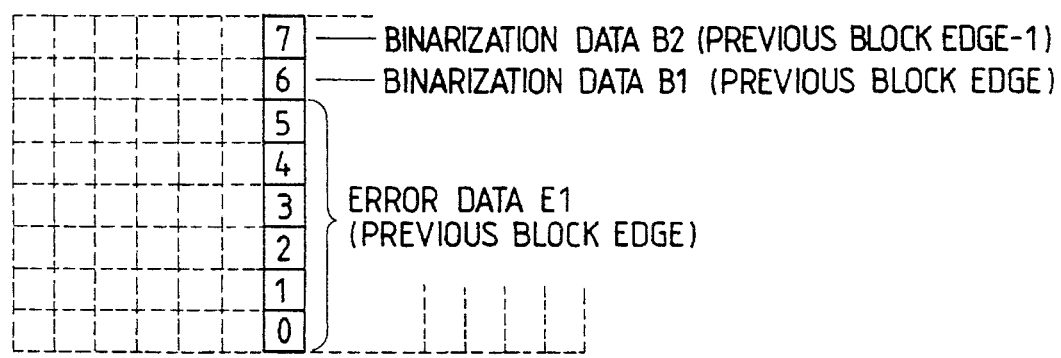
— BINARIZATION DATA B2 (PREVIOUS BLOCK EDGE-1)
— BINARIZATION DATA B1 (PREVIOUS BLOCK EDGE)
ERROR DATA E1 (PREVIOUS BLOCK EDGE)

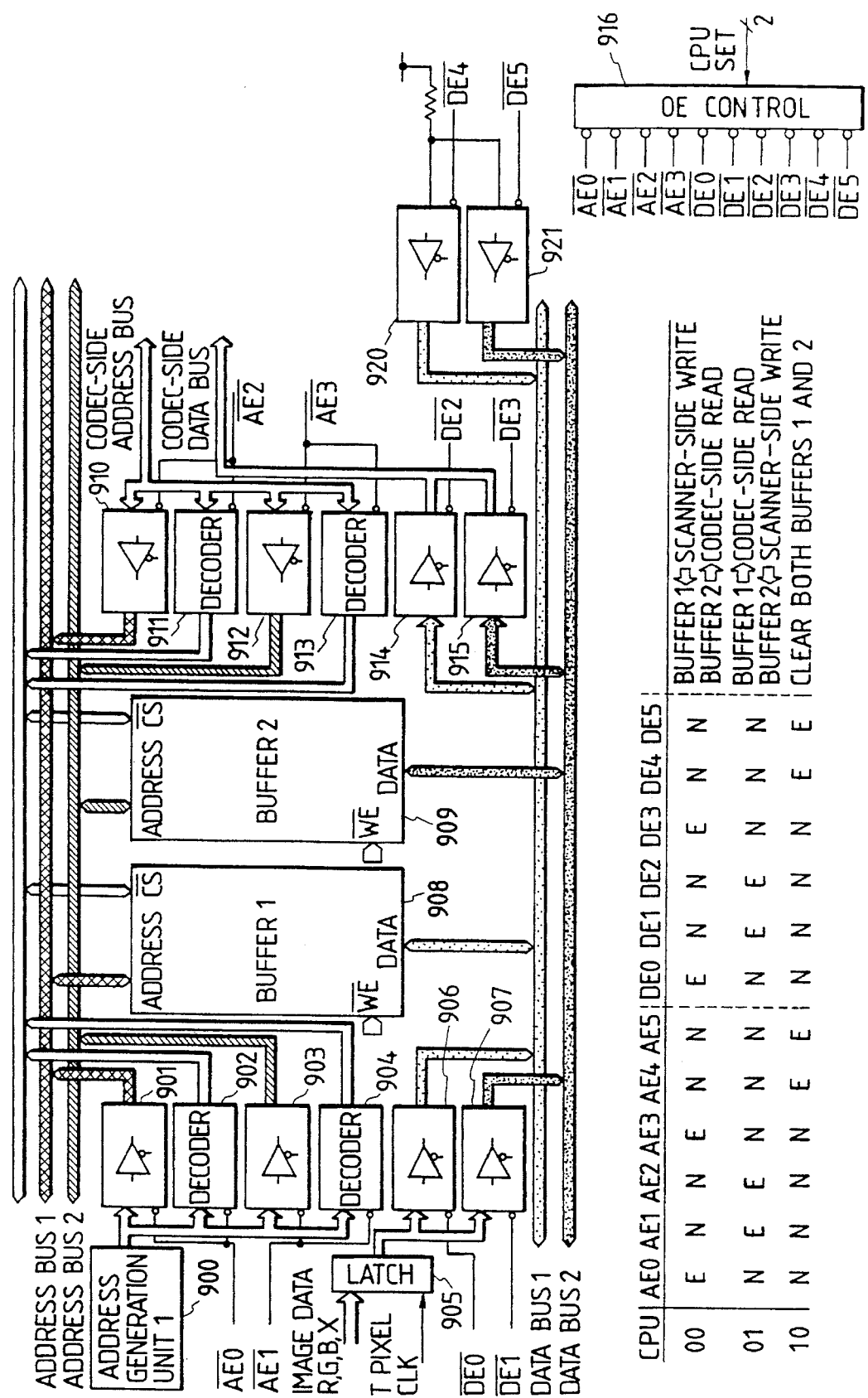

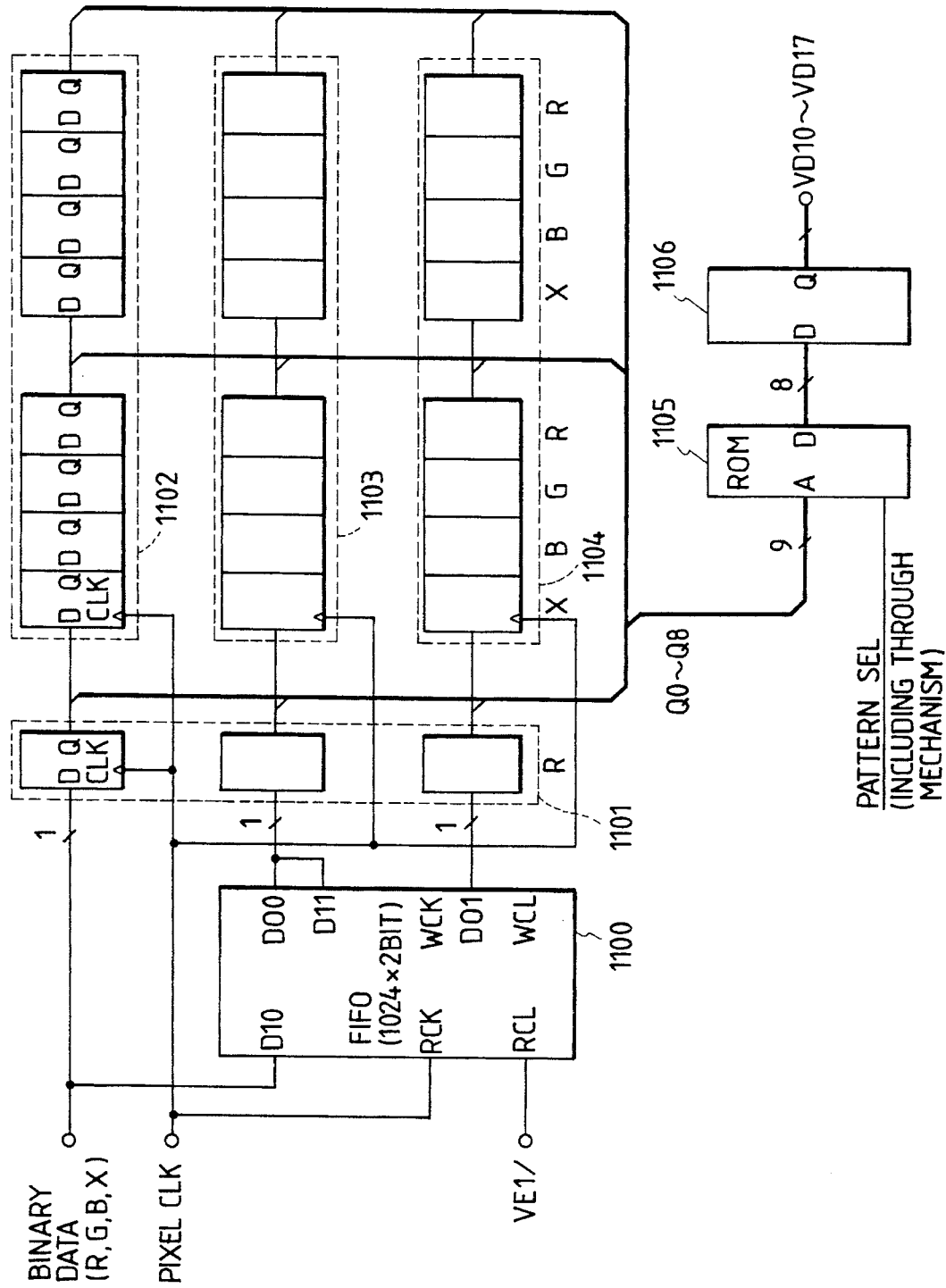

UPPER 1BIT = SIGN BIT

COLOR IMAGE COMMUNICATION APPARATUS AND METHOD

BACKGROUND OF THE INVENTION

1. Field of the Invention

This invention relates to a color image communication apparatus and method.

2. Related Background Art

Heretofore, when color data is converted to monochrome data, for instance when RGB data is converted to luminance data Y, the data length is changed, and subsequently the same processing circuit can not be used. Therefore, it is necessary to separately provide a processing circuit for color and one for monochrome.

Specifically, considering a case when 8-bit serial data for each of R, G and B flows through the circuit, while color data processing is performed in synchronism to a sync signal for every 24 bits, after conversion of data to 8-bit data Y it is necessary to effect synchronization for every 8 bits. Alternation of the circuit is also necessary.

Further, for printing received RGB data of a color image, for instance, in the prior art color image communication apparatus a color masking processing is performed with respect to color characteristics of a color printer, and printing is done after color correction.

In such case, if monochrome data expressed in transmission format YOO or YYY (Y being luminanee data here) is received instead of RGB data, perfect black can not be obtained but a color-blended image is provided after color masking processing similar to the case of a color image.

These problems occur not only in connection with the color mode and monochrome mode but also in connection with the color mode and a single color mode, in which only single color data is transmitted.

Since color data and monochrome data are compressed in different ways, it is impossible to transmit data from a color facsimile apparatus to a G4 or like monochrome facsimile apparatus, for which an advice has already been given.

Accordingly, an apparatus has been proposed, in which data compression conforming to, for instance, G4 standards is performed on color image data read out from an original when it is intended to transmit the color image from a color facsimile apparatus to a G4 receiver.

Further, it may be thought that in the case of a monochrome original image a color facsimile apparatus transmits only monochrome image data after compression in conformity to the G4 standards without transmitting color image data.

However, when the receiver is a color facsimile apparatus, it is preferable in view of data transfer efficiency to use data compression having a higher compression factor instead of the standard compression method in case of a monochrome original image as well.

SUMMARY OF THE INVENTION

An object of the invention is to provide color image communication apparatus and method which take the aspects discussed above into considerations either individually or at a time.

Another object of the invention is to provide color image communication apparatus and method which ensure satisfactory communication even with single color image.

To attain the above objects, a preferred embodiment of the invention is an image communication apparatus comprising:

multi-level generation means for generating multi-level data from received image data;

color conversion means for color converting the multi-level data from the multi-level generation means; and setting means for setting a single color mode, in which the received image data is dealt with as single color data irrespective of the color conversion means, when it is determined by communication protocol that the communication mode is the single color mode.

A Further object of the invention is to provide an apparatus, which can seal with single color data with a simple structure.

A still further object of the invention is to provide color image communication apparatus and method having improved data compression efficiency.

A yet further object of the invention is to provide color image communication apparatus and method having novel functions.

The above and other objects and features of the invention will become more apparent the following description of preferred embodiment and drawings.

BRIEF DESCRIPTION OF THE DRAWINGS

FIG. 2-1 is a view illustrating versatility of the unit with respect to a G4 facsimile;

FIG. 2-2 is a block diagram showing a color facsimile;

FIG. 2-3 is a view showing a CODEC section;

FIG. 2-4 is a flow chart illustrating a copy mode;

FIG. 3-1A is a view showing shuttle scan;

FIG. 3-1B is a view showing an image data arrangement in case of shuttle scan;

FIG. 3-1C is a view showing an image data arrangement in case of raster scan;

FIG. 3-2 is a block diagram showing a second embodiment of the image processing unit;

FIG. 3-3 is a block diagram showing a third embodiment of the image processing unit;

FIG. 3-4 is a view showing a flow outline of a function of automatic data transmission to a coesistent color/monochrome facsimile network;

FIG. 3-5 is a block diagram of color/monochrome conversion;

FIG. 3-6 is a timing chart showing color image data;

FIG. 3-7 is a view showing output data timing;

FIG. 3-8 is a view showing a flow outline of a function of automatic data transmission to a coexistent color/monochrome facsimile network;

FIG. 3-9 is a flow chart illustrating automatic color/monochrome facsimile transmission;

FIG. 3-10 is a view showing data flow in the first embodiment of the image processing unit;

FIG. 4-1-1 is a block diagram illustrating smoothing;

FIG. 4-1-2 is a view showing a smoothing matrix;

FIG. 4-1-3 is a view showing order of pixels;

FIG. 4-2-1 is a block diagram illustrating edge emphasis;

FIG. 4-2-2 is a view showing an edge detection matrix;

FIG. 4-2-3 is a view showing order of pixels;

FIG. 4-3-1 is a view showing a first example of RGB/RGB (NTSG) conversion section;

FIG. 4-3-2 is a view showing a second example of RGB/RGB (NTSC) conversion section;

FIG. 4-3-3 is a view showing a third example of RGB/RGB (NTSC) conversion section;

FIG. 4-3-4 is a view showing a fourth example of RGB/RGB (NTSG) conversion section;

FIG. 4-4-1 is a view showing a first example of gamma conversion table (with a ROM structure);

FIG. 4-5-1 is a view showing a second example of gamma conversion table (with a RAM structure);

FIG. 4-6-1 is a view illustrating first order linear interpolation;

FIG. 4-6-2 is a view illustrating second order linear interpolation;

FIG. 4-6-3 is a view illustrating calculation position and edge in linear interpolation;

FIG. 4-6-4 is a block diagram illustrating a linear interpolation processing;

FIG. 4-6-5 is a view showing a relation of input/output image clocks;

FIG. 4-6-6 is a view showing an example of interpolation pixel calculation circuit;

FIG. 4-6-7 is a view showing relation of input and output pixel clocks;

FIG. 4-7-1 is a view showing a mean density preservation argorithm;

FIG. 4-7-2 is a view showing weighting factors;

FIG. 4-7-3 is a view illustrating error propagation;

FIG. 4-7-4A is a view illustrating weighting;

FIG. 4-7-4B is a view showing correction of objective pixel;

FIG. 4-7-4C is a view illustrating binarization and error division;

FIG. 4-7-5A is a view illustrating rear connection processing;

FIG. 4-7-5B is a view showing rear connection weighting factors;

FIG. 4-7-6A is a view showing entire structure of binarization processing unit;

FIG. 4-7-6B is a view illustrating line delay processing;

FIG. 4-7-6C is a view showing a connection memory processing bit structure;

FIG. 4-7-7 is a view showing internal processing block and main data flow;

FIGS. 4-7-8A to 4-7-8C are views illustrating operations with objective pixel at different positions in block;

FIG. 4-8-1 is a view showing a double buffer structure;

FIG. 4-8-2 is a view showing relation between operating direction and address;

FIG. 4-8-3 is a view showing Structure example 1 of block buffer 1;

FIG. 4-8-4 is a view showing a structure example of address generation unit 1;

FIG. 4-8-5 is a view showing Structure example 2 of block buffer 1;

FIG. 4-8-6 is a view showing Structure example 3 of block buffer 1;

FIG. 4-8-7 is a view showing a structure of address generation unit 2;

FIG. 4-8-8 is a view showing Structure example 4 of block buffer 1;

FIG. 4-8-9 is a view showing a structure example of color/monochrome selection circuit (517 in FIG. 4-8-8);

FIG. 4-9-1 is a view showing block buffer 2;

FIG. 4-9-2 is a view showing a structure example of block buffer 2;

FIG. 4-10-1 is a view showing first example of multi-level generation unit;

FIG. 4-10-2 is a view showing an example of filter factors;

FIG. 4-10-3 is a view showing a case provided with serial/parallel and parallel/serial conversions;

FIG. 4-10-4 is a view showing an example constituted by RAMs;

FIG. 4-10-5 is a view showing a 5-by-5, i.e., 25, pixel shift portion;

FIG. 4-10-6 is a view showing a product portion;

FIG. 4-10-7 is a view showing a sum portion;

FIG. 4-10-8 is a view showing an example of filter factors;

FIG. 4-10-9 is a view showing a structure with three LUTs;

FIG. 4-11-1 is a view showing an example of color/monochrome judgement unit;

FIG. 4-11-2 is a view showing a subtraction unit;

FIG. 4-11-3A is a view showing absolute value circuit 1:

FIG. 4-11-3B is a view showing absolute value circuit 2;

FIG. 4-11-4 is a view a second example of color/monochrome judgement unit;

FIG. 4-12-1 is a view showing an example of printer unit; and

FIG. 4-12-2 is a view showing an example of black generation unit.

DETAILED DESCRIPTION OF THE PREFERRED EMBODIMENTS

Figure 1:
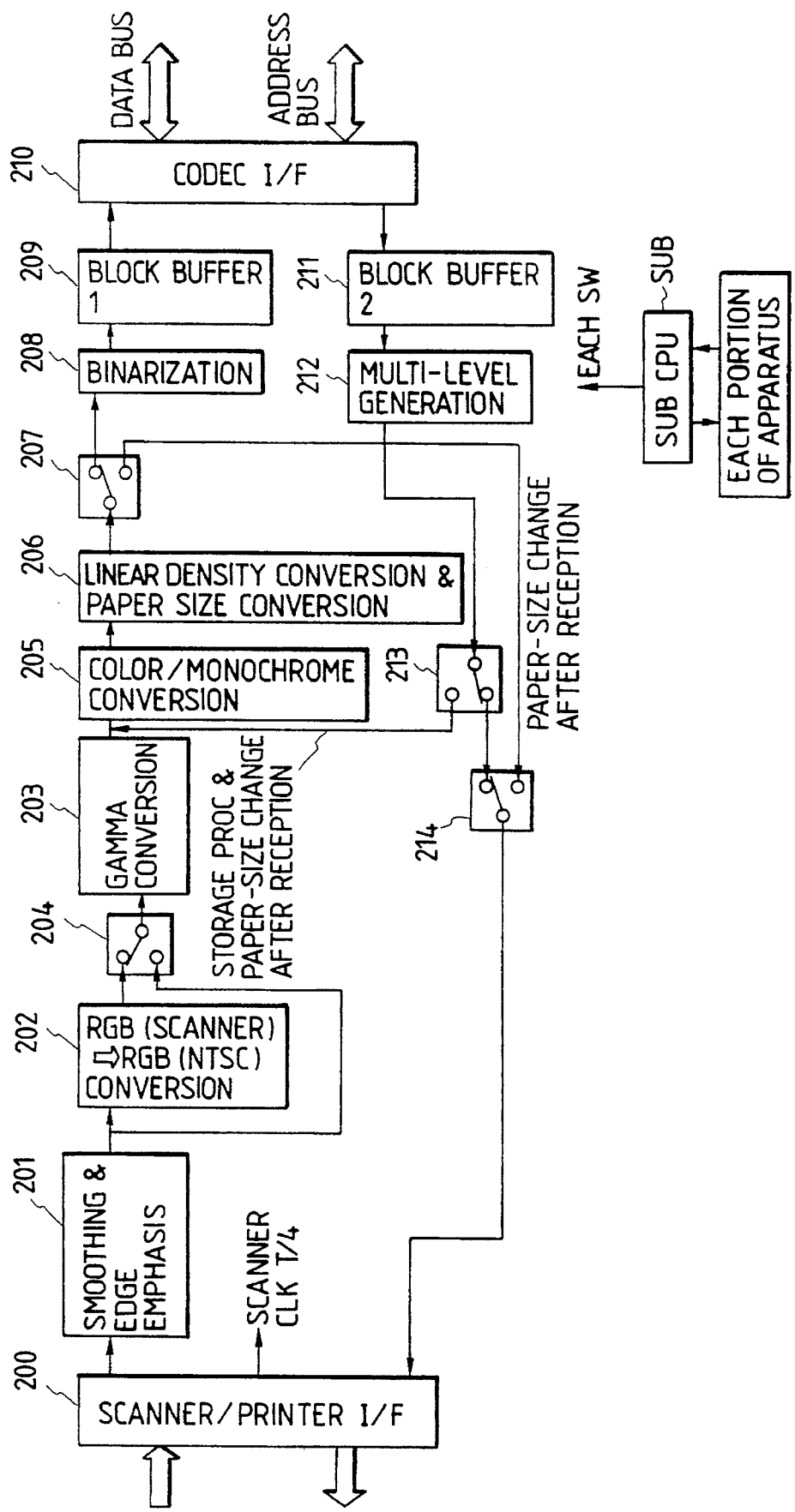
FIG. 1 is a block diagram showing a first embodiment of in image processing unit.
Figures 1, 2:
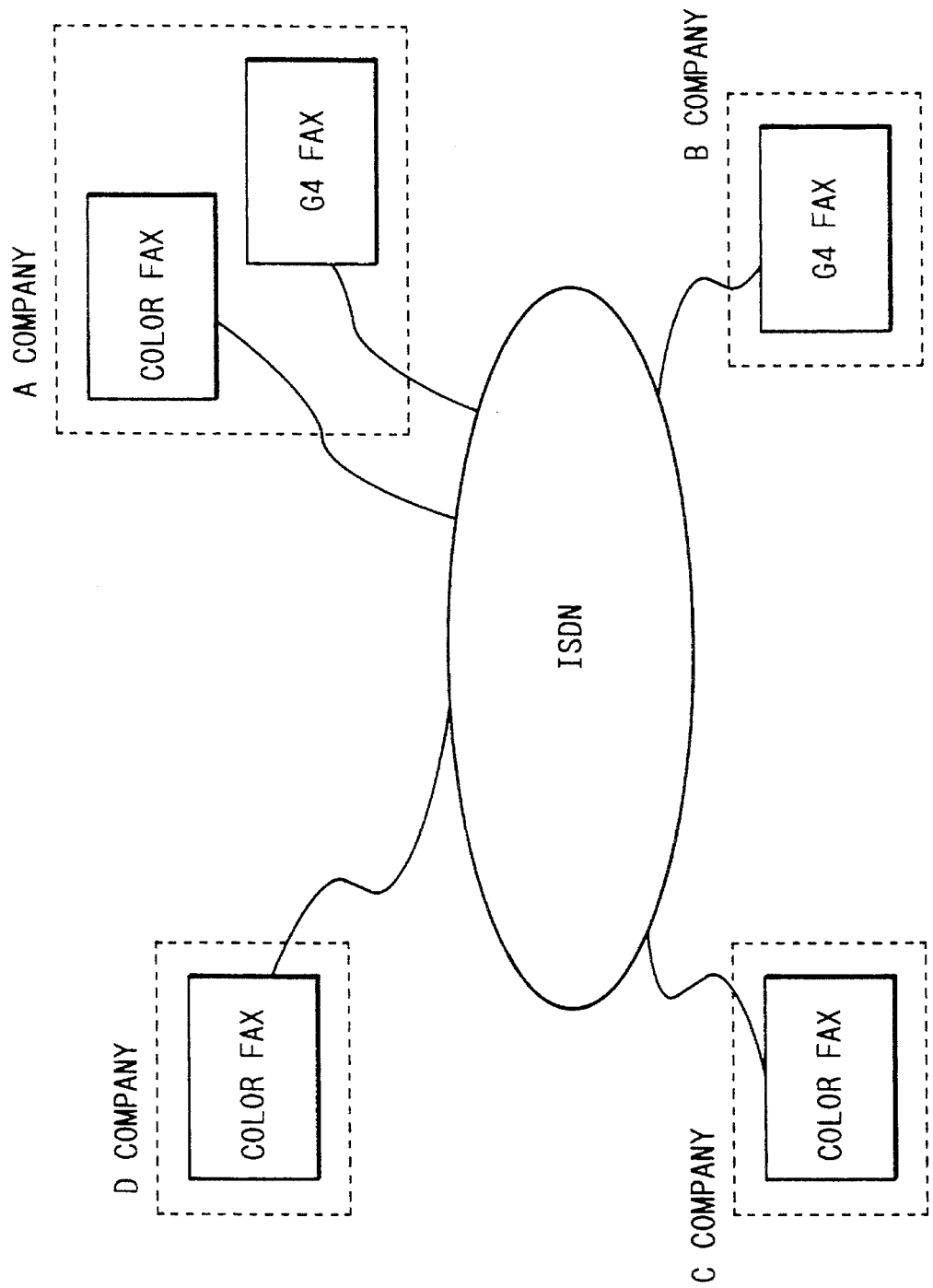
Figure 2:
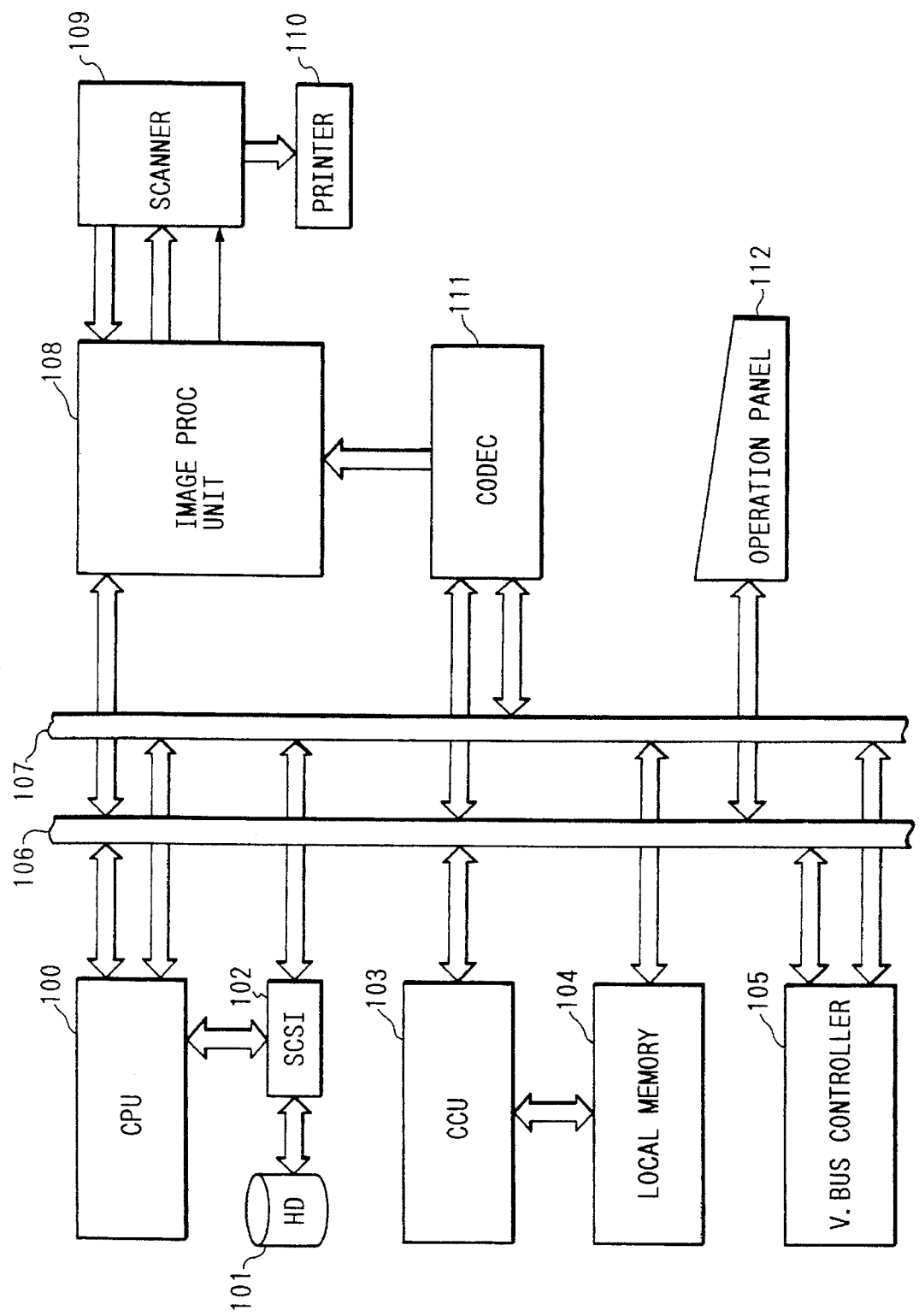

FIG. 2-1 shows color facsimile units embodying the invention in use. Each unit is connected to ISDN and is capable of communication with a G4 facsimile unit as well as another color facsimile unit as partner. To this end, the unit has a construction such that with respect to the G4 facsimile unit it can transmit and receive maximum A4 size, 400 dpi monochrome original by utilizing MMR compression encoding while in communication with the color facsimile unit it can transmit and receive maximum A3 size 400 dpi color image.

Referring to FIG. 2-1, an original can be transmitted simultaneously from A company to B, C and D companies either by utilizing G4 facsimile unit or by utilizing G4 protocol in color facsimile unit. However, C and D companies of course utilize G4 protocol for reception. Further, when A company transmits color image, the partner should be a color facsimile unit. That is, color image cannot be transmitted to B company, and it requires G4 protocol for transmission. The color facsimile protocol of this embodiment also has a function of monochrome image transmission.

FIG. 2-2 is a block diagram showing the overall color facsimile construction.

Designated at 100 is a CPU for controlling the apparatus as a whole, and at 101 is a hard disk for storing reception or transmission image once with SCSI as interface. Designated at 102 is a hard disk controller for issuing SCSI commands to hard disk 101 under control of commands from CPU 100. Designated at 103 is a communication control unit for undertaking protocol control for connection to external communication lines, at 104 is a local memory, at 105 is a V.BUS controller, at 106 is a main bus, and at 107 is an image bus. Designated at 108 is an image processing unit for processing reception/transmission image to produce a result conforming to own scanner/printer. Designated at 109 is a scanner, which reads image and transfers the same as 8-bit data for each of R, G and B (hereinafter referred to as multi-level image data) to image processing unit 108. The scanner can also conversely perform color processing, binarization, etc. of multi-level image data from the image processing unit and provides the obtained binary image data to printer 110. Further, it can perform a copy operation binarizing image read by itself and providing the resultant binary data to the printer. Designated at 111 is a CODEC, the interface formula of which for image data with respect to image processing unit 108 is one-bit data for each of R, G and B (hereinafter referred to as binary image data). Designated at 112 is an operation panel.

Figures 2, 3, 4, 4B:
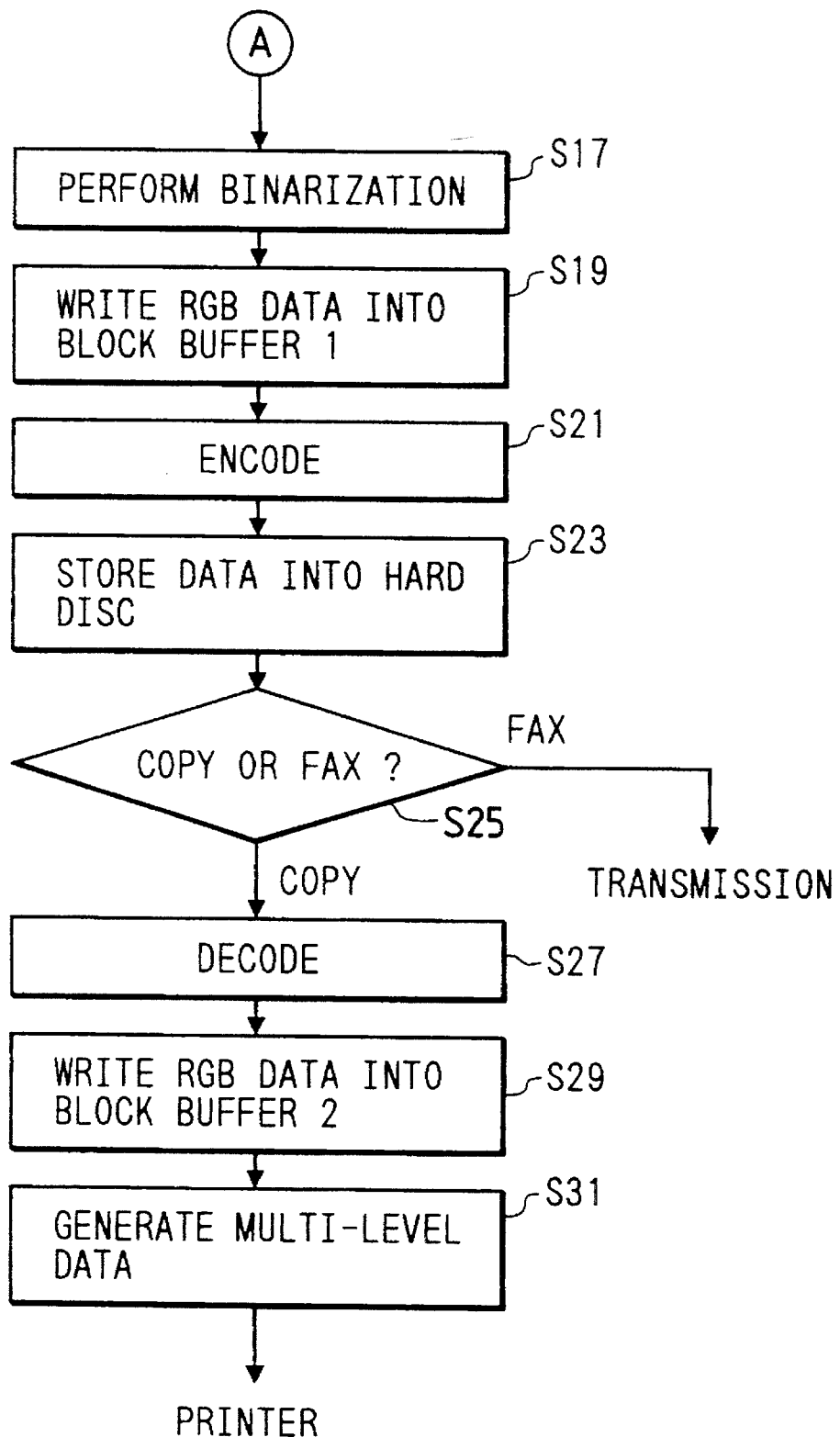

CODEC 111 has an internal construction as shown enclosed in dashed rectangle in FIG. 2-3. MMR for G4 facsimile and MM2 for color facsimile are selectively operable for compression encoding and expansion decoding.

A brief description of operation will now be given for copying, tansmission and reception.

(1) Copying operation (normal copy)

In copying operation, when when an A4 size original is set on an original base of scanner 109 and a copy start instruction is given from operation panel 112, CPU 100 receives the copyy start signal and gives a copy start instruction to a sub-CPU (not shown) provided in image processing unit 108. When it receives a copy start signal, the sub-CPU in image processing unit 108 supplies a copy start command to the scanner and printer. In addition, a masking parameter in a color processing circuit provided in the scanner is set for copy. Multi-level data read out by the scanner is converted by scan-by-scan conversion in a color processing/binalizing circuit in the scanner to a color matched to the characters of the printer and supplied after binalization to printer 110 for ink jet recording.

(2) Transmitting operation

In transmitting operation, a maximum A3 size original is set on the original base of scanner 109, and setting of the destination partner, selection of monochrome/color and designation of the resolution are effected from operation panel 112. The setting of the destination as effected by operation panel 112 is read out by CPU 100 and set in CCU 103. The selection of monochrome/color and designation of the resolution, also read out by CPU 100, are set in registers (not shown) provided in image processing circuit 108. When a transmission start instructon is subsequently provided from operation panel 112, this signal is received by CPU 100, and masking parameter in the color processing circuit in the scanner is set for facsimile. Also, a transmission start instruction is given to the sub-CPU in image processing unit 108. When it receives the transmission start singal, the sub-CPU in image processing unit 108 supplies a read start command to the scanner. Multi-level data obtained from the scanner is 8-bit data for each of the three colors read out by respective R, G and B filters in the scanner. These data are read out in a scanning system which is different from commonly termed raster scan. In image processing unit 108, the R, G and B data of the scanner itself are converted to NTSC standard R, G and B data. In addition, if there is an instruction for monochrome transmission, data read out in color is converted to monochrome. Then, the data is binarized and converted to raster scan form to be supplied as binary image data to CODEC 111. In the CODEC, compression encoding is performed to reduce the quantity of transmission data. The system of compression encoding is different depending on whether the partner is color facsimile or G4 Facsimile. More specifically, the compression encoding is performed in MM2 in caser of a color facsimile partner, while it is performed in MMR in case of a G4 facsimile partner. The result of compression encoding is supplied through image bus 107 and hard disk controller 102 to hard disk 101 for tentative storage therein. If an original consists of a plurality of sheets, it is exchanged by an ADF (Auto Document Feeder) to read the entire original, and read-out image data is stored in the hard disk. Then, CCU 103 connects a line to the destination partner under control of a command from CPU 100, and information exchange concerning mutual processing functions is executed. Then the image data is transmitted. At this time, if the partner can not cope with or execute corresponding processings regarding the selection of color/monochrome and setting of resulution, paper size, etc. as instructed from the operation panel in advance, the CODEC decodes the image data once stored in the hard disk and supplies this data as binary image data to image processing unit 108. Image processing unit 108 recovers multi-level image data from the binary image data and processes the recovered data in conformity partner's functions concerning color/monochrome, resolution, paper size, etc. Then it binarizes the data for supply to CODEC 111. CODEC 111 then peforms compression encoding of data once again. The encoded data is stored in the hard disk to be sent out from CCU 103 to external line.

(3) Receiving operation

In receiving operation, CCU 103 effects line connection in response to a line connection request from a source partner and gives a reception start message to CPU 100. CPU 100 receiving the reception start signal provides a reception start signal to the CODEC and image processing unit. Also, it sets masking parameter in the color processing circuit in the scanner for facimile. When line connection is done, information exchange concerning mutual processing functions and so forth is executed, and image compression encoding system used for communication, paper size and resolution are determined. The compression encoding system is set in a register in the CODEC, while the paper size and resolution are set in registers in the image processing unit. Image data received by CCU 103 is supplied from local memory 104 through image bus 107 to CODEC 111. The CODEC selects either color facsimile decoding or G4 facsimile decoding according to the value in the register noted above and decodes image data to binary image data to be supplied to image processing unit 108. The image processing unit converts image of the raster scan form to a form conforming to printer 110, then decodes binary image data to 8-bit multi-level image data for each of R, G and B, then executes resolution conversion and paper size conversion, if necessary, and supplies the resultant data as multi-level image data to scanner 109. The scanner performs color processing and binarization in conformity to recording characteristics of the printer. The binary data thus obtained is supplied to printer 110 for ink jet recording.

Now, image processing unit 108 will be described in detail.

Prior to description of the operation, two different image scan formats which are dealt with in the image processing unit will be described.

Shattle Scan Format

Figures 1A, 3:
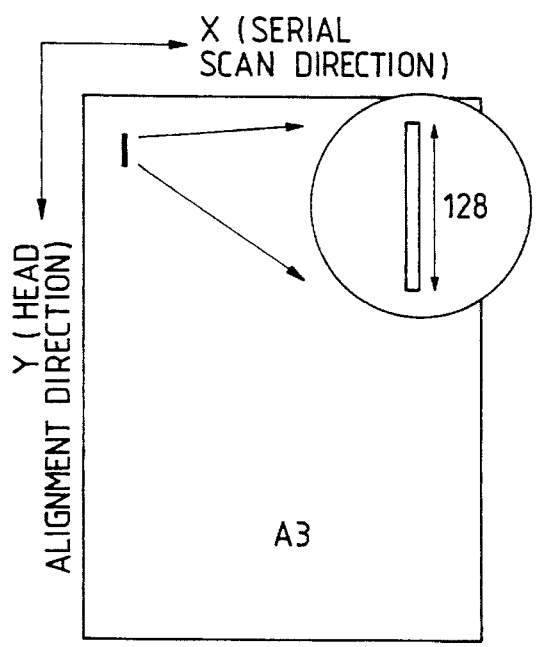
Figures 1B, 3:
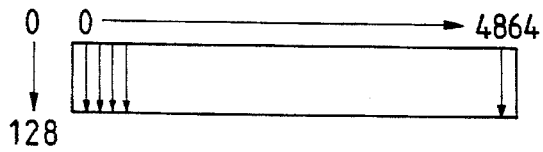

In the present scanner and printer, image is scanned by serial scan for every 128 pixels, as shown in FIG. 3-1A. Heads of the scanner or printer are arranged for 128 pixels in directon Y in FIG. 3-1A and are scanned in direction X. The image transfer starts with an upper left pixel on A3 paper as shown in FIG. 3-1B, and 128 pixels are fed in the direction of the head arrangement. Then, 128 pixels at a position one pixel after the previous position in the shuttle scan direction are fed. Likewise, the 128-pixel feed is repeatedly performed up to the right end of paper (i.e., 4,864 times in case of A3 paper).

Raster Scan Format

Figures 1C, 3:
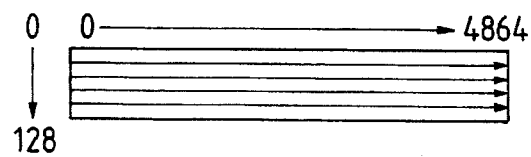
Figure 3:
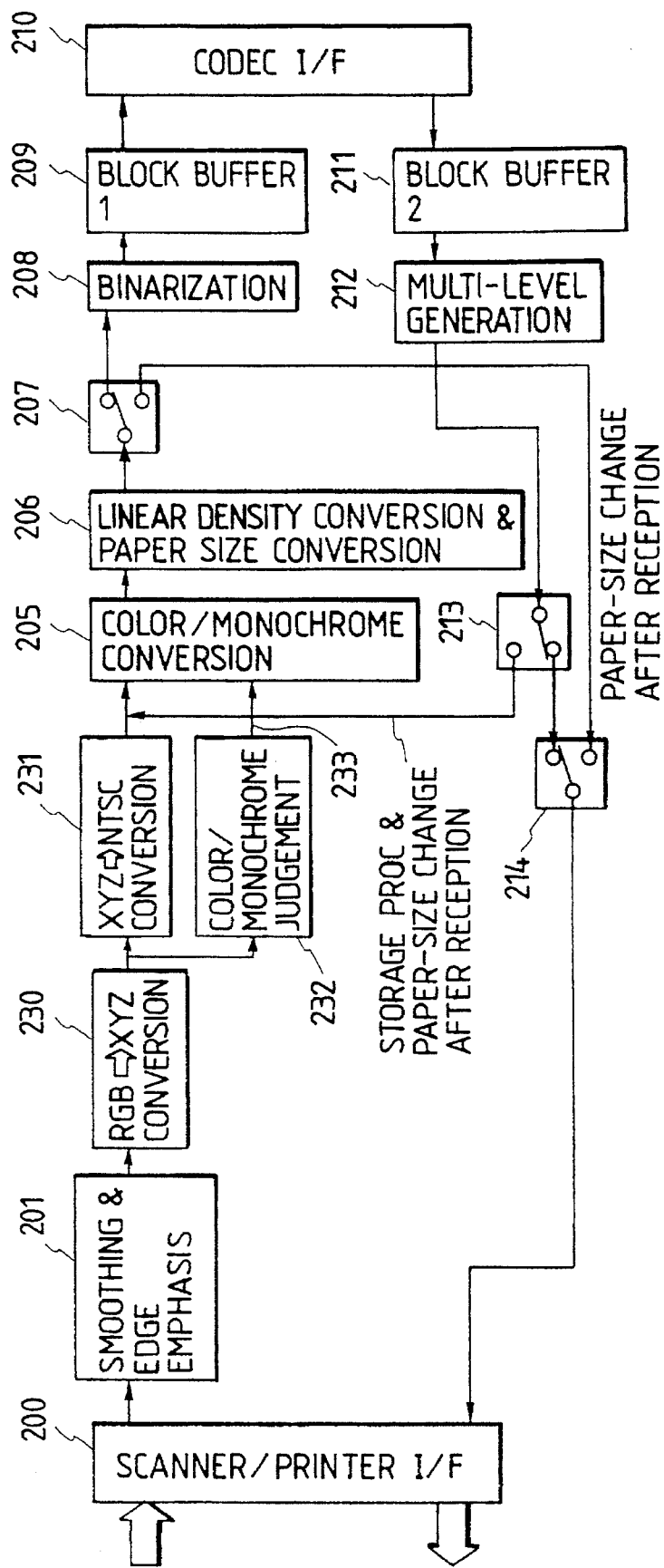
Figures 3, 4:
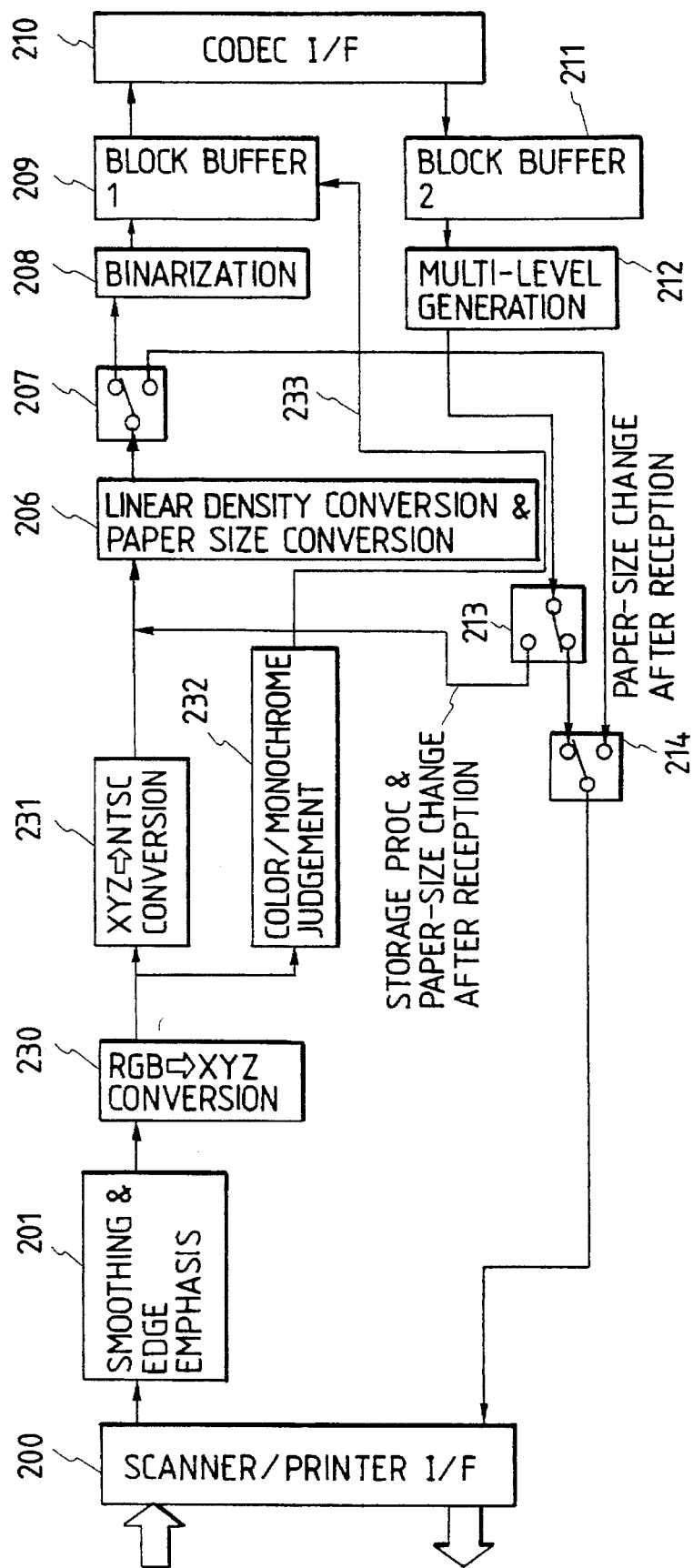

The raster scan has a form of line-by-line feed in the transversal direction from the head of paper. This is shown in FIG. 3-1C.

First Embodiment

FIG. 1 is a block diagram showing a first embodiment of the image processing unit.

Designated at 200 is a scanner/printer interface, which deals with input and output of 8-bit multi-level image data for each of R, G and B and also with operation commands and status with respect to the scanner and printer.

Designated at 201 is a smoothing and edge emphasis section. The degrees of smoothing and edge emphasis can be set from an image processing unit CPU (not shown).

Designated at 202 is a conversion section for converting R, G and B data obtained from the scanner to NTSC standard R, G and B data. Through this conversion, NTSC standard R, G and B data are obtained from color data from the scanner. Equations for this conversion can not be readily theoretically obtained for the input R, G and B data are peculiar to the scanner. Empirically, however, following equations (3-1) can be obtained for relating R, G and B data from the scanner to NTSC standard R, G and B data.

$$R_{NTSC}=a11 \times R_{scanner}+a12 \times G_{scanner}+a13 \times B_{scanner}$$

$$G_{NTSC}=a21 \times R_{scanner}+a22 \times G_{scanner}+a23 \times B_{scanner} \quad (3\text{-}1)$$

$$B_{NTSC}=a31 \times R_{scanner}+a32 \times G_{scanner}+a33 \times B_{scanner}$$

Equations (3-1) are of the first degree, but it is possible to obtain equations of the second or third degree as well.

Designated at 203 is a gamma conversion section, and at 205 is a color/monochrome conversion section for producing monochrome data from NTSC standard R, G and B data. For this conversion, a relation $$E_y=0.30R+0.59G \text{ and } 0.11B \quad (3\text{-}2)$$

which is determined for NTSC may be used to produce luminance signal from NTSC color television signal. Alternatively, since the luminance signal component has great influence of G, it may be thought to use the sole G signal as monochrome data. Although not shown, the image processing unit can pass image without color/monochrome conversion.

Designated at 206 is a linear density conversion and paper size conversion section for performing linear density conversion in case of transmission with 200 or 100 dpi of data read out with 400 dpi by the scanner and also paper size conversion in case of transmitting A4 original image in A3 size. For linear density conversion, it may be thought to have resort to partial passing of pixels, repetition, linear interpolation, projection, etc. Although not shown in the Figure, it is passible to pass image without linear density conversion.

Designated at 207 is a switch for supplying image data from the linear density conversion and paper size conversion section either to binarization section 208 or through switch 213 to the scanner/printer interface.

Designated at 208 is a binarization section for converting 8-bit data for each of R, G and B to one-bit binary data for each color. For binarization may be used pure binarization based on a fixed threshold value, dither process, error diffusion process, average density preservation process, etc.

Designated at 209 is a block buffer for tentatively storing a predetermined quantity of binary image data. This block buffer can convert data obtained by reading with scanning peculiar to the scanner or printer to commonly termed raster scan system data by a method of generation of address of its component buffer memory.

Designated at 210 is a CODEC interface with respect to binary data CODEC.

Designated at 211 is a block buffer, which can tentatively store raster scan system binary data from CODEC and change the scanning direction by a buffer memory address generation method similar to that of block buffer 209.

Designated at 212 is a multi-level generation section for converting binary image data of R, G and B to 8-bit data for each color.

Designated at 213 is a switch for supplying multi-level data either through scanner/printer interface 200 to the printer or to color/monochrome conversion section 205.

Designated at 214 is a switch for selecting image data supplied to the scanner/printer interface in an interlocked relation to switches 207 and 213.

Operation of the First Embodiment

Operation of the first embodiment will be described with reference to FIG. 1.

There are numerous operation patterns corresponding in number to the product of multiplification of available paper size number, resolution numbr, color/monochrome, etc. by one another. Therefore, all these patterns can not be described, and only the following six patterns are taken.

Pattern 1, in which A3 size original is read out with color 400 dpi, then compressed and tentatively stored in hard disk and then supplied without changing the resolution and paper size Pattern 2, in which A3 size original is read out with color 400 dpi, then compressed and then converted to A4 size 200 dpi monochrome data while being stored in hard disk before being supplied Pattern 3, in which A3 size original is read out with color 400 dpi, then is stored once in hard disk HD shown in FIG. 2-2 and then resolution converted to 200 dpi for being supplied Pattern 4, in which image received with A4 size and 400 dpi is directly supplied to the printer Pattern 5, in which image received with A4 size and 200 dpi is resolution converted to 400 dpi before being supplied to the printer, for instance Pattern 6, in which image received with A4 size and 400 dpi is paper size converted to A4

Pattern 7, in which A3 size original is copied

Pattern 8, in which A3 size original is memory copied

Now, each pattern of operation will be described.

Pattern 1: in which A3 size original is read out with color 400 dpi, then compressed and tentatively stored in hard disk and then transmitted without changing the resolution and paper size This pattern is possible in case when both source and destination can deal with A3 size 4000 dp color image. The operation in this case will be described.

In the flow chart of FIG. 2-4, in check step S1 the routine flow branches to the facsimile side, and in step S3 a masking parameter of the color processing circuit in the scanner is set for facsimile. As for the flow of data at this time, when setting an original, the user checks whether a major portion of the original is a photograph portion or a character portion. Depending on the result of the check, the user selects either photograph original or character original on the operation panel. If it is desired to change the density for transmission, density setting is done on the operation panel. The results of these operations are reflected on smoothing and edge emphasis section 201 and gamma conversion section 203, and corresponding smoothing degree, edge emphasis degreee and gamma table are selected. For example, in case of a photograph original the smoothing degree is increased, while in case of a character original the edge emphasis degree is increased. Switch 207 is set to the side of the binarization section.

8-bit image data for each of R, G and B of the scanner, which is provided in the shuttle scan form from scanner/printer interface 200 is subjected to smoothing and edge emphasis as set in smoothing and edge empohasis section 201 (step S5), and converted to NTSC standard R, G and B in RGB (scanner) to RGB (NTSC) conversion section 202 (step S9).

Subsequently, gamma conversion section 203 provides output data which is preset with respect to input data. This conversion may be for density correction according to user's setting as noted above or correction of a table for skipping the background of an original having a thin background color or deterioration of the light source.

Operation in color/monochrome conversion section 205 (step S13) and operation in linear density conversion and paper size conversion section 206 (step S15) are unnecessary in this case and hence are not executed. Thus, the output of section 206 is the same in quantity as NTSC standard R, G and B data after smoothing and edge emphasis when the original is read with 400 dpi.

The data supplied through switch 207 to binarization section 208 is then binarized (step S17) for reducing the data quantity. The binarization here is performed for reproducing intermediate tones through on-off control of dots in certain areas, and it utilizes a commonly termed dither or error diffusion process.

The binary R, G and B data as obtained are written in the shuttle scan form in block buffer 209 (step S19).

This data may be supplied for compression encoding to the CODEC side in the raster scan form through control of the generation of address for the reading of data from the block buffer to the raster scan form. That is, the data can be supplied in a form in the standard communication line. The data is then stored once in the hard disk and then transmitted (step S25).

Pattern 2: in which A3 size original is read out with color 400 dpi, then compressed and then converted to A4 size 200 dpi monochrome data while being stored in hard disk before being transmitted This pattern is possible in case when a partner can deal with A4 size 200 dpi monochrome image. The operation in this case will be described.

The initial user's operations are the same as in the case of Pattern 1. In this case, switch 207 is connected to the binarization section side. The original has to be converted from A3 to A4 size. This is effected by utilizing a multiplying function of the scanner. Thus, image data converted to A4 size and 400 dpi is supplied to the image processing section. Operations in scanner/printer interface 200 through gamma conversion section 203 are the same as in the case of Pattern 1, so their description is not given here.

Color/monochrome conversion section 205 provides monochrome data on the basis of the equations for generating luminance signal from input NTSC standard R, G and B signals. Linear density conversion and paper size conversion section 206 converts input 400 dpi data to 200 dpi data through linear interpolation.

Operations after section 207 are the same as in the case of Pattern 1, and their description is not given.

Pattern 3: in which A3 size original is read out with color 400 dpi, then is stored once in the hard disk and then resolution converted to 200 dpi for transmission For transmitting A4 size 400 dpi data, after image is processed and tentatively stored in the hard disk after Pattern 1, connection to the partner is effected, and conditions of communication are confirmed. If it is found at this time that the partner has no function of receiving 400 dpi data, it is inevitable to have resort to 200 dpi data transmission. In this case, it is necessary to convert the resolution. Pattern 3 applies to this case.

Operations up to the tentative storage of A4 size original in the hard disk are executed after Pattern 1. Subsequently, A4 size 400 dpi color binary image data tentatively stored in the hard disk is converted to A4 size 200 dpi color binary image data. This operation will now be described.

The A4 size 400 dpi image data is transferred in raster scanner form from the hard disk through CODEC interface 210 to block buffer 210. This data is transferred to multi-level generation section 212 in shuttle scan system by changing the call time address generation system.

Multi-level generation section 212 produces 8-bit multi-level data for each of R, G and B by taking values of neighboring pixels into considerations.

Multi-level data thus produced is returned through switch 213 to the processing system consisting of sections 205 and 206. The data is passed without any processing through section 205 for color/monochrome conversion is unnecessary in this case, and then converted to 200 dpi in linear density conversion and paper size conversion section 206.

Subsequently, like Patterns 1 and 2, the data is binarized and then supplied in raster scan form through the block buffer to the hard disk for tentative storage before transmission.

Pattern 4: in which image received with A4 size and 400 dpi is directly supplied to the printer This pattern applies to a case when data can be directly printed irrespective of whether the data is color or monochrome data. Received data is tentatively stored in the hard disk and then passed through CODEC interface 209 to be supplied in raster scan form to block buffer 210.

Subsequently, the data is supplied in shuttle scan form to multi-level generation section 211 and thence supplied through switches 213 and 214 to scanner/printer interfface 200.

Pattern 5: in which image received with A4 size and 200 dpi os resolution converted to 400 dpi before being supplied This pattern applies to a case where the resolution of received data and that of the printer are different. The operation is the same as Pattern 4 until multi-level data is produced from the received data.

The data is subsequently returned through switch 213 to color/monochrome conversion section 205 and linear density conversion and paper size conversion section 206, and after resolution conversion the data is supplied through switches 207 and 214 to the printer side.

Pattern 6: in which image is received with A4 size and 400 dpi is paper size converted to A4

In this case, like Pattern 5, image size is enlarged from A4 to A3 in linear density conversion and paper size conversion section 206 before being supplied to the printer side.

Pattern 7: in which A3 size original is copied

In this pattern, the routine flow branches to copy side (step S2) in check step S1 in the flow chart of FIG. 2-4. In step S2, masking parameter in the color processing circuit in the scanner is set for copy. Further, the routine branches in step S4 to normal copy side, and data read out by the scanner is supplied to the printer. As for data flow in this case, when an A3 size original is set on the original base of scanner 109 in FIG. 2-2 and a copy start instruction is given from operation panel 112, CPU 100 receiving the copy start signal gives a copy start instructon to the sub-CPU (not shown) in image processing unit 108. The sub-CPU in image processing unit 108 receiving the copy start signal supplies a copy start command to the scanner and printer. Multi-level image data read out by the scanner is scan-by-scan converted in color processing and binarizing circuit in the scanner to color matched to the characteristics of the printer, and after binarization the data is supplied to printer 110 for ink jet recording.

Pattern 8: in which A3 size original is memory copied

The routine flow branches to copy side (step S2) in step S1 in the flow chart of FIG. 2-4, and masking parameter in the color processing circuit in the scanner is set for copy. Then in step S4 the flow branches to memory copy side. As for the flow of data, when an A3 size original is set on the original base of scanner 109 and a memory copy instruction is given from operation panel 112, CPU 100 receives the memory copy start signal, and the sub-CPU in image processing unit 108 supplies a read start command to the scanner. Multi-level image data read out from the scanner is 8-bit data for each of the three colors read out by R, G and B filters in the scanner. Data from the scanner is received by scanner/printer interface 200 and smoothed and edge emphasized in section 201 (step S5). In the memory copy operation, unlike transmitting operation, conversion of data to NNTSC standard R, G and G is unnecessary, and thus data is passed without any processing through RGB (scanner) to RGB (NTSC) conversion section 202 (step Data from section 202 is gammer converted in section 203 (step S11), monochrome converted in section 205 (step S13) if a monochrome conversion instruction is provided, resolution converted in section 206 (step S15) if a resolution conversion instruction is provided, and after binarization insection 208 (step S17) the data is converted in block buffer 1 209 to raster scan form (step S19) to be supplied through CODEC interface 210 to CODEC for encoding (step S21) and memory stored in the hard disk (step S23). Subsequently, data in the memory is decoded under control of a command from CPU 100 (step S27) and supplied through CODEC interface 210 to block buffer 2 211. Block buffer 2 211 executes conversion to an operating form matched to the printer (step S29), and the binary image data is converted to in multi-level generation section 212 (step S31) to multi-level data and supplied through scanner/printer intrface 200 to the scanner. In the scanner color processing and binarization matched to the recording characteristics of the printer are performed, and resultant binary data is supplied to the printer for ink jet recording. When producing a plurality of copies, no scanning is necessary, and only data stored in the hard disk may be read out again.

Second Embodiment

FIG. 3-2 ia a blockdiagram showing a second embodiment of the image processing unit.

Here, only only structural differences of this embodiment from the first embodiment will be described. Instead of linear density conversion and paper size conversion section 206 in the first embodiment shown in FIG. 1, in the second embodiment resolution conversion section 220 and paper size conversion section 221 are provided. Resolution conversion section 220 converts 400 dpi to 200 or 100 dpi, and its function is only the reduction of the size to ½ or ¼. Thus, it is possible to simply partly provide pixels.

Paper size conversion section 221 has a large number of different multiplification factors, and a processing corresponding to a given multiplification factor is necessary.

Operation of the second embodiment

Operation will be described in connection with Pattern 6 same as described before in the first embodiment mainly with respect to differences in operation.

Pattern 1: in which A3 size original is read out with color 400 dpi, then tentatively stored in the hard disk and then supplied without changing the resolution and paper size In this case, there is no difference since neither resolution nor paper size is converted. 8-bit multi-level data for each of R, G and B supplied from scanner/printer interface 200 is smoothed and edge emphasized in section 201 and converted in section 202 to NTSC standard R, G and B. Then, the data is density converted, if necessary, in section 203. It is passed without any processing through sections 205 and 206. It is binarized in section 208 and written in block buffer 2 209.

Pattern 2: in which A3 size original is read out with color 400 dpi and converted to A4 size 200 dpi monochrome data while being stored in hard disk before being supplied A difference in this case is the use of resolution conversion section 220 for conversion of resolution form 400 to 200 dpi. NTSC standard signals for R, G and B are provided from section 203, then converted in section 205 to luminance signal and then resolution converted in section 220. The processing of the resolution conversion may be based on a partial supply method of taking out one pixel for every two pixels or the like, a method of converting the image density while effecting linear interpolation or a projection method. The subsequent operation is not described.

Pattern 3: A4 size original is read out with color 400 dpi, then tentatively stored in hard disk and then resolutoin converted to 200 dpi before being supplied Again in this case the operation is substantially the same if the resolution/paper size conversion section in the first embodiment is thought to be replaced with resolution conversion section 220. Pattern 4: in which image received with A4 size 400 dpi is directly supplied to the printer In this case the operation is the same as in first embodiment since no processing is executed in paper size conversion section 221.

Pattern 5: in which image received in A4 size and with 200 dpi is supplied after conversion of resolution to 400 dpi.

In this case, raster scan form data written in block buffer 2 211 from CODEC interface 210 is subjected to multi-level generation processing in section 212 by increasing the data quantity to be compatible to 400 dpi. To this end, the same pixel is read out twice and in shuttle scan form with read time address generation system. Subsequently, the data is passed witout processing through paper size conversion section 221 to the printer.

As an alternanative method, each pixel is read out only once from block buffer 2 211, and the number of pixels is doubled in horizontal and vertical directions in the paper size conversion section.

The difference between these two operations is as follows. The method of executing the reading of data from the block buffer twice concerns repetition of piexels in binary data, whereas the method of interpolation in the paper size conversion section deals with multi-level data. Generally, interpolation with multi-level data permits conversion of higher quality to be obtained.

Pattern 6: in which image received in A4 size and with 400 dpi is paper size converted to A3

Where paper size conversion is involved, data after the multi-level generation processing is paper size converted in paper size conversion section 221 to a paper size capable of printing in the printer and then supplied to the printer.

Third Embodiment

FIG. 3-3 is a block diagram showing a third embodiment of the image processing unit.

Only structural differences of this embodiment from the first embodient will be described. Instead of RGB/RGB conversion section 202 in the first embodiment shown in FIG. 1, in the third embodiment RGB/XYZ conversion section 230 and XYZ/RGB conversion section 231 are provided. In addition, color/monochrome judgement section 232 is provided. RGB/XYZ conversion section 230 converts RGB data obtained by using a scanner's own light source or an optical system such as filters to XYZ data usually through table look-up.

XYZ/RGB conversion section 231 calculates NTSC standard R, G and B from XYZ data. The calculation is performed in conformity to NTSC standards. Color/monochrome judgement section 232 judges whether read-out original is a color or monochrome original. The judgement is effected from the value of color information obtained from X, Y and X values.

Operation of the third embdoiment

Operation will be described in connection with a case where color/monochrome judgement is effected automatically at the time of transmission.

Pattern: in which A4 size monochrome original is read out with color 400 dpi, then tentetively stored in hard disk and then transmitted as monochrome image as a result of color/monochrome judgement A4 size 400 dpi color data is supplied through scanner/printer interface and smoothing and edge emphasis section 201 to RGB/XYZ conversion section 230 for conversion to XYZ data. The result is converted in XYZ/RGB conversion section 231 to NTSC standard signals of R, G and B. The subsequent operation is the same as in the first embodiment. Color/monochrome judgement section 232 calculates color degree from the values of X, Y and Z and judges whether the original is a color or monochrome original from the result of calculation.

If the result of judgement in color/monochrome judgement section 232 executed after reading of one sheet of original into the hard disk is monochrome, the tentatively stored color data is supplied through block buffer 2 211 to multi-level generation section 212 to obtain multi-level data, which is supplied through switch 213 to color/monochrome conversion section 205 for conversion to monochrome on the basis of an equation of the NTSC standard luminance signal. Then, the data is binarized and stored in the hard disk.

Color/monochrome Conversion Section

The section calculates black component K as $$K=0.30R_{NTSC}+0.59G_{NTSC}+0.11B_{NTSC}$$

which is approximately shown as $$(1/4+1/16)R+(1/2+1/16)G+(1/8)B$$

(one lower bit of R+two lower bits of G)

The final correction is done for providing K=255 when (R, G, B)= (255, 255, 255)

Color/monochrome judgement in section 232 as noted above is realized with a construction of the color/monchrome judgement section shown in the First and second embodiments as will be described later.

The result of color/monochrome judgement is provided to judgement signal line 233. For example, this signal is "1" if a judgement as a color original is given is "0" if a judgement as a monochrome original is given. The signal on judgement singal line 233 is supplied to color/monochrome conversion section 205 for conversion according to judgement signal as will be described hereinunder.

Figures 3, 4, 5:
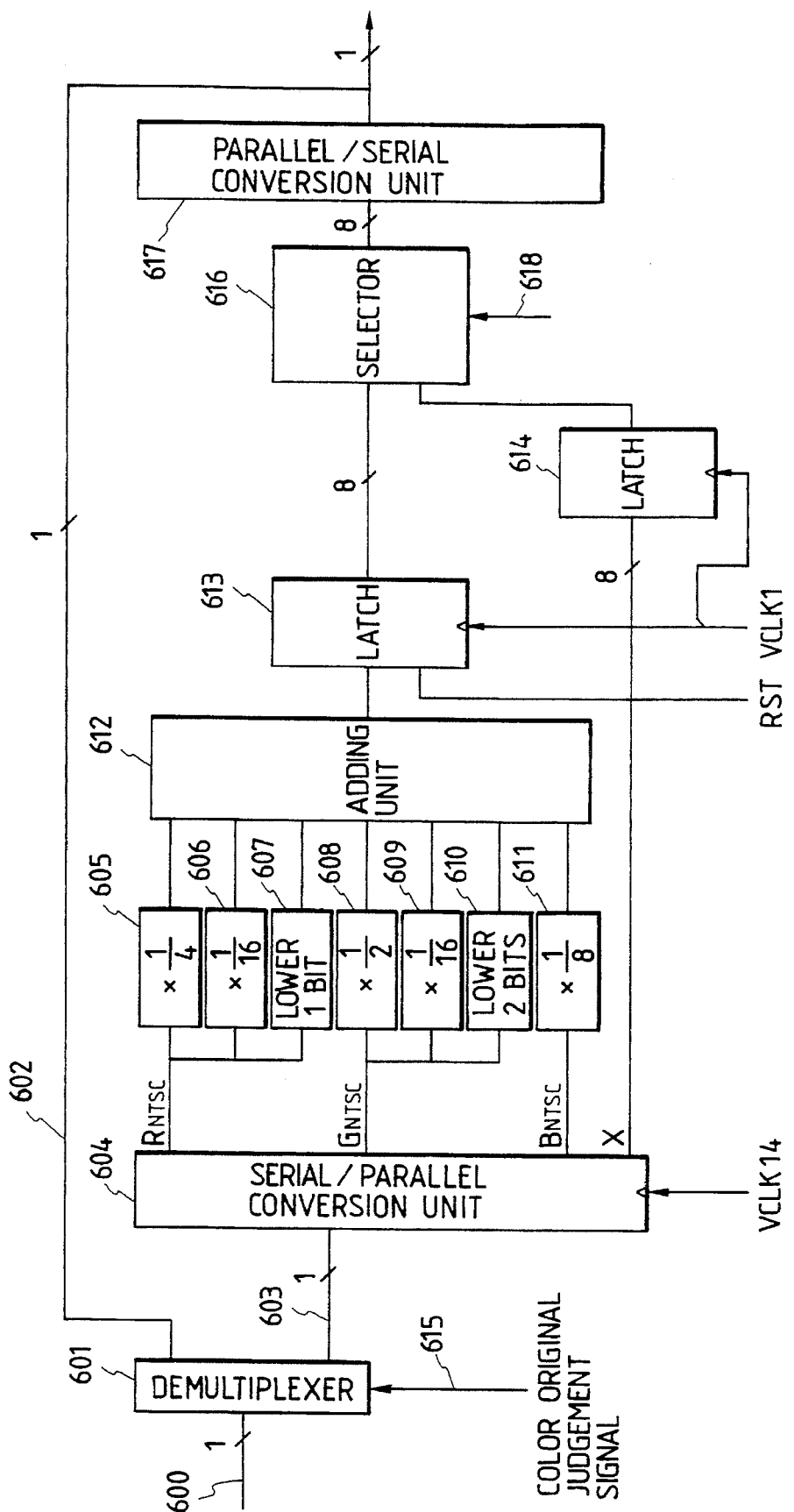

FIG. 3-5 shows an example of construction for the above calculation.

Designated at 600 is a data signal line, to which the output of section 231 is supplied. Demultiplexer 601 switches processing-free line and processing line according to color original judgement signal 615.

More specifically, if it is judged that an original is a color original, image signal is led to line 602. If it is judged that an original is a monochrome original, image signal is led to line 603 monochrome conversion. Designated at 604 is a serial/parallel conversion unit to convert serial data of image to parallel data. This unit is synchronized to VCLK14 shown in FIG. 3-6. Of data DATA shown in FIG. 3-6, data R, G and B are supplied after shifting through bit shift circuits 605 to 611 to adding unit 612. Thus, the outputs of all of circuits 605 to 611 are added together to produce luminance signal Y. Data X in data DATA shown in FIG. 3-6 is not processed at all and is held in latch 614 in synchronism to the rising of signal VCLK1.

The operation of latch 613 will now be described. Latch 613 latches data in synchronism to the rising of signal VCLK1. Signals from two latches 614 and 613 are supplied to selector 616, which selects one of these input signals according to control signal 618. More specifically, in the timing of data DATA shown in FIG. 3-6 the data in latch 613 is selected during the periods of data R, G and B, and data in latch 614 is selected during the period of data X. Parallel-serial conversion unit 617 recovers original serial data. The output data at this time is monochrome data as shown in 1 in FIG. 3-7.

If it is arranged to reset latch 613 to latch "0" at the timing of RST in the timing chart of FIG. 3-6, the output data can be converted to data as shown in 2 in FIG. 3-7, consisting of Y, O, O and X.

Fourth Embodiment

FIG. 3-4 is a block diagram showing a fourth embodiment of the image processing unit.

Structual differences of this embodiment from the first embodiment will be described. Instead of RGB/RGB conversion section 202 in the first embodiment shown in FIG. 3-2, in the third embodiment RGB/XYZ conversion section 230 and XYZ/RGB conversion section 231 are provided. In addition, color/monnochrome conversion section 232 is provided.

RGB/XYZ conversion section 230 converts RGB data obtained with a scanner's own light source or an optical system such as filters to XYZ data usually through table look-up.

XYZ/RGB conversion section 231 calculates NTSC standard signals of R, G and B from the XYZ data. The calculation is carried out in conformity to NTSC standards. Color/monochrome judgement section 232 judges whether a read-in original is a color or monochrome original. The judgement is effected from a value of color degree obtained from the values of X, Y and Z.

Operation of the Fourth Embodiment

Operation will be described in connection with a case where color/monochrome judgement is effected automatically at the time of transmission.

Pattern: in which A4 size monochrome original is read out with color 400 dpi, then tentatively stored in hard disk and then transmitted as monochrome image as a result of the color/monochrome judgement A4 size 400 dpi color data is supplied through scanner/printer interface 200. The data is supplied through Smoothing and edge emphasis section 201 to RGB/XYZ conversion section 230 for conversion to XYZ data. The result is supplied to XYZ/RGB convrsion section 231 for conversion to NTSC standard signals of R, G and B. Subsequent operation is the same as in the first embodiment. Meanwhile, color/monochrome judgement section 232 calculates color degree data from the values of X, Y and Z and judges whether the original is a color or monochrome original from the result of judgement.

If color/monochrome judgement section 232 provides a judgement of monochrome after reading of one sheet of original into the hard disk, the tentatively stored color data is supplied through block buffer 2 211 to multi-level generation section 212 to produce multi-level data, which is supplied through switch to block buffer 1 209 for conversion to monochome. Then, the data is binalized and stored in the hard disk.

The color/monochrome judgement in section 232 is realized with a structure of color/monochrome judgement section in the first and second embodiment as shown in FIG. 4-1-1, as will be described later.

The result of color/monochrome judgement is provided to judgement signal line 233. For example, signal "1" is provided if a judgement as a color original is given, and signal "0" is provided if a judgement as a monochrome original is given. Signal on judgement signal line 233 is supplied to block buffer 1 209, and according to judgement singal block buffer 209 performs color/monochrome conversion as will be described hereinunder.

A procedure of color facsimile transmission in the above embodiment will now be described.

Two cases can be assumed, i.e.:
(1) a case where the partner is a color facsimile system; and
(2) a case where the partner is a monochrome facsimile system (such as a G4 apparatus).

Either one of these two cases can be confirmed only after confirmation by protocol of whether the partner can accept color or can accept monochrome alone by connecting the facsimile to the network and confirming the partner as destination.

In the procedure according to the invention, the source side, i.e., the side from which an original is to be transmitted, reads the original once as color original and stores the read-out data after color compression (steps S02 to S10 in FIG. 3-9).

Then, the source facsimile is connected to the pather's facsimile (step S13), and the kind of the facsimile is identified (step S15). If the patner's facsimile is a color facsimile, data transmission is executed directly (steps S19 to S34). If the partner's facsimile is a monochrome facsimile, the following processing is executed. First, switch 213 is switched to the upper side in the Figure (as shown in FIG. 3-8). Then, the following steps are executed.

(1) Color compressed data is read out again (step S21).
(2) Data is passed to line as receiving side processing unit. That is, color recoverey data is produced (step S21).
(3) Multi-level data is produced through the block buffer 2 (step S25).
(4) Data is supplied by switching to the color/monochrome conversion section in the transmitting side processing flow.
(5) Color image data is converted to monochrome image data (step S27).
(6) Data is supplied through the binarization section and block buffer 1 to the compression section (step S29).
(7) The compression section is provided with switching between MM2 as a compression process for color facsimile and MMR as a compression process for monochrome facsimile, as shown in FIG. 2-3. In the instant flow, the switch is set to the side of MMR (step S31).
(8) Image data is transmitted after compression in MMR to the partner's monochrome facsimile.

In the above procedure, the instant source facsimile can automatically match the kind of the partner's facsimile for transmission of compressed image data.

A flow of image data in the above processing matched to the partner's function is shown in FIG. 3-11.

Now, the individual sections of image processing unit in the above embodiments will be described.

Smoothing Section

FIG. 4-1-1 shows the construction of a smoothing section in section 201 noted above. FIG. 4-2-1 shows an example of smoothing matrix. In this instance, the weight of the center pixel is either 1,2, 3 or 4, and the weight of the edge pixels 1. FIG. 4-1-3.shows a pixel array.

Referring to FIG. 4-1-1, designated at 400 is an addding section to calculate the sum of contents of eight pixels (a to i) of the 3-by-3 matrix except for the center pixel. Designated at 401 is a section for weighting the center pixel. Where weighting factor N is selectable from powers of 2 as in this example, section 401 can be constituted by sole bit shifts. Designated at 402 is an adder.

Designated at 403 is a divider for dynamic range matching between input image data and result of smoothing. Divisor M is M=8+N (N being the weighting factor of the center pixel)

In this example, 1/9, 1/10, 1/12 and 1/16 are calculated. Taking 1/9 as an example, it is approximated as

1/9=0.111111≈0.109375=14/128

By setting 14/128=8/128+4/128+2/128=1/16+1/32 +1/64, it is possible to simply constitute 1/16, 1/32 and 1/64 with 4, 5 and 6 bit shifts, respectively.

The weighting factor N of center pixel P is determined from a preset degree of smoothing. When N is determined, the divisor of the divider is also determined as in the equation noted above.

When adding section 400 receives data input for 3 lines necessary for processing in the 3×3 matrix, it executes addition of the contents of the edge pixels. In the case of FIG. 4-1-i, the sum is $Sum1 = a+b+c+d+e+f+g+h+i$ Section 401 executes the weighting of center pixel P. Adder 402 adds the two results. In the Figure, a sum $Sum2 = Sum1 + N \times P$ is obtained, and divider 403 provides a smoothing output as $Sum2/M$

Edge Emphasis

FIG. 4-2-1 shows the construction of an edge emphasis section in section 201 noted above. FIG. 4-2-2 shows an example of edge emphasis matrix. FIG. 4-2-3 shows a pixel array.

Designated at 410 is an adding section for calculating the sum of contents (a to i) of eight pixels in 3×3 matrix except for the center pixel, and at 411 is a code inversion circuit.

Designated at 412 is a section for performing center pixel weighting multiplification. In this example, the weighting factor is 8 which is a power of 2, and therefore the section can be constituted only by bit shifts. Designated at 413 is an adder.

Designated at 414 is a weighting circuit for performing weighting of 0 to a number less than unity. This section, like the smoothing section, can use only the results of bit shifts of 1/2, 1/8 and 1/16.

Offset setting section 415 compares an output from circuit 414 to an offset value preset from the CPU. If the absolute value of the output of circuit 414 is not less than the offset value, section 415 provides the offset value. If the absolute value of the output of circuit 414 is greater than the offset value, the output of circuit 414 is provided.

Designated at 416 is a selector for selecting either the result of smoothing or the value of the center pixel not processed at all. Designated at 417 is an adder.

The weighting factor N of center pixel P is determined from a preset degree of smoothing. When N is determined, the divisor of the divider is also determined.

When adding section 410 receives data input for three lines necessary for processing in the 3×3 matrix, it performs addition of the contents of the edge pixels. In the case of FIG. 4-2-1, the sum is $Sum0 = a+b+c+d+e+f+g+h+i$ Its sign is inverted by inverter 411. In addition, circuit 412 executes weighting of the value of center pixel P to 8 times. Adder 413 adds the two results. In the Figure, the sum is $Sum1 = 8 \times P - Sum0$ Sum1 represents edge quantity. Weighting circuit 414 executes predetermined weighting of the edge quantity. Designated at 415 is an offset circuit for ignoring all edge quantities less than the offset value.

Designated at 416 is a selector for selecting either the result of smoothing or the value of the center pixel not processed at all. Adder 417 adds the edge quantity from circuit 415 to the result of selection. Although not shown, upper and lower clipping is performed to accommodate the result of calculation in dynamic range (of 0 to 255).

(RGB (scanner) to RGB (NTSC) conversion section)

This section convers RGB data supplied from the scanner to NTSC standard RGB data. The conversion may be done as follows.

$$\begin{pmatrix} R_{NTSC} \\ G_{NTSC} \\ B_{NTSC} \end{pmatrix} = \begin{pmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{pmatrix} \begin{pmatrix} R_{SCANNER} \\ G_{SCANNER} \\ B_{SCANNER} \end{pmatrix} \quad (4\text{-}3\text{-}1)$$

This equation is a first order expression. If a second order expression is desired, we may provide $$\begin{pmatrix} R_{NTSC} \\ G_{NTSC} \\ B_{NTSC} \end{pmatrix} = \begin{pmatrix} \alpha_{11} & \alpha_{12} & \alpha_{13} & \alpha_{14} & \alpha_{15} & \alpha_{16} & \alpha_{17} & \alpha_{18} & \alpha_{19} & \alpha_{110} \\ \alpha_{21} & \alpha_{22} & \alpha_{23} & \alpha_{24} & \alpha_{25} & \alpha_{26} & \alpha_{27} & \alpha_{28} & \alpha_{29} & \alpha_{210} \\ \alpha_{31} & \alpha_{32} & \alpha_{33} & \alpha_{34} & \alpha_{35} & \alpha_{36} & \alpha_{37} & \alpha_{38} & \alpha_{39} & \alpha_{310} \end{pmatrix} \begin{pmatrix} R \\ G \\ B \\ R^2 \\ G^2 \\ B^2 \\ RG \\ RB \\ GB \\ 1 \end{pmatrix} \quad (4\text{-}3\text{-}2)$$

Factor $a_{ij}$ in equation (4-3-1) and (4-3-2) can be obtained experimentarily. No method of obtaining the factor is given here.

Structure Example 1

Circuit structure for implementing calculation after equation or (4-3-2)

It is assumed that actual values given in the form of equation (4-3-1) are $$\begin{pmatrix} R_{NTSC} \\ G_{NTSC} \\ B_{NTSC} \end{pmatrix} = \begin{pmatrix} 1.13919 & -0.05553 & -0.05025 \\ -0.23689 & 1.55723 & -0.20177 \\ -0.14123 & -0.23522 & 1.46845 \end{pmatrix} \begin{pmatrix} R_{SCANNER} \\ G_{SCANNER} \\ B_{SCANNER} \end{pmatrix} \quad (4\text{-}3\text{-}3)$$

For performing the matrix operation, the factors are approximated in the form of addition of the inverse of a power of 2. Then we obtain $$R_{NTSC} = 1.13919 R_{SCANNER} - 0.05553 G_{SCANNER} - \quad (4\text{-}3\text{-}4)$$

$$0.05025 B_{SCANNER} \approx 1.1328125 R_{SCANNER} - 0.0546875 G_{SCANNER} -$$

$$0.046875 B_{SCANNER} = \left(1 + \frac{1}{2} + \frac{1}{128}\right) R_{SCANNER} -$$

$$\left(\frac{1}{32} + \frac{1}{64} + \frac{1}{128}\right) G_{SCANNER} -$$

$$\left(\frac{1}{32} + \frac{1}{64}\right) B_{SCANNER}$$

Structure

FIG. 4-3-1 shows an example of implementation of this equation with bit shifters, adders and a code inversion circuit. The Figure shows only the circuit For $R_{NTSC}$, and similar circuits may be provided for the other colors. That is, circuits for R, G and B are provided in parallel.

Designated at 400 to 407 are bit shifters, at 408 to 411 and 413 are adders, and at 412 is a code inversion circuit.

Operation

The factors of R in equation (4-3-4) are obtained in circuits 400 to 402 and 403, factors of G are obtained in circuits 403 to 409 and 409, and factors of B are obtained in circuits 506 to 407 and 410. The sum of the results of circuits 409 and 410 is taken and code inverted, and the sum of the code inversion result and result from circuit 408 is taken in circuit 413 to obtain $R_{NTSC}$.

Structure Example 2

Equation (4-3-4) is modified (while omitting suffix$_{scanner}$).

$$(4.3\text{-}4) = \left(1 + \frac{1}{2} + \frac{1}{128}\right) R_{SCANNER} - \quad (4\text{-}3\text{-}4)$$

$$\left(\frac{1}{32} + \frac{1}{64} + \frac{1}{128}\right) G_{SCANNER} -$$

$$\left(\frac{1}{32} + \frac{1}{64}\right) B_{SCANNER} =$$

$$R + \frac{1}{2} R - \frac{1}{32} (G+B) - \frac{1}{64} (G+B) + \frac{1}{128} (R-G)$$

Structure

FIG. 4-3-2 shows a structure in this case. Designated at 420 and are code inversion circuits, at 421 and 422 are adders, at 424 to 428 are bit shifters, and at 428 is an adding circuit.

Operation

Adder 422 adds the result of inversion of G from circuit 420 and R to obtain R−G. Adder 421 calculates R+G, which is inverted in circuit 423 to obtain −(G+B). These data are shifted in bit shifters 424 to 428, and the results are added together in adding circuit 429 to obtain $R_{NTSC}$.

Structure Example 3

Structure

The result of calculation after equation (4-3-1) or (4-3-2) is provided directly to ROMs or RAMs (430 to 432). The memory quantity per color is 16 Mbytes (i.e., $2^{24} \times 8$ bits).

Operation

RGB data from the scanner is given as corresponding ROM or RAM addresses, and the result of calculation is read out as data.

Structure Example 4

Contents of processing

When performing calculation after equation (4-3-1) or (4-3-2), results of calculatoin concerning upper 5 bits of RGB data from the scanner are provided as a first table to ROMs or RAMs. The memory quantity per color is 32 Kbytes (i.e., $2_{15} \times 8$ bits). For lower 3 bits a second correction table is provided for each color. These tables are given as $$r' = a11 \times r$$

$$g' = a22 \times g \quad (4\text{-}3\text{-}3)$$

$$b' = a33 \times b$$

Output results from two tables are added together.

Structure

FIG. 4-3-4 shows the structure. Designated at 433 to 435 are RAMs or ROMs with 15 address bits and 8 daata bits. Results of calculation after equatoin (4-3-1) or (4-3-2) are stored in advance in these ROMs or RAMs. Designated at 436 to 438 are RAMs or ROMs with 3 address bits and 4 data bits. Results of calculation after equation (4-3-1) are stored in these ROMs or RAMs. Adders 439 to 441 add outputs of two different tables for respective colors.

Operation

RGB data from the scanner is divided into upper 5 bits and lower 3 bits, and a total of 15 bits with RGB data upper 5 bits are provided as address to tables 433 to 435. Thus, 8-bit data is obtained for each of R, G and B. Lower 3 bits are provided as address to tables 436 to 438 for each color. Thus, 4-bit data is obtained for each color. Adders 439 to 441 add outputs of two tables for respective colors of R, G and B.

Gamma Conversion Section

Now, gamma conversion section 203 will be described. This section has following 8-bit conversion tables corresponding to $R_{NTSC}$, $G_{NTSC}$ and $B_{NTSC}$, respectively.

$$R_{NTSC}' = f(R_{NTSC})$$

$$G_{NTSC}' = f(G_{NTSC})$$

$B_{NTSC}'=f(B_{NTSC})$

Structure Example 1

FIG. 4-4-1 shows the structure. Tables are ROMs each with 12 address bits and 8 data bits (i.e., 4 kbytes). Of 12 address bits, 8 bits are provided for $R_{NTSC}$ (or $G_{NTSC}$ or $B_{NTSC}$) and 4 bits for a table selection signal.

Operation

A density value set by the user on the operation panel is converted by the CPU to a 4-bit table selection signal which is supplied as upper address bits to the ROMs. 8-bit data after correction is obtained from input R, G and B data and table selection signal.

Structure Example 2

The tables are RAMs capable of rewriting from the CPU. For the remainder the structure is the same as Structure example 1.

Structure

FIG. 4-5-1 shows the structure. Designated at 501 to 508 are latches, and at 509 to 511 are RAMs with 12 address bits and 8 data bits.

Operation

During normal image processing, outputs of latches 507 and 508 are made ineffecive, and the operation is the same as in Structure example 1. Now, a case of altering the table contents from the CPU is taken. In this case, the outputs of latches 503 to 505 are rendered ineffective, and an address generated from the CPU and alteration table contents are latched in latches 507 and 508, respectively, and written under control of WR signal.

Resolution/paper Size Conversion Section

Multiplification (or density conversion) is effected by linear interpolation. First, one-dimensional linear conversion will be described. Referring to FIG. 4-6-1, the height of point y corresponding to given point x is obtained by linear approximation using points X1 and X2 on opposite sites of point x and heights of points Y1 and Y2 corresponding to respective points X1 and X2. It can be calculated after equation (4-6-1).

$$Y=Y_1+\frac{Y_2-Y_1}{L_1+L_2}L_1=\frac{Y_2L_1+Y_1L_2}{L_1+L_2} \quad (4\text{-}6\text{-}1)$$

where L1 and L2 are lengths determined by points x, X1 and X2. It will be seen from equation (4-6-1) that the value of the height of point y is constituted by the sum of products of height and length of the sets on the opposite sides of point x.

This first order example will now be extended to a second order example. Referring to FIG. 4-6-2, given point q and four points p1 to p4 surrounding point q define areas A to D. The value of q in this case is the sum of products each of each area and the value of associated pixel on the side of the area opposite point q. This value is given as $$q=\frac{p1D+p2D+p3D+p4D}{A+B+C+D} \quad (4\text{-}6\text{-}2)$$

Equation (4-6-2) is referred to as equation of linear interpolation.

Now, area calculation after equation (4-6-2) when determining values of pixels after conversion will be described.

Referring to FIG. 4-6-3, if the inter-pixel distance of original image in X direction is 512, the inter-pixel distance K after conversion is $$K=512\times100/Zx \quad (4\text{-}6\text{-}3)$$

where Zx (5) is magnification. The distance x to i-th (index i) pixel after conversion is $$x=K\times i+K/2 \quad (4\text{-}6\text{-}4)$$

Denoting the index of original image on the original side of point x by m0, $$mo=(x-256)/512 \text{ (rounded off)} \quad (4\text{-}6\text{-}5)$$

The distance xm0 from origin to index m0 is $$xm0=512\times m0+256 \quad (4\text{-}6\text{-}6)$$

The length of line segment L1 is $$L1=x-xm0 \quad (4\text{-}6\text{-}7)$$

L1 ranges from 0 to 512, but it can reduce bits in the area calculation. For example, if $$L1=L1\times16/512=L1\approx5 \text{ 5-bit shift} \quad (4\text{-}6\text{-}8)$$

L is 0 to 16 and corresponds to 4 (or 5) bits. In this case, L2 is $$L2=(16\text{-}D)$$

Assuming that L is obtained in X and Y directions as Lx1, Lx2, Ly1 and Ly2, area A is $$A=Lx1\times Ly1 \quad (4\text{-}6\text{-}10)$$

That is, the area takes 4 (or 5) bits by 4 (or 5) bits, i.e., 8 (or 9) bits. Also, since $$L1+L2=16 \quad (4\text{-}6\text{-}11)$$

the divisor of equation (4-6-2) is 256, that is, the division can be realized with a 8-bit shift

Structure

Figures 3, 4, 5, 6:
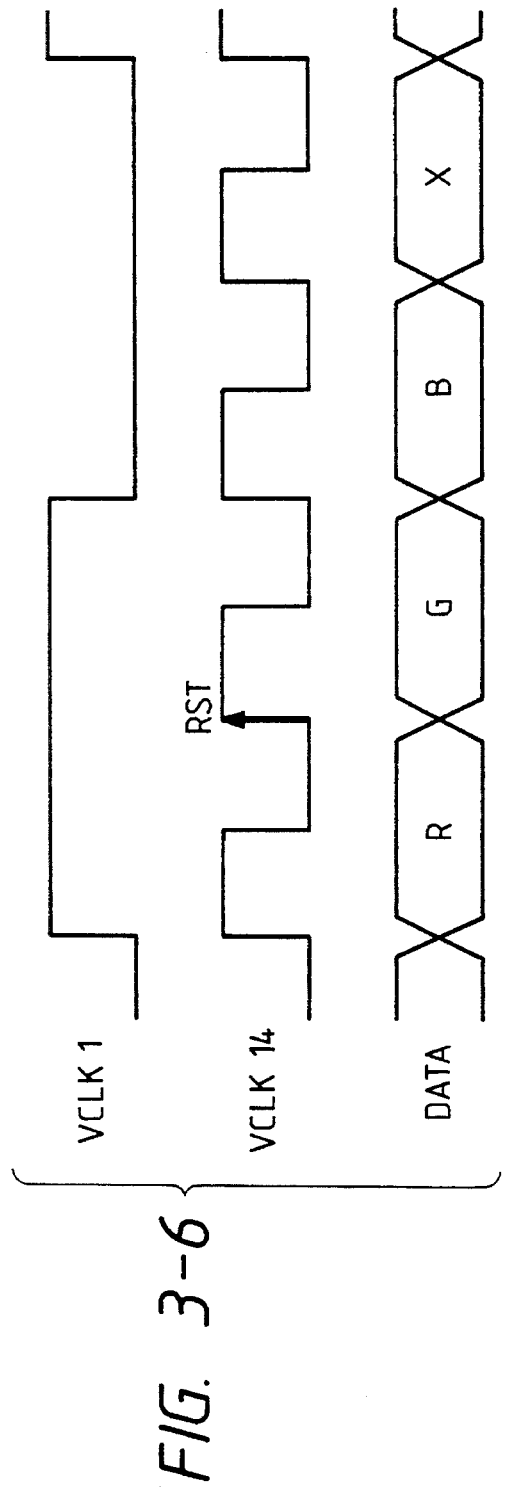
Figures 3, 4, 5, 6, 7:
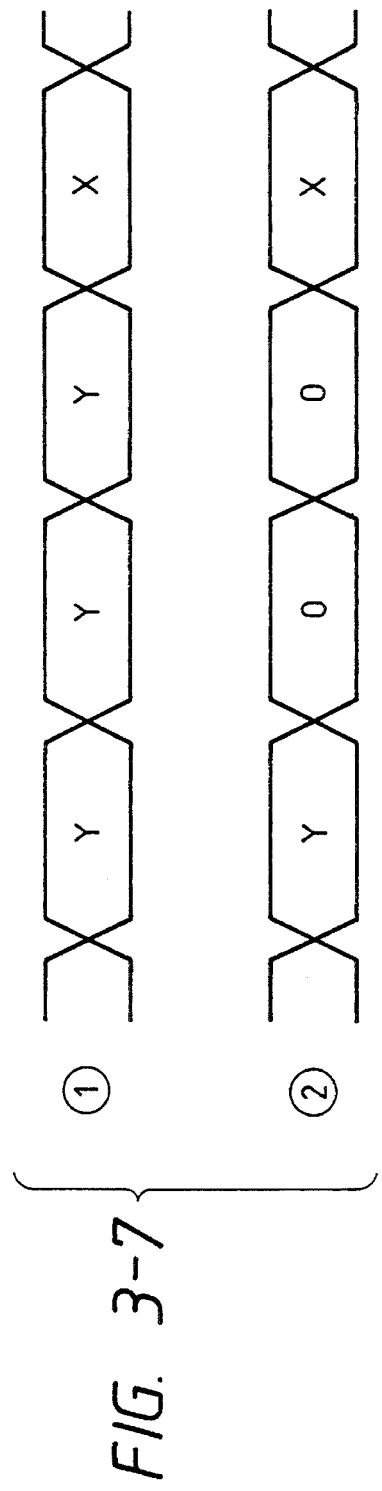
Figures 3, 4, 5, 6, 7, 8:
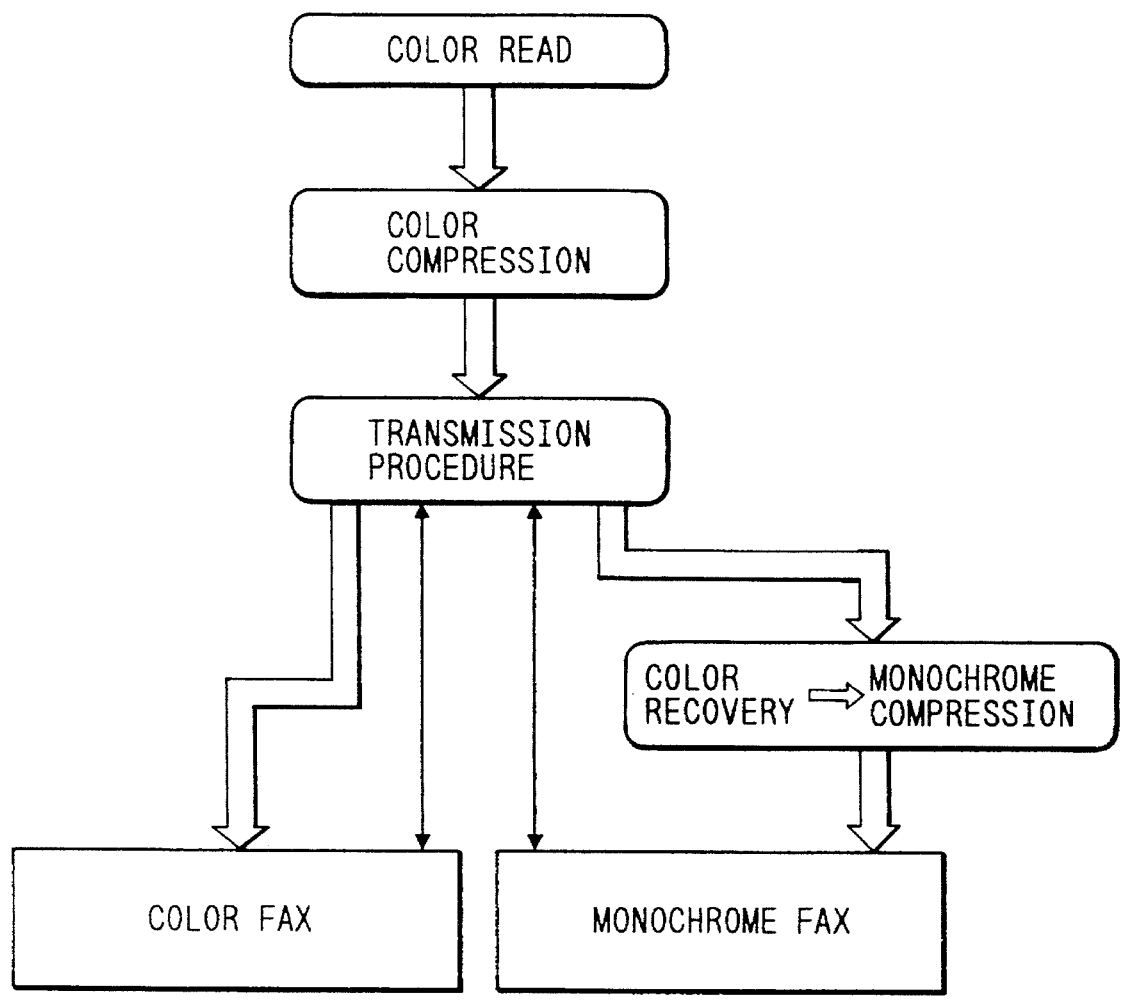
Figures 3, 4, 5, 6, 7, 8, 9:
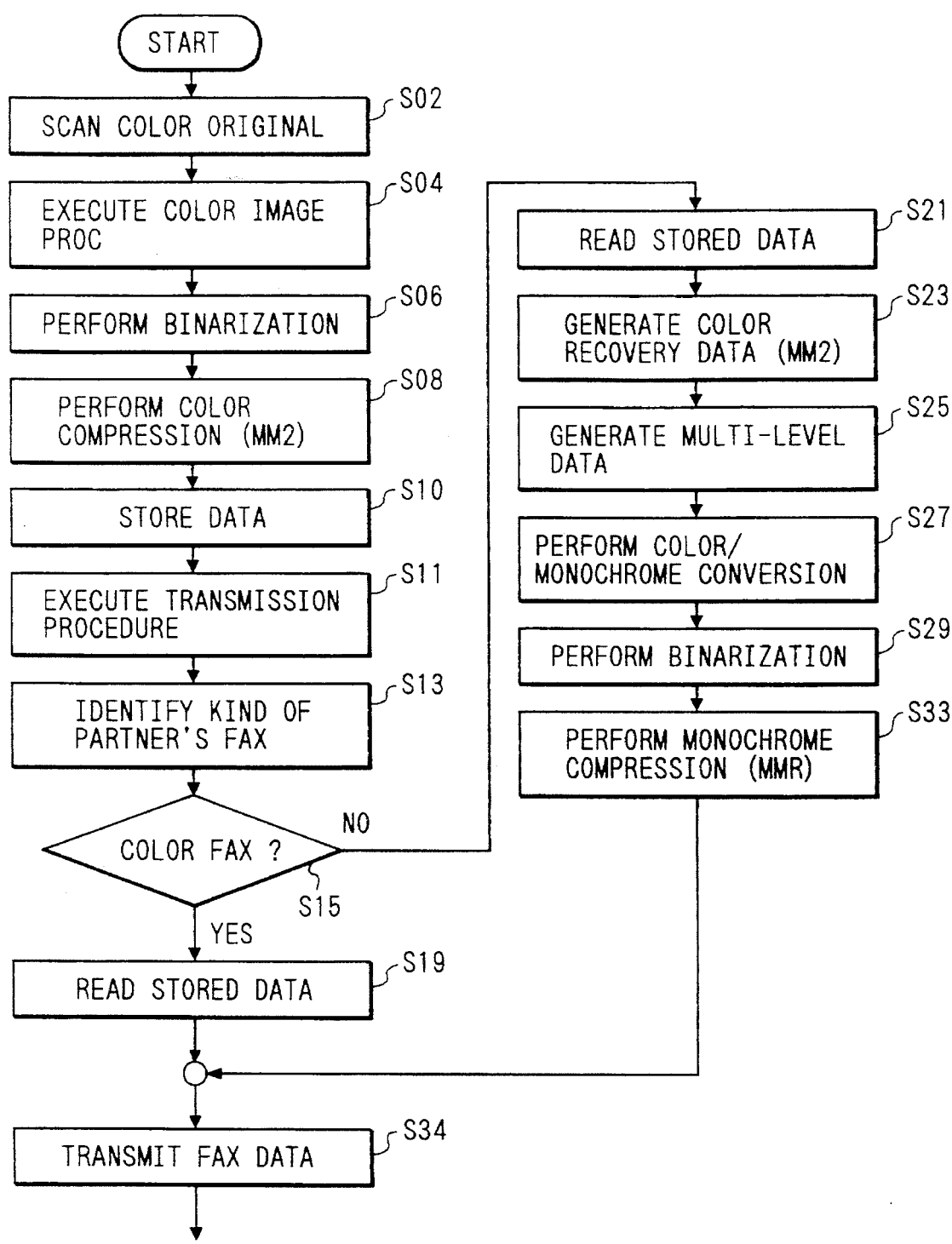
Figures 1, 2, 3, 4:
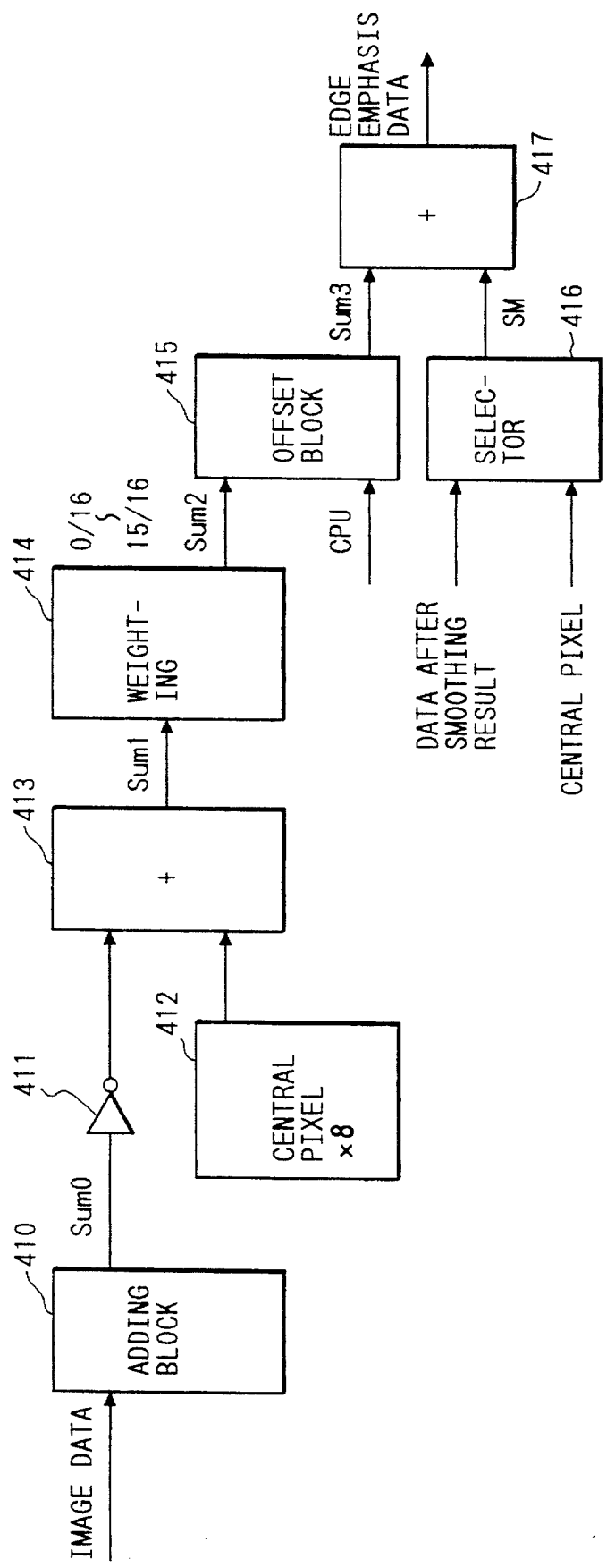
Figures 1, 3, 4:
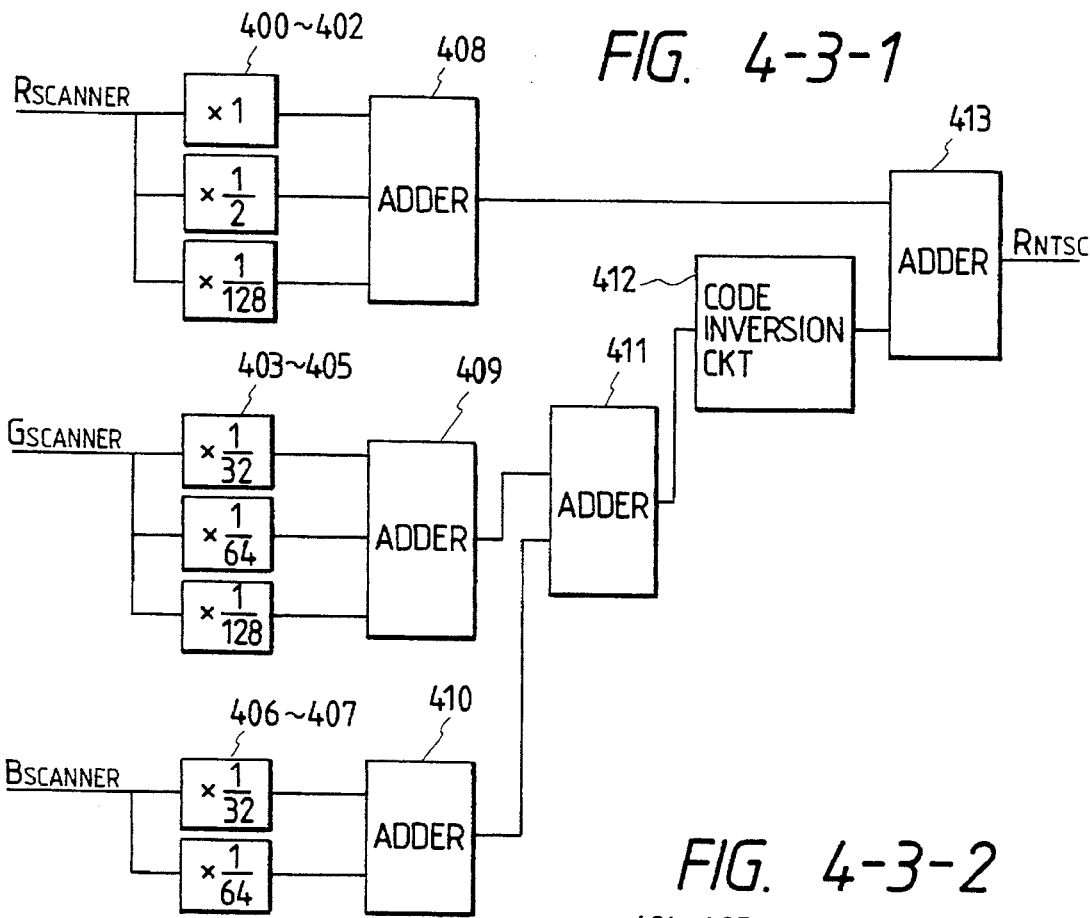
Figures 2, 3, 4:
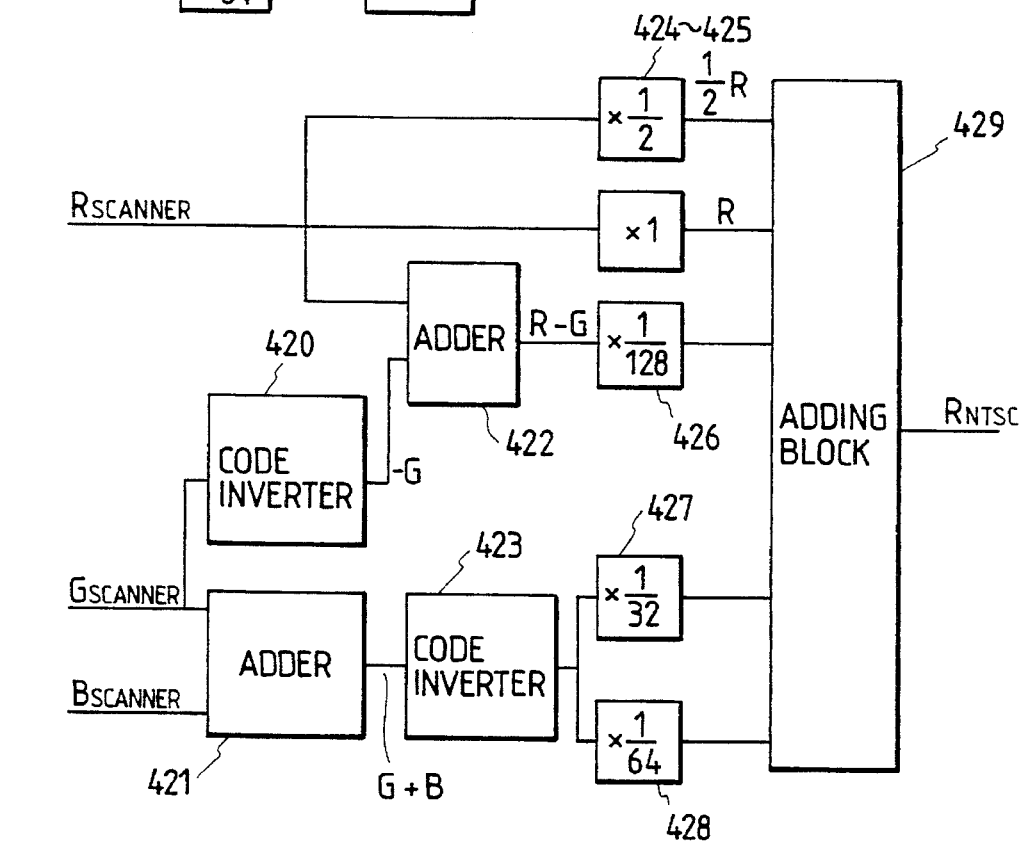
Figures 3, 4:
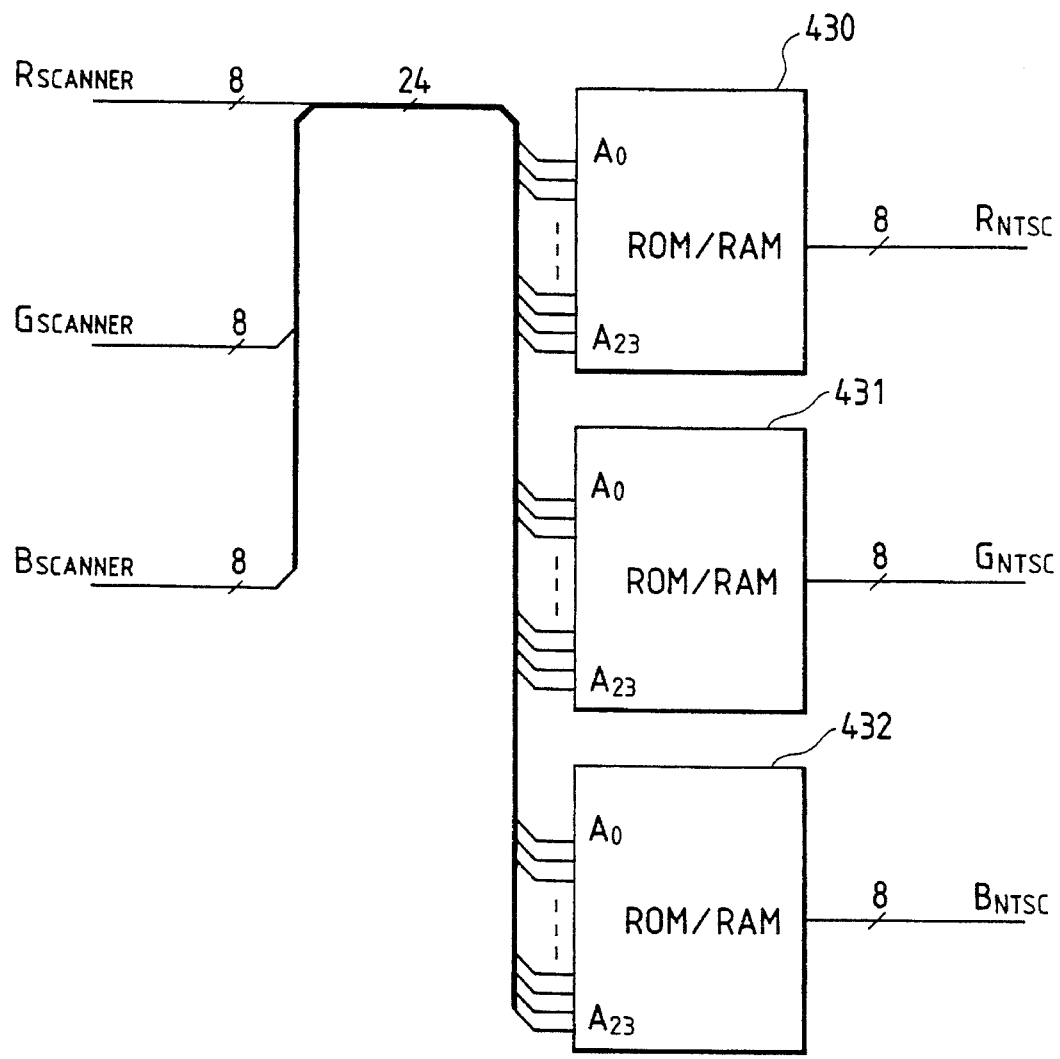
Figures 3, 4:
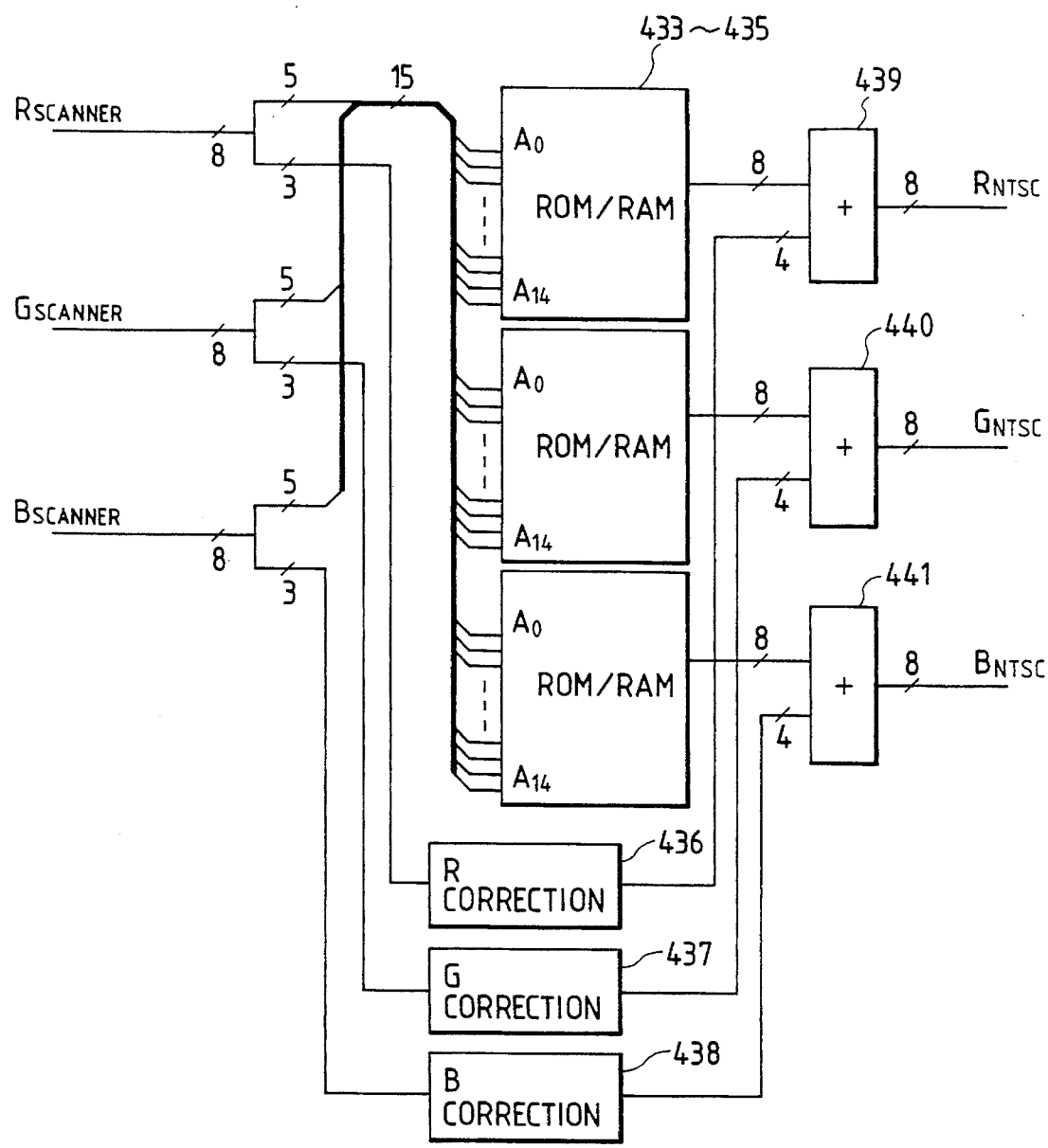
Figures 1, 4:
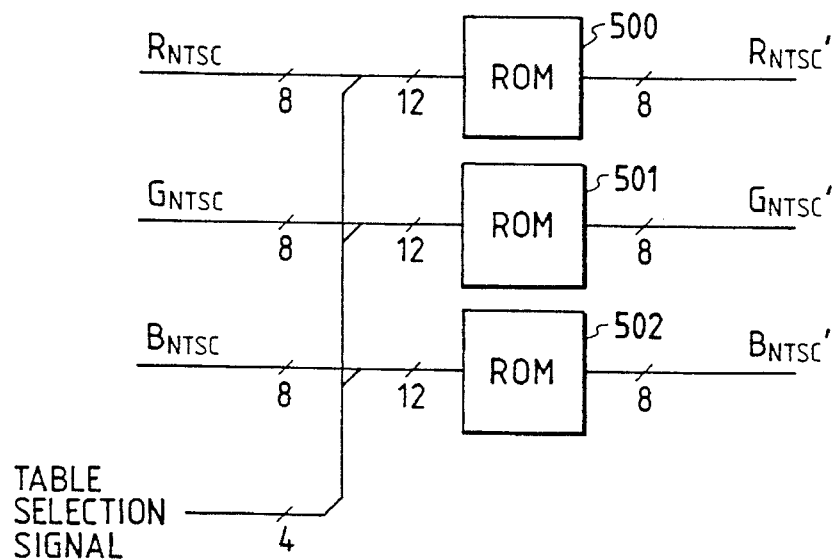
Figures 1, 4, 5:
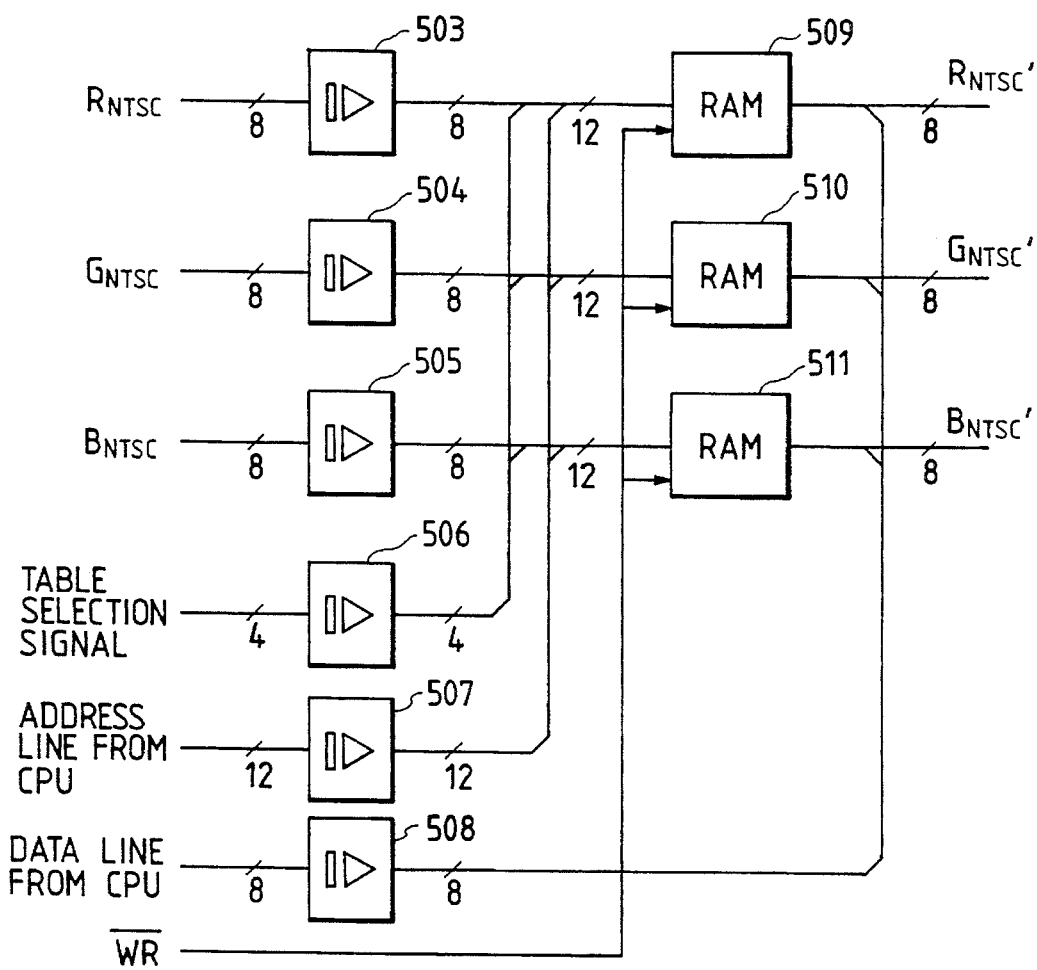
Figures 1, 4, 5, 6:
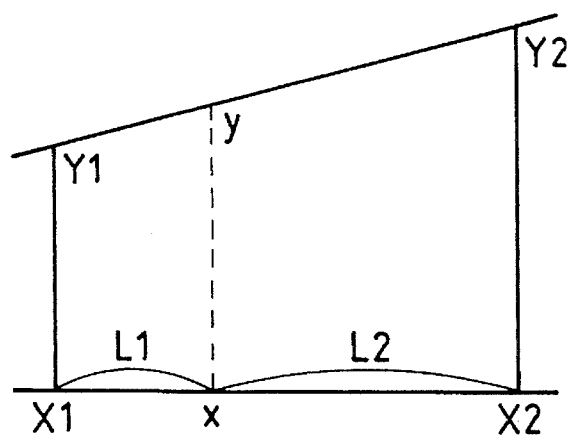
Figures 2, 4, 5, 6:
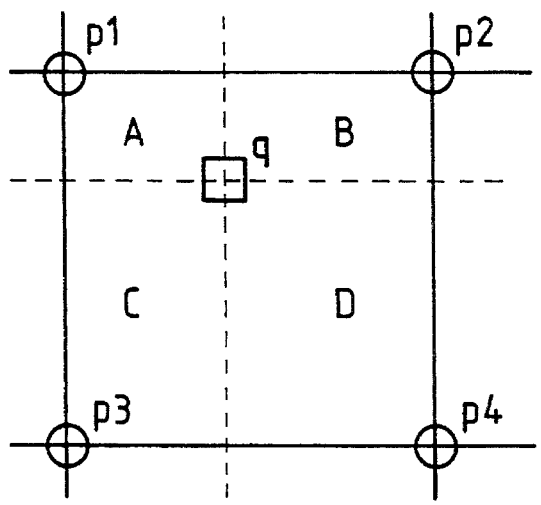
Figures 3, 4, 5, 6:
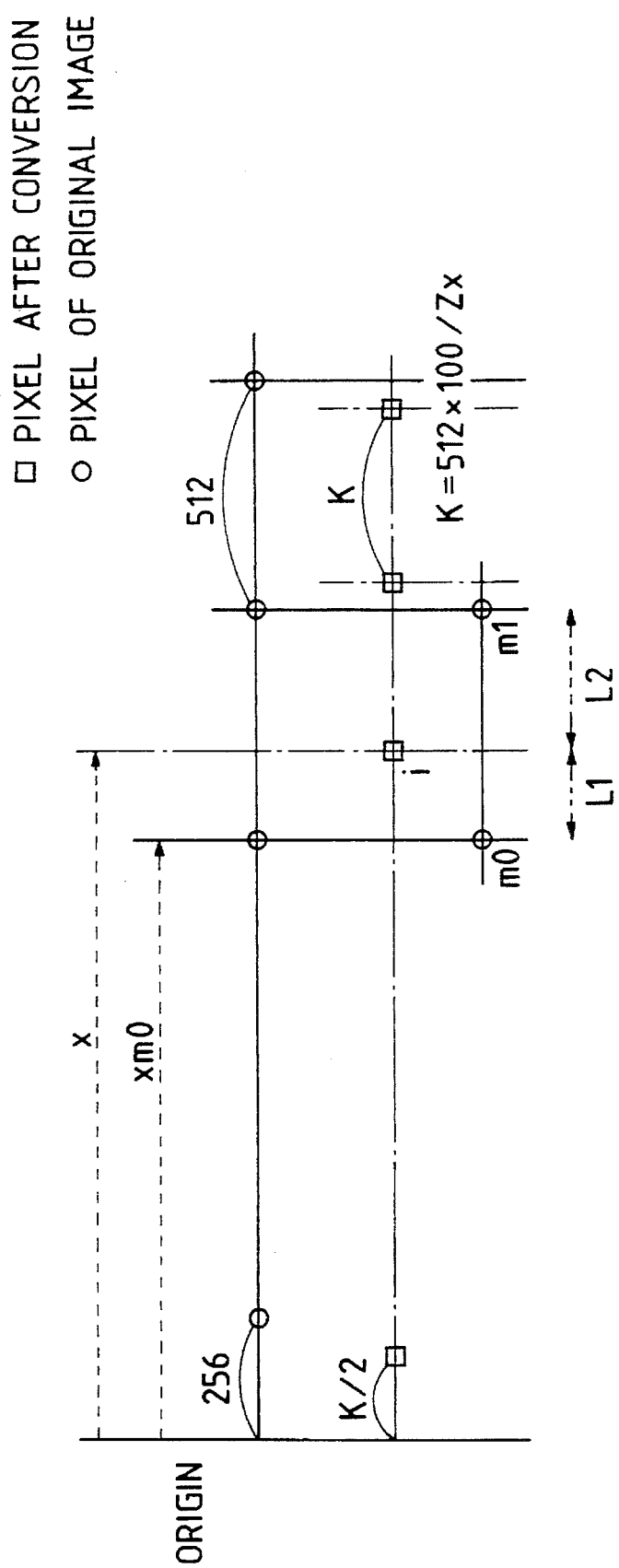
Figures 4, 5, 6:
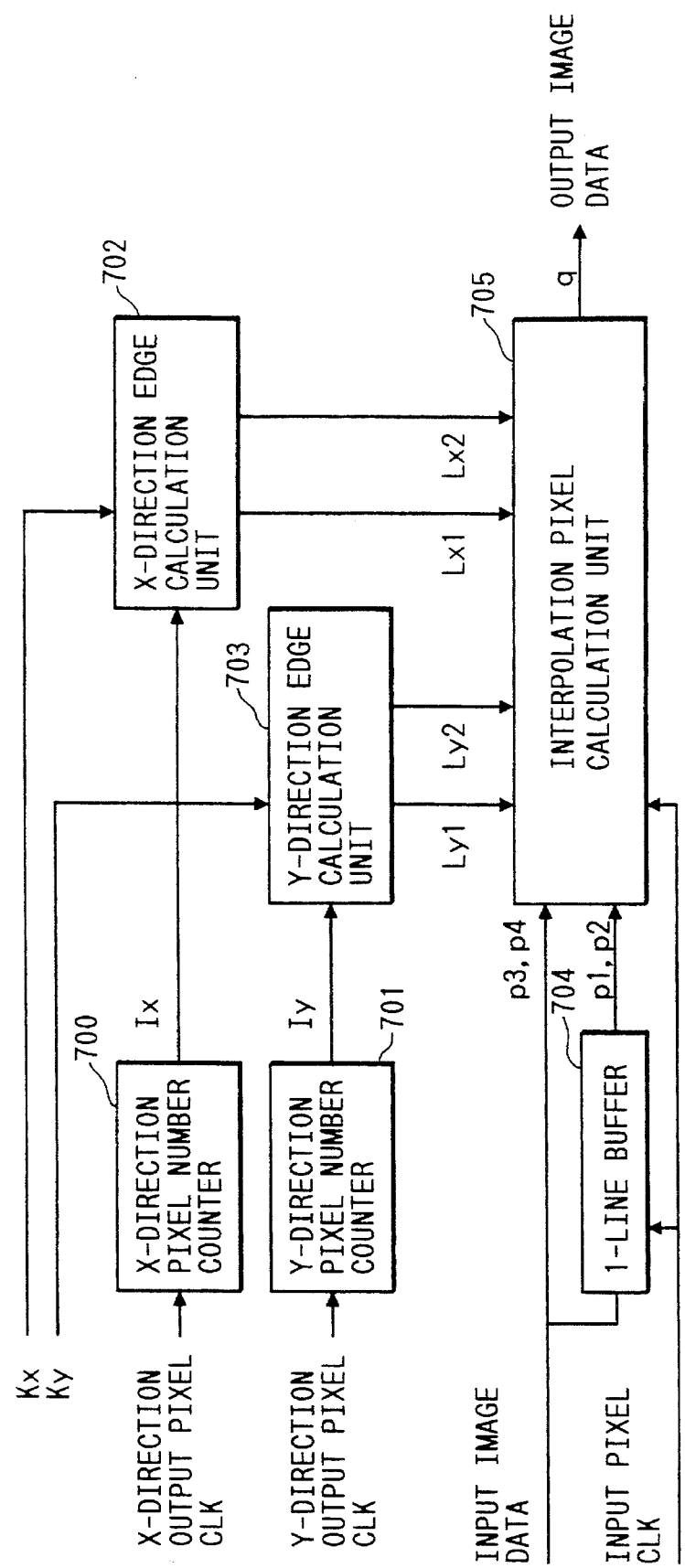
Figures 4, 5, 6:
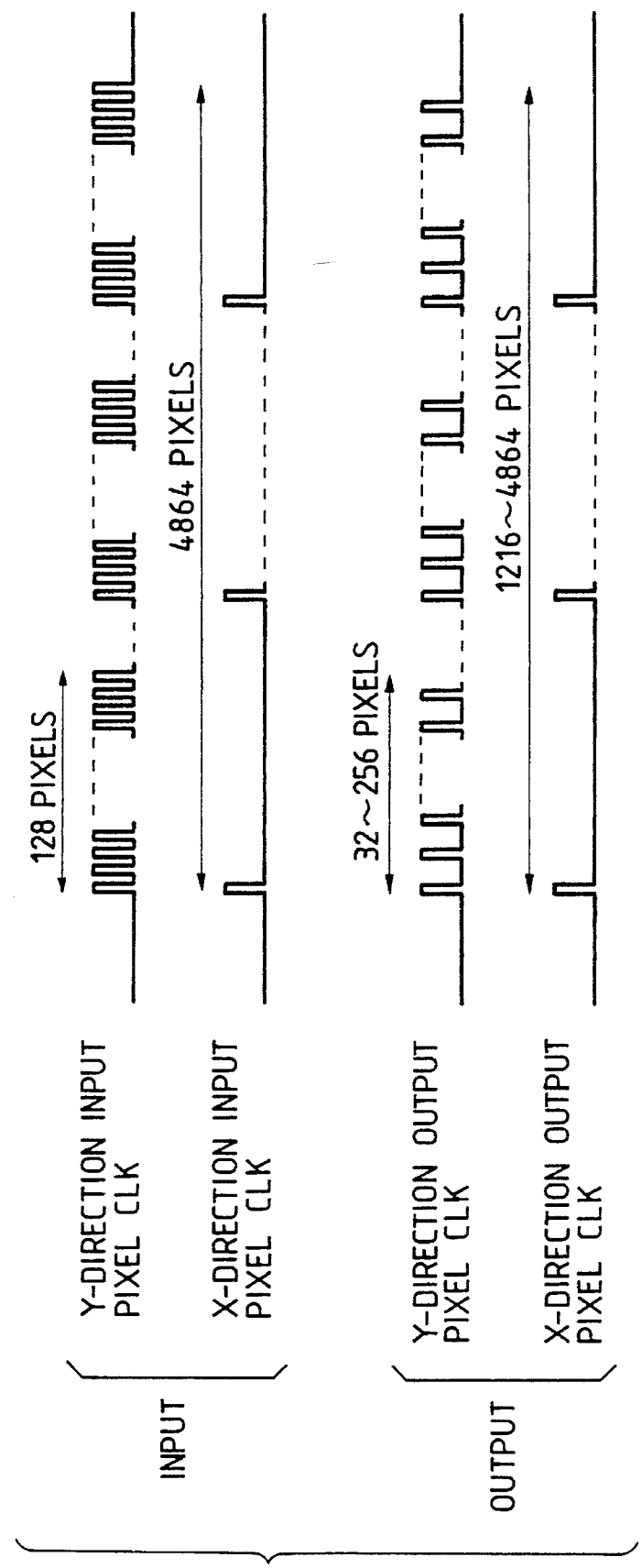
Figures 4, 5, 6:
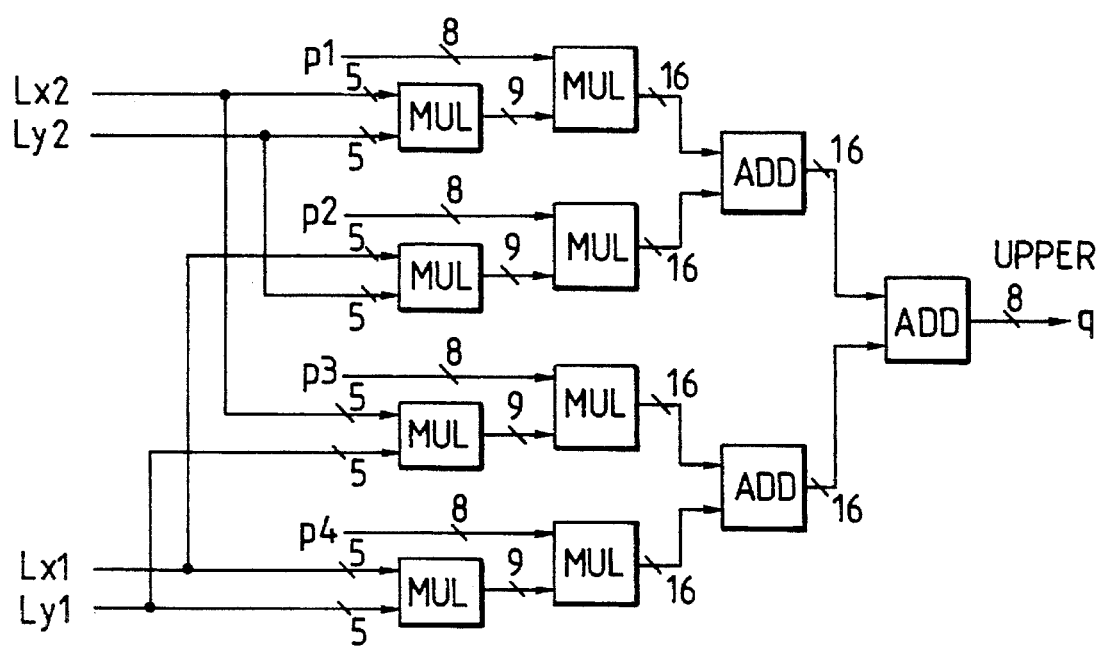
Figures 4, 5, 6, 7:
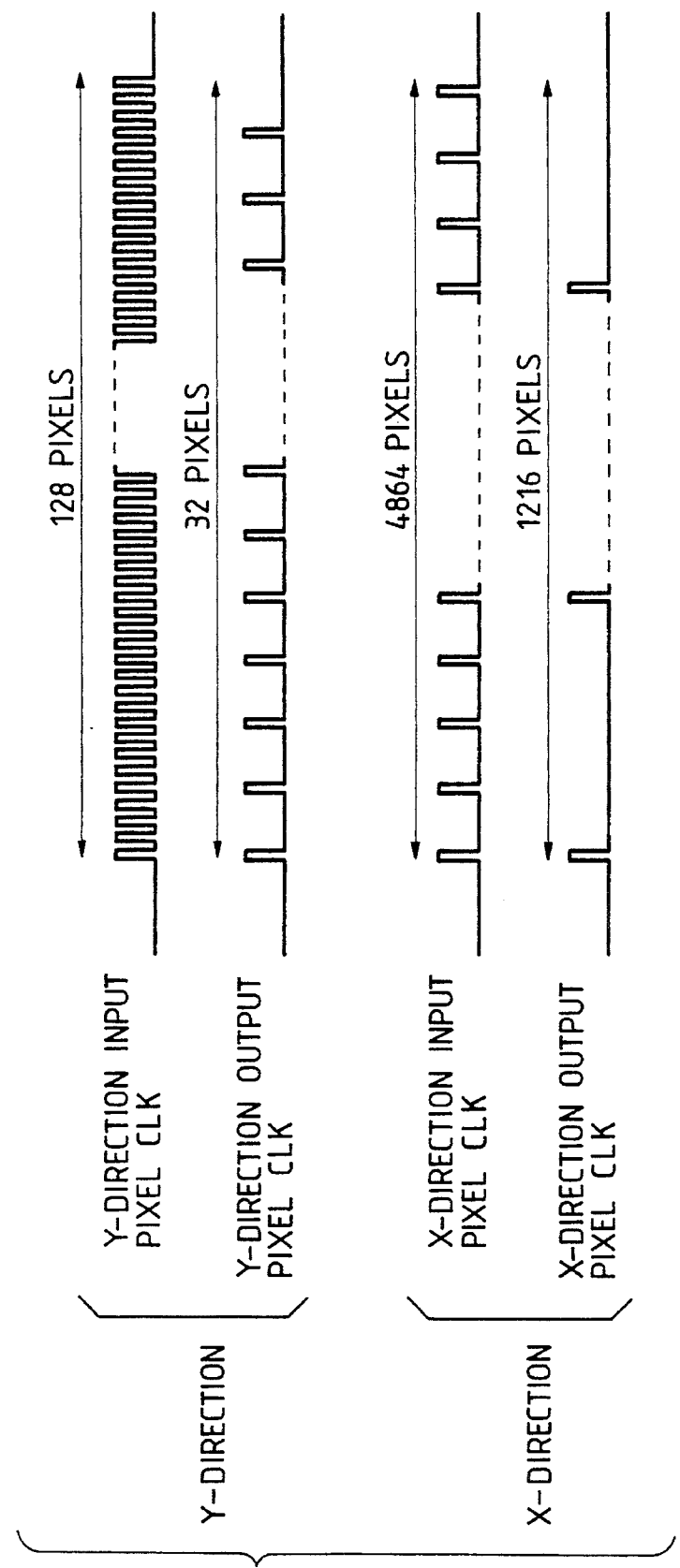
Figures 1, 4, 5, 6, 7:
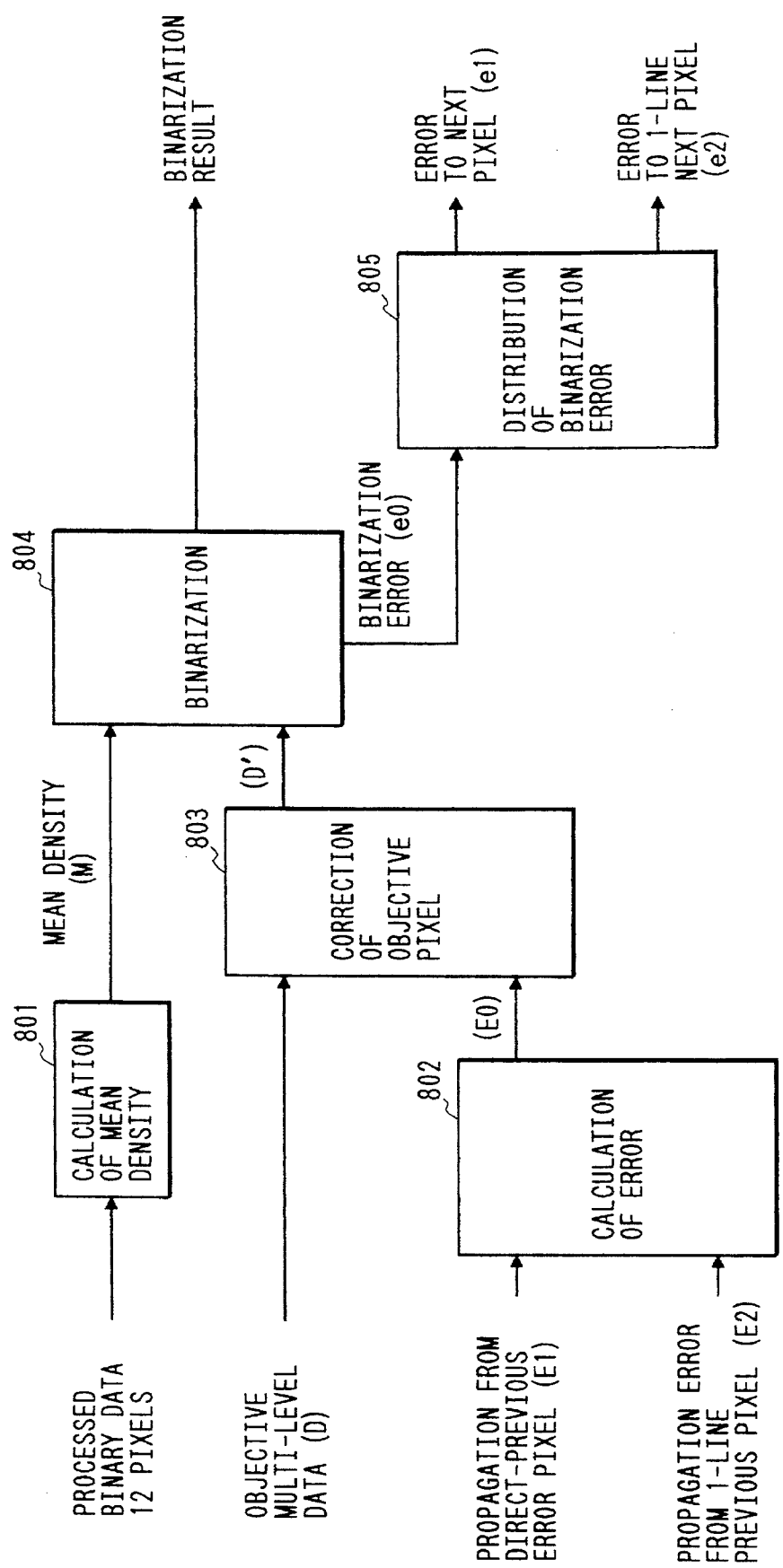
Figures 3, 4, 5, 6, 7:
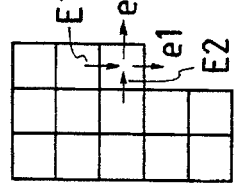
Figures 2, 4, 5, 6, 7:
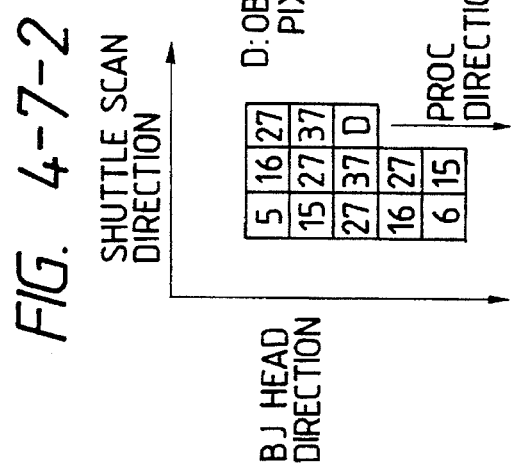
Figures 4, 5, 6, 6A, 7:
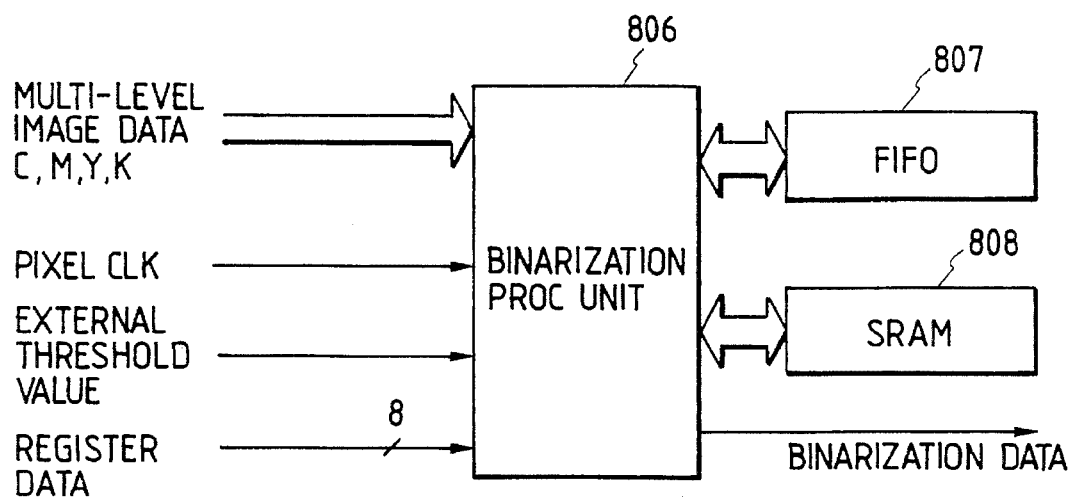
Figures 4, 5, 6, 6B, 7:
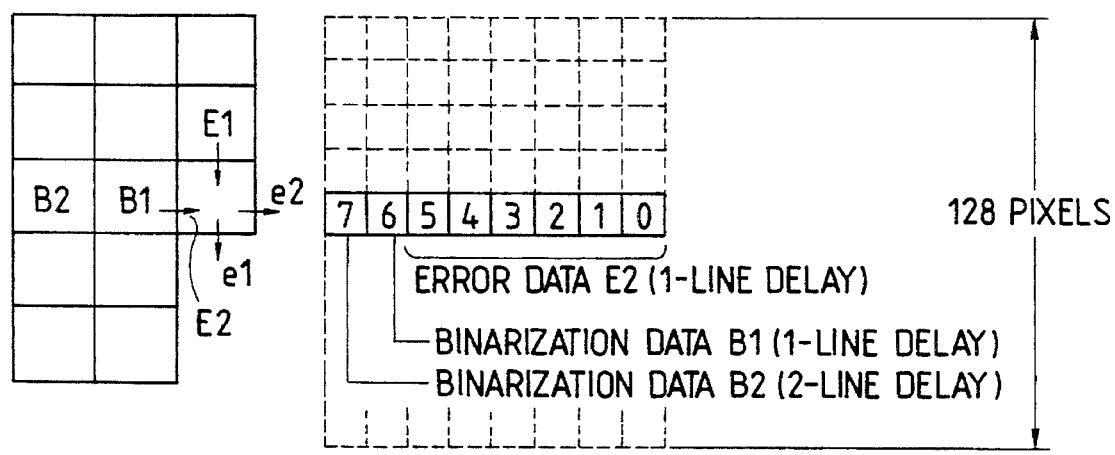
Figures 4, 5, 6, 7:
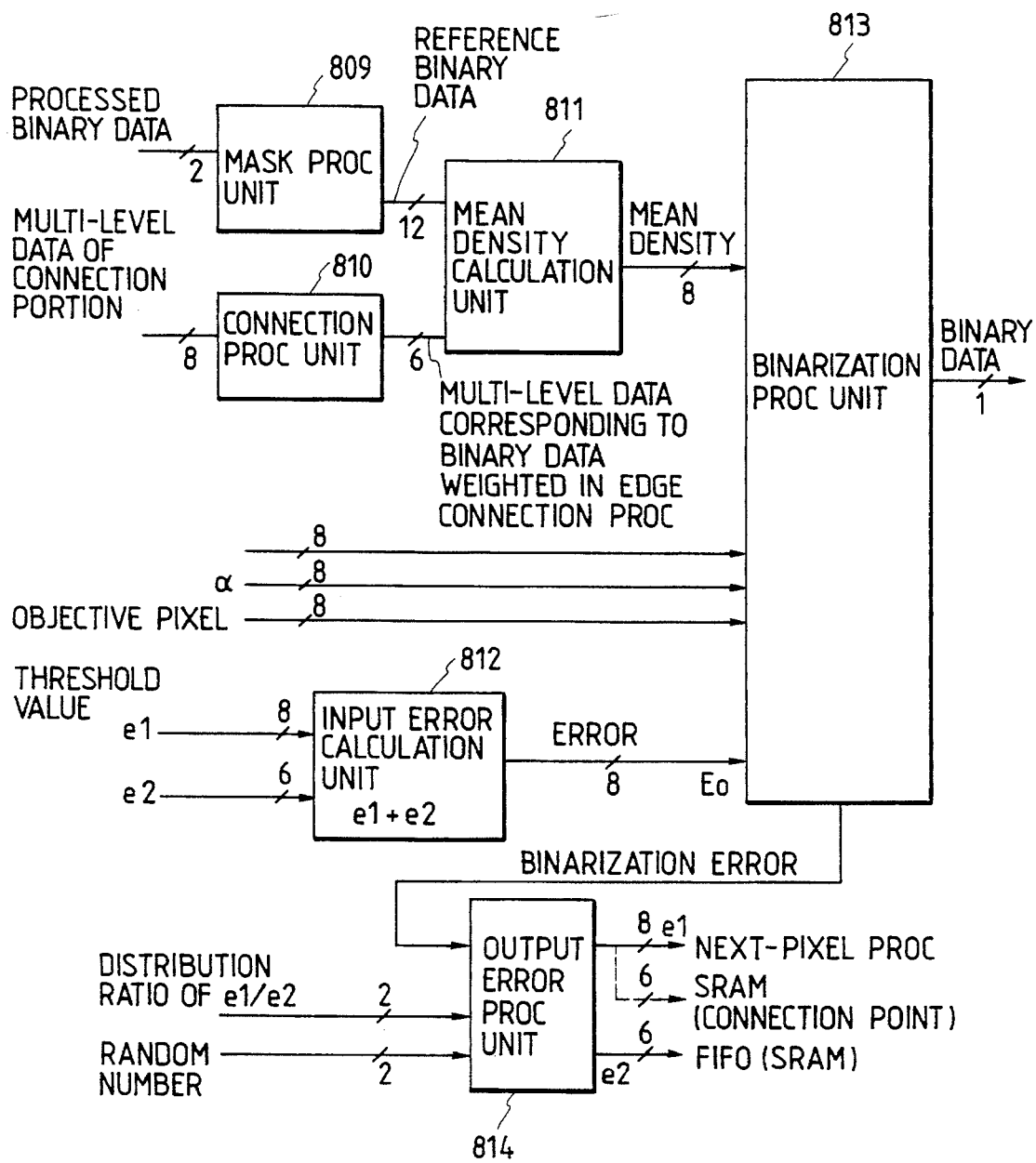
Figures 4, 5, 6, 7, 8A:
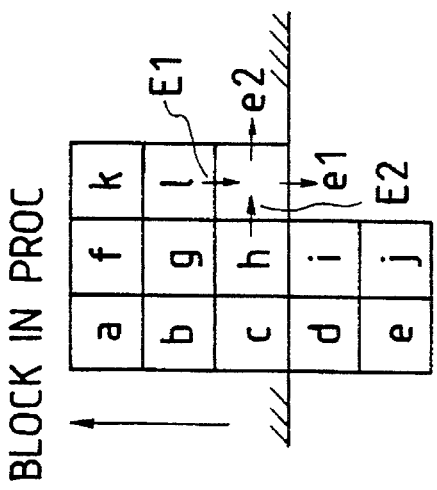
Figures 4, 5, 6, 7, 8B:
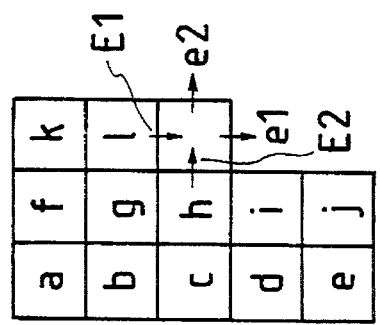
Figures 4, 5, 6, 7, 8C:
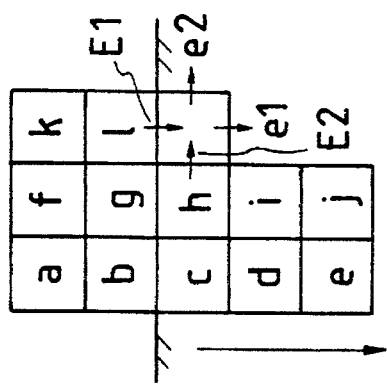
Figures 1, 4, 5, 6, 7, 8:
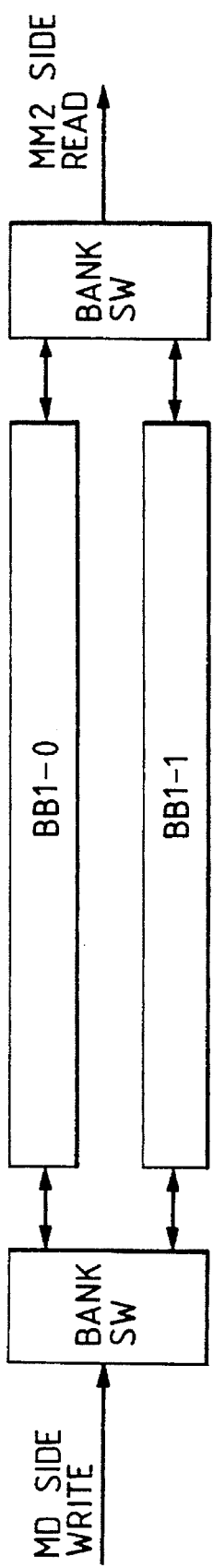
Figures 2, 4, 5, 6, 7, 8:
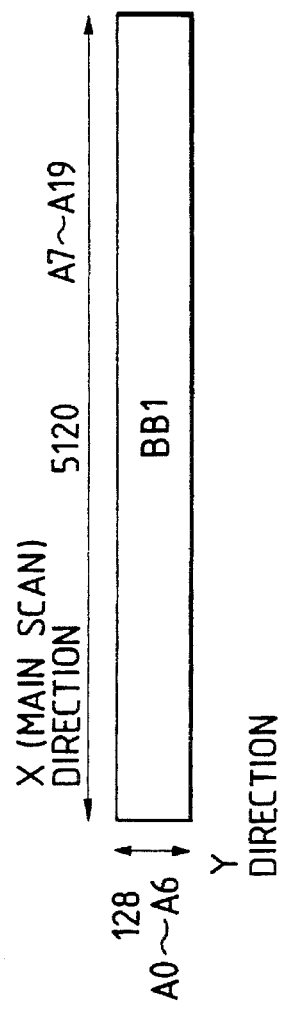
Figures 3, 4, 5, 6, 7, 8:
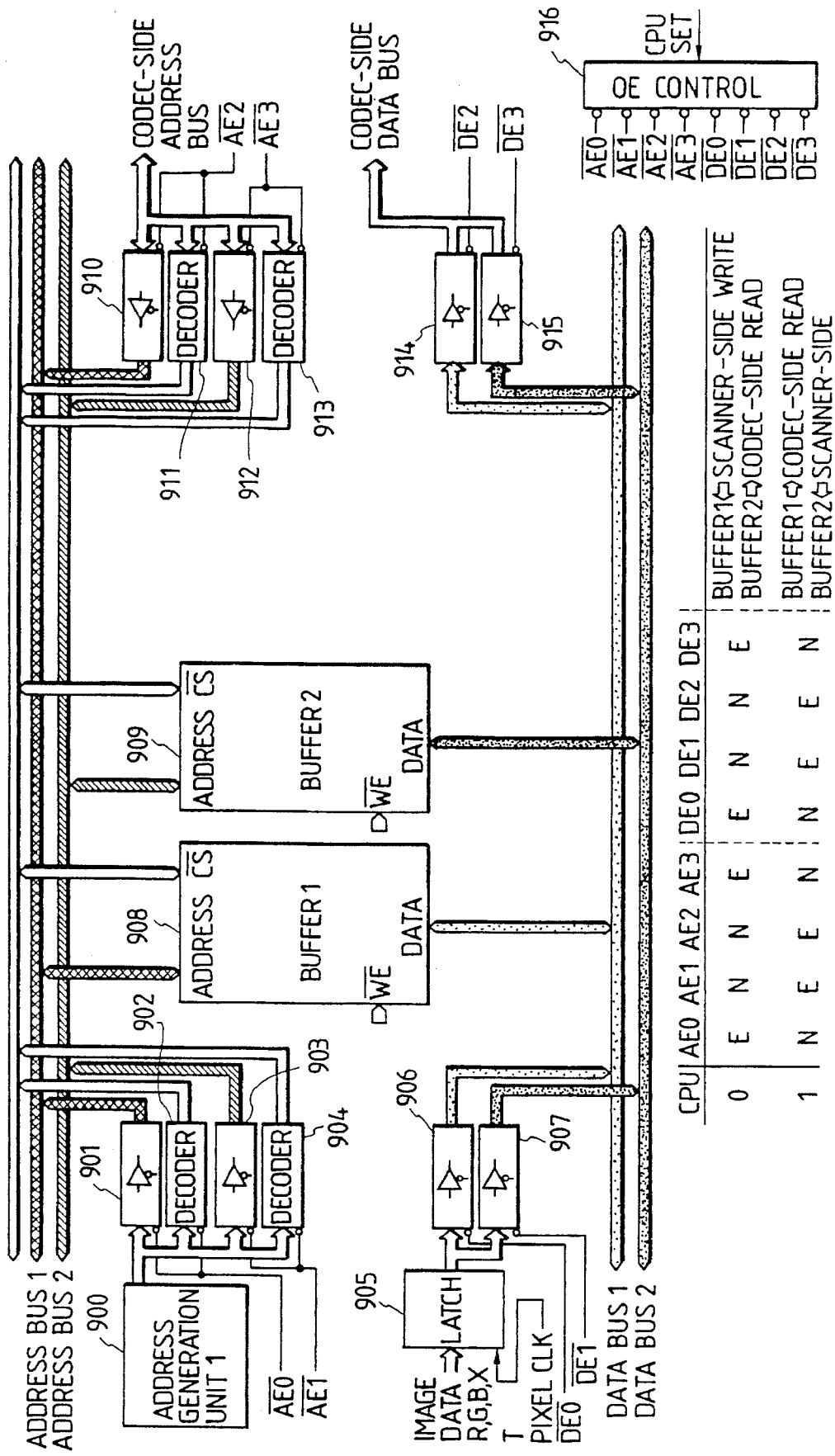
Figures 4, 5, 6, 7, 8:
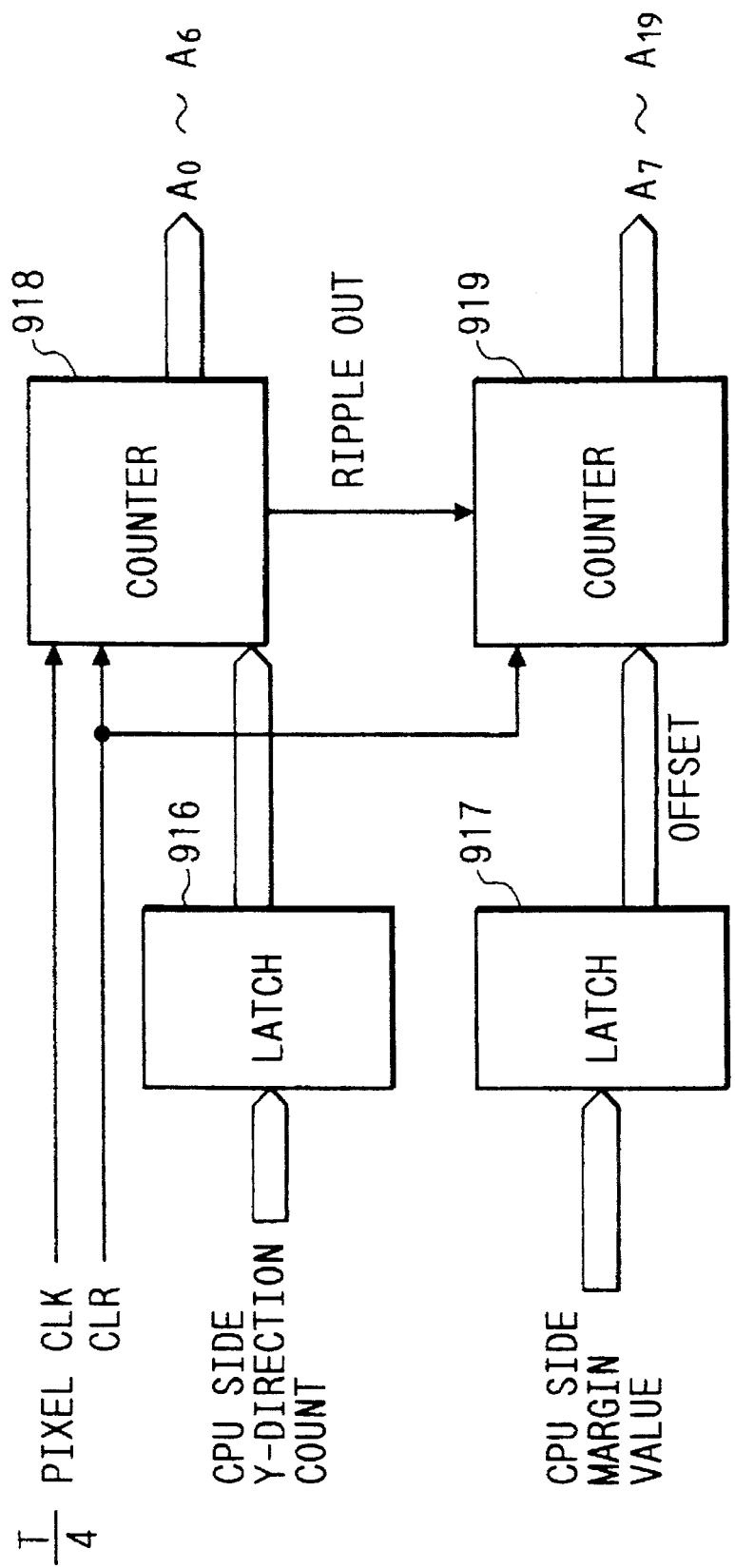
Figures 4, 5, 6, 7, 8:
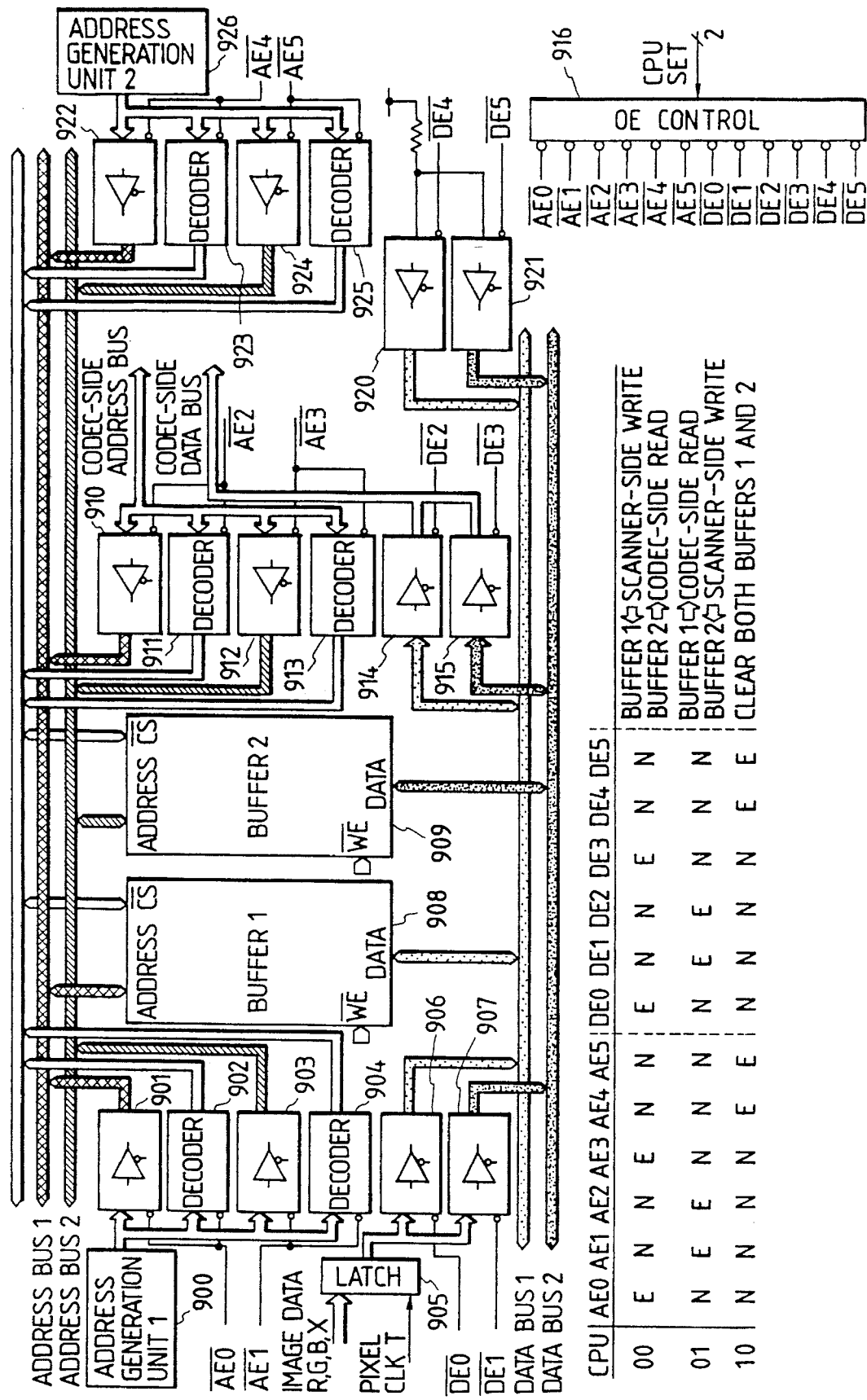
Figures 4, 5, 6, 7, 8:
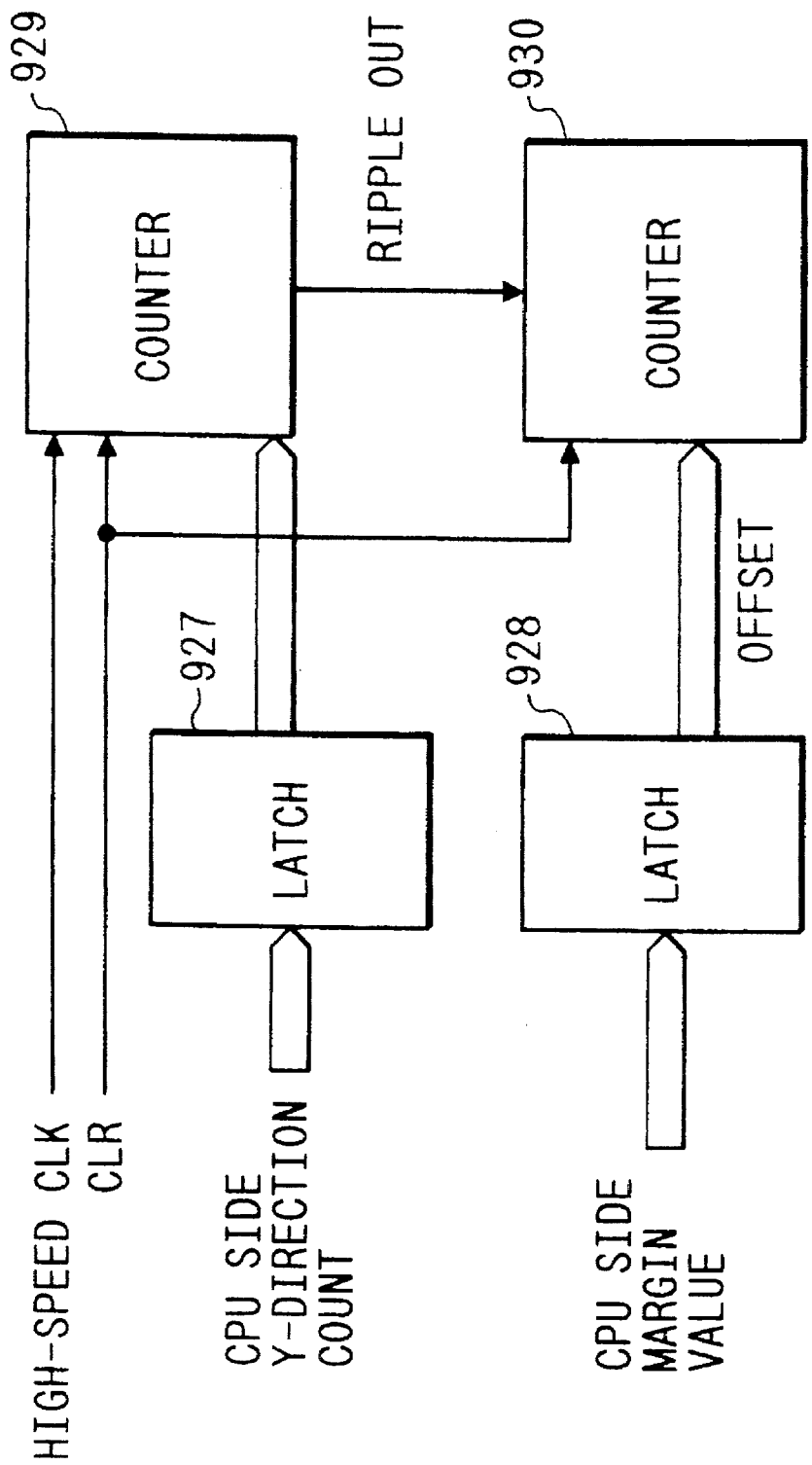
Figures 4, 5, 6, 7, 8:
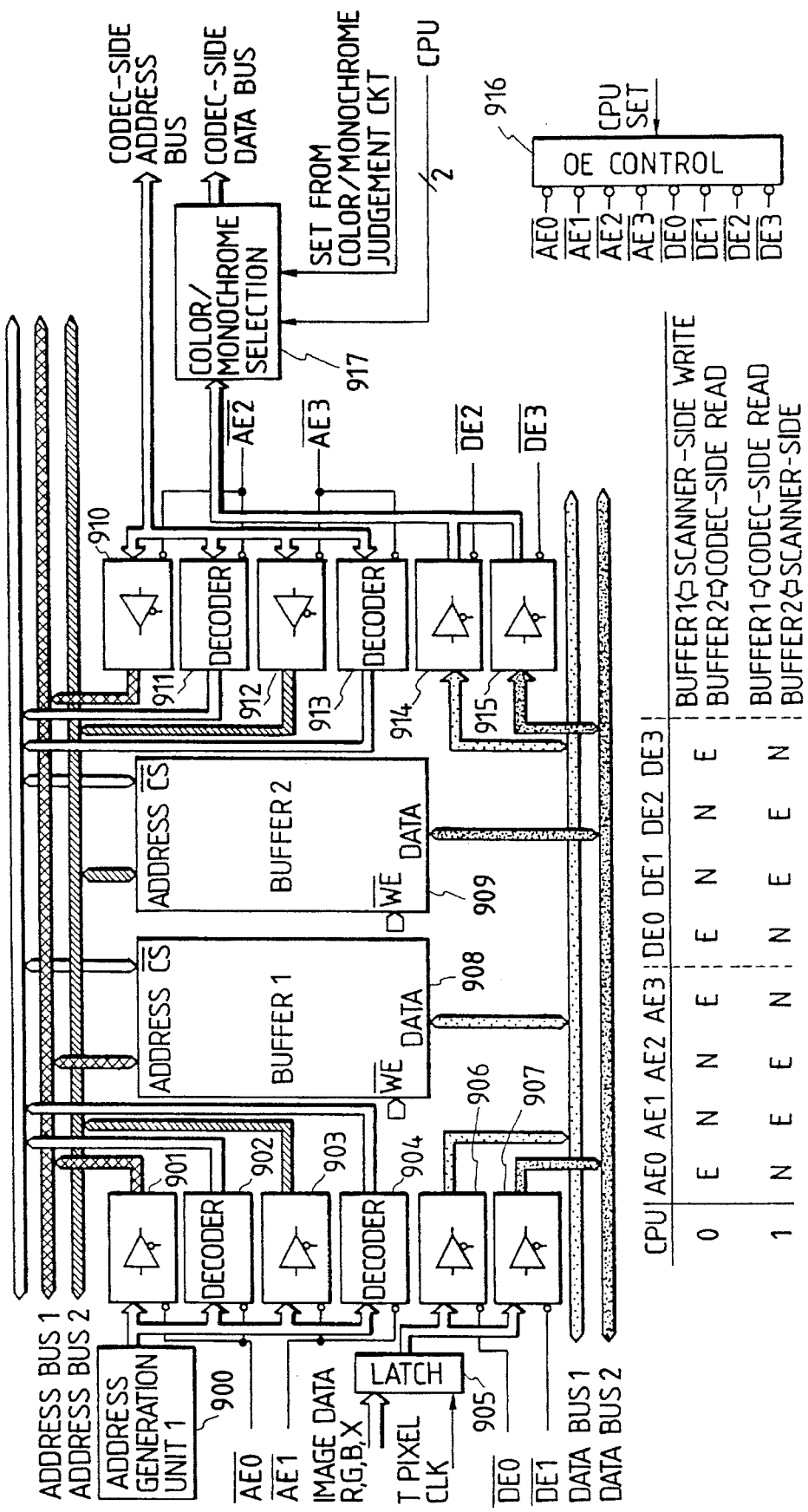
Figures 4, 5, 6, 7, 8, 9:
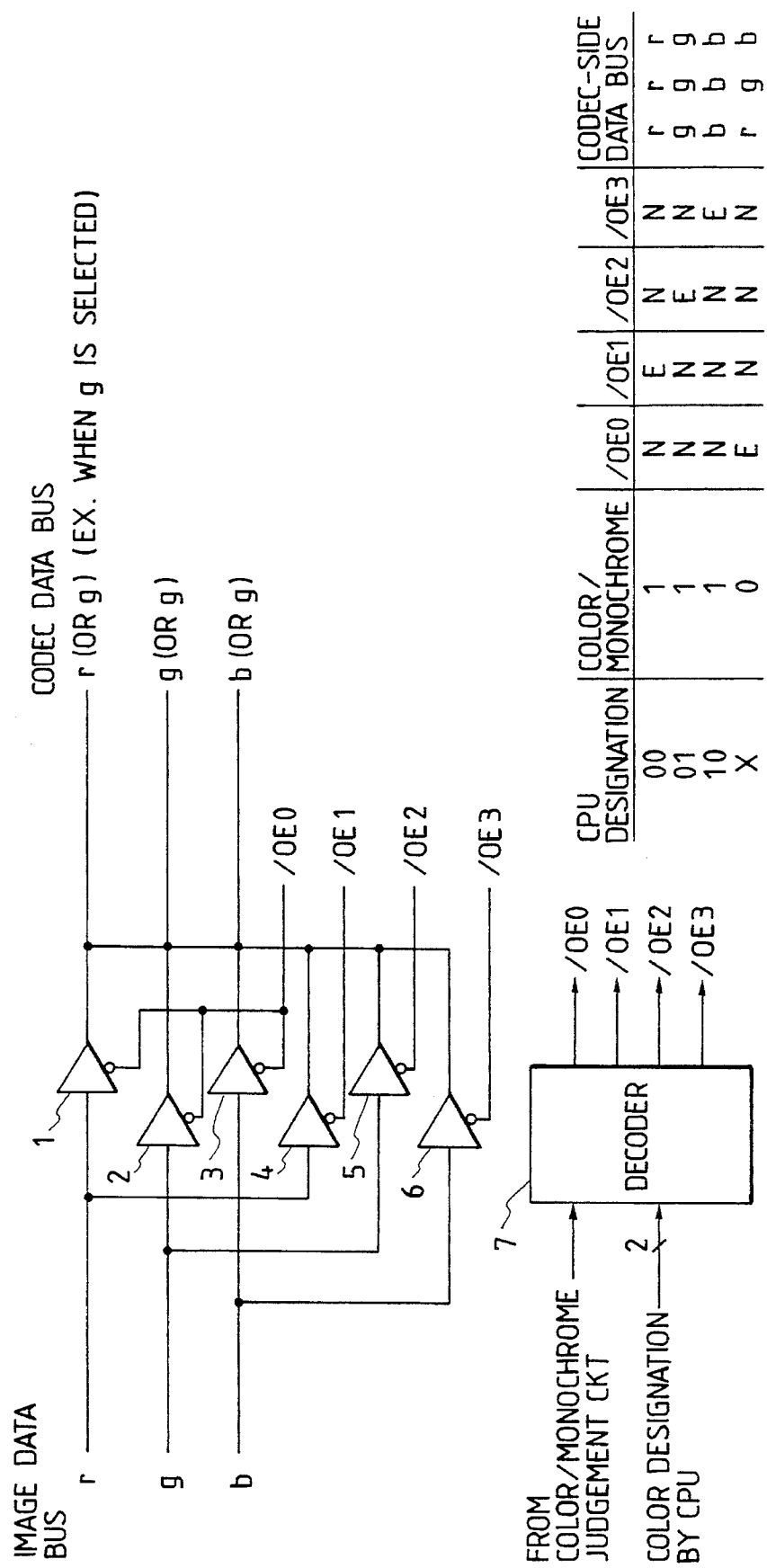
Figures 1, 4, 5, 6, 7, 8, 9:
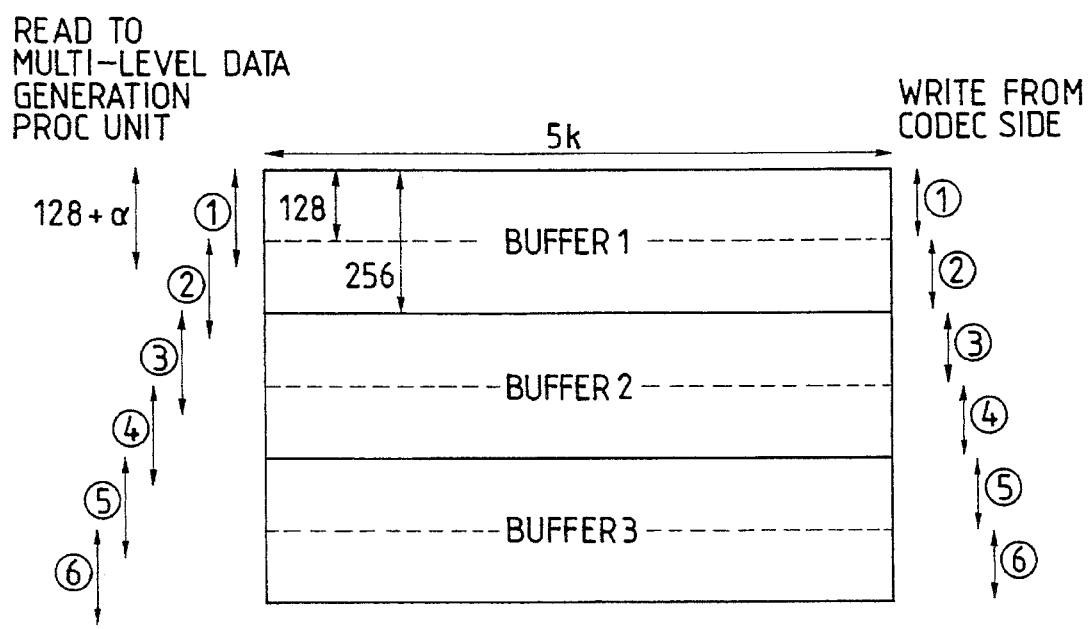
Figures 2, 4, 5, 6, 7, 8, 9:
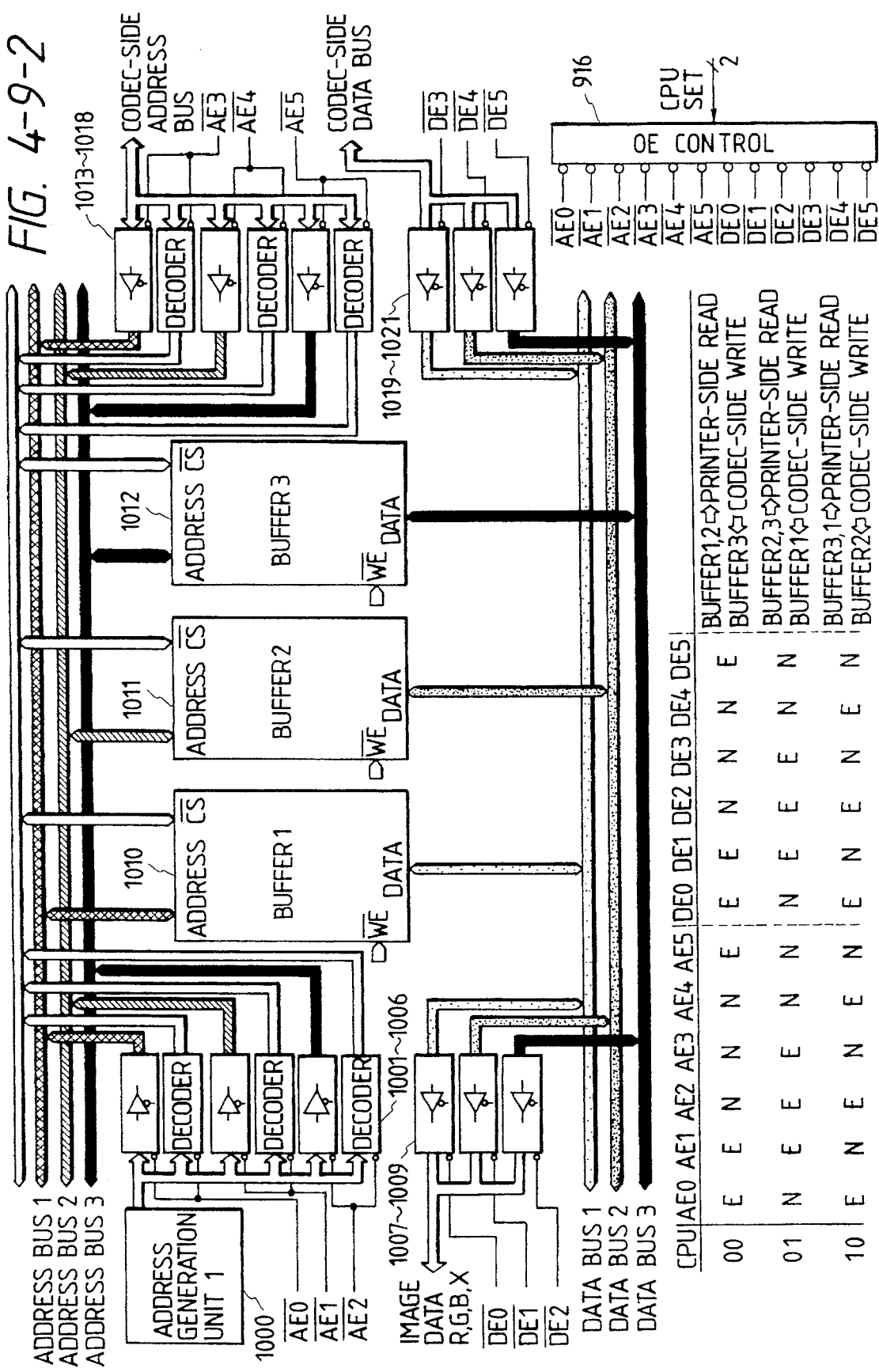
Figures 2, 4, 5, 6, 7, 8, 9, 10:
Figures 3, 4, 5, 6, 7, 8, 9, 10:
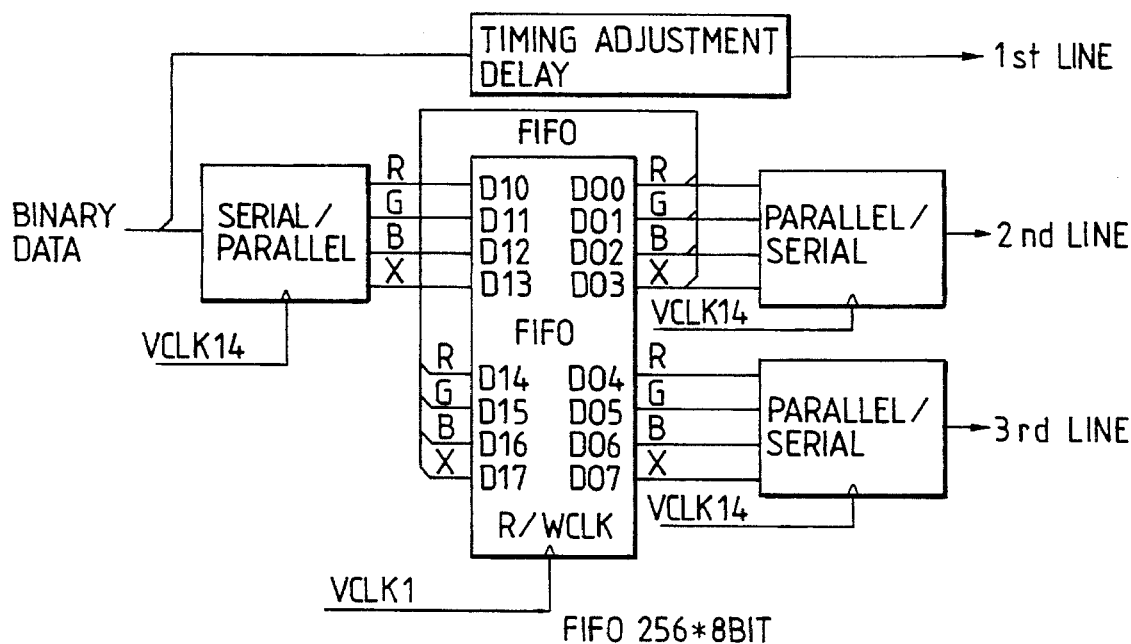
Figures 4, 5, 6, 7, 8, 9, 10:
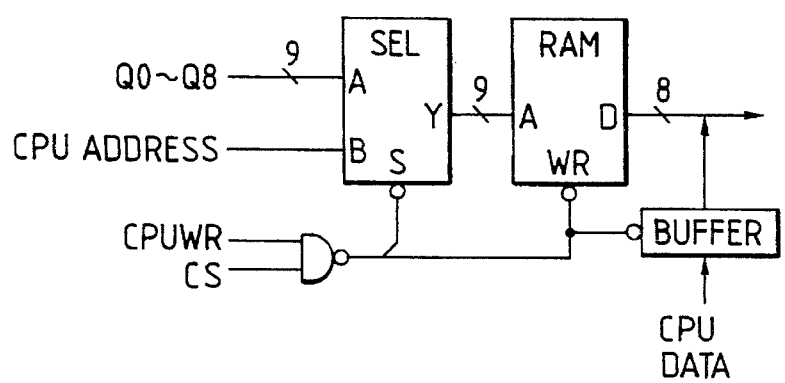
Figures 4, 5, 6, 7, 8, 9, 10:
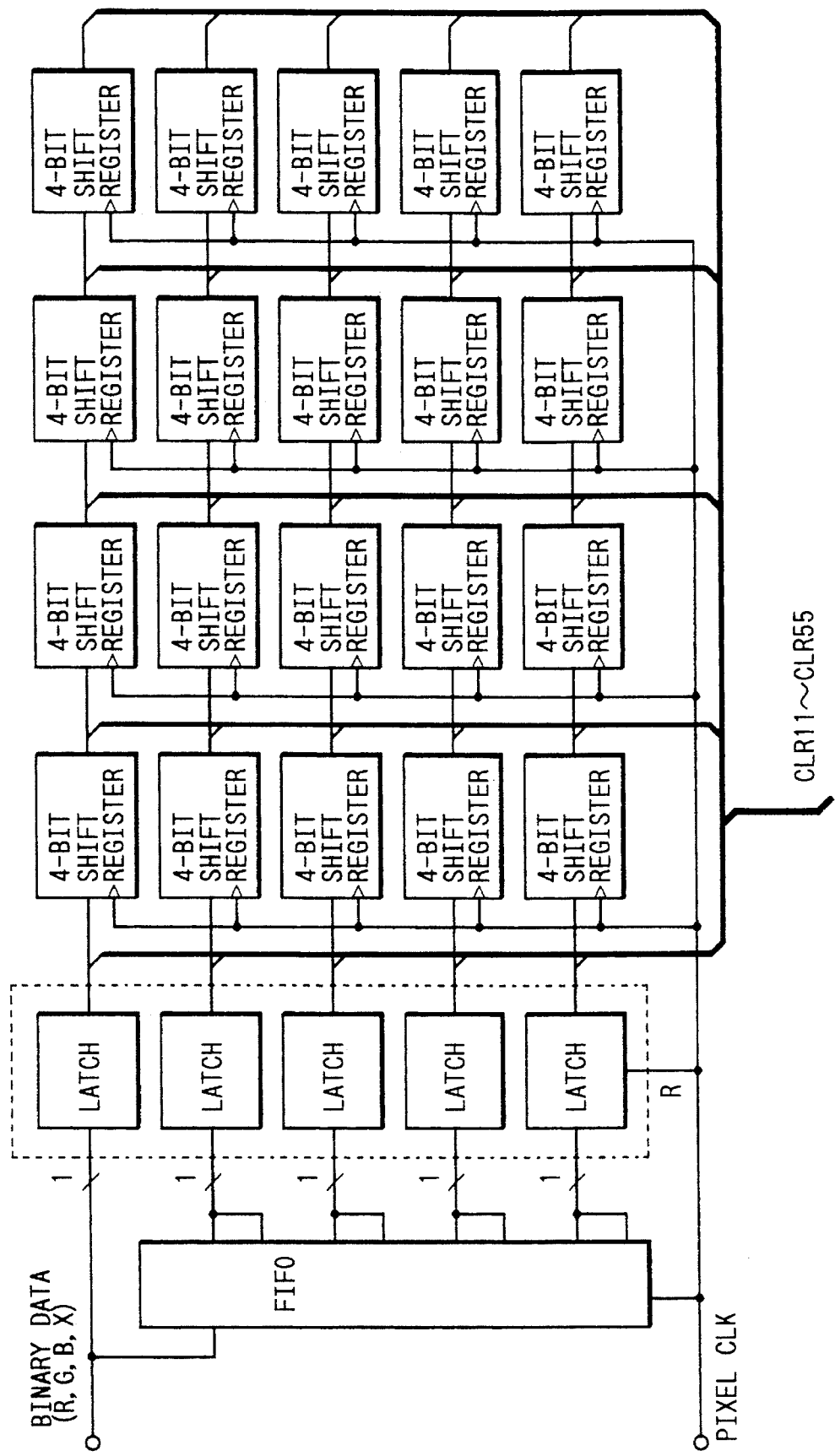
Figures 4, 5, 6, 7, 8, 9, 10:
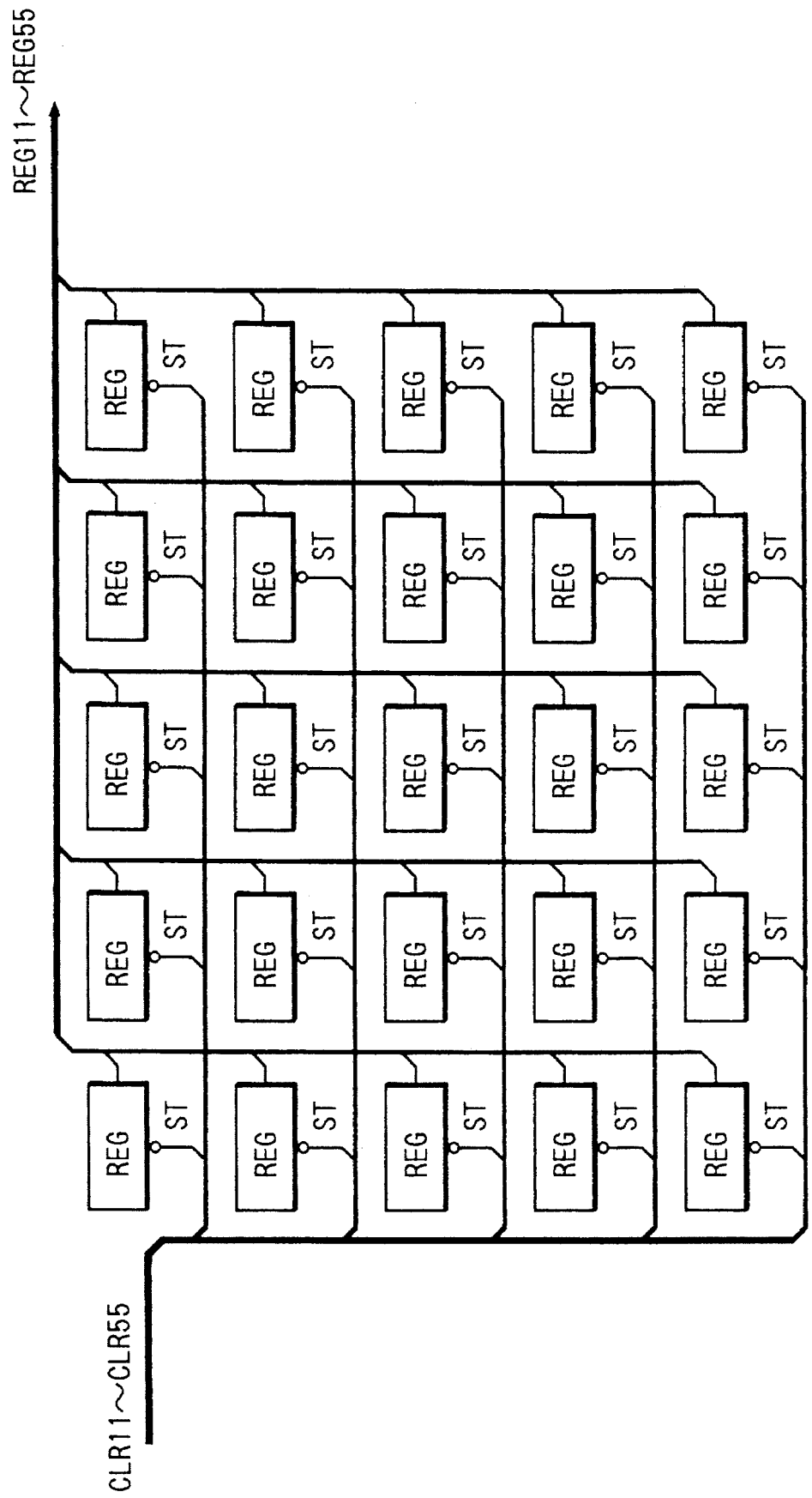
Figures 4, 5, 6, 7, 8, 9, 10:
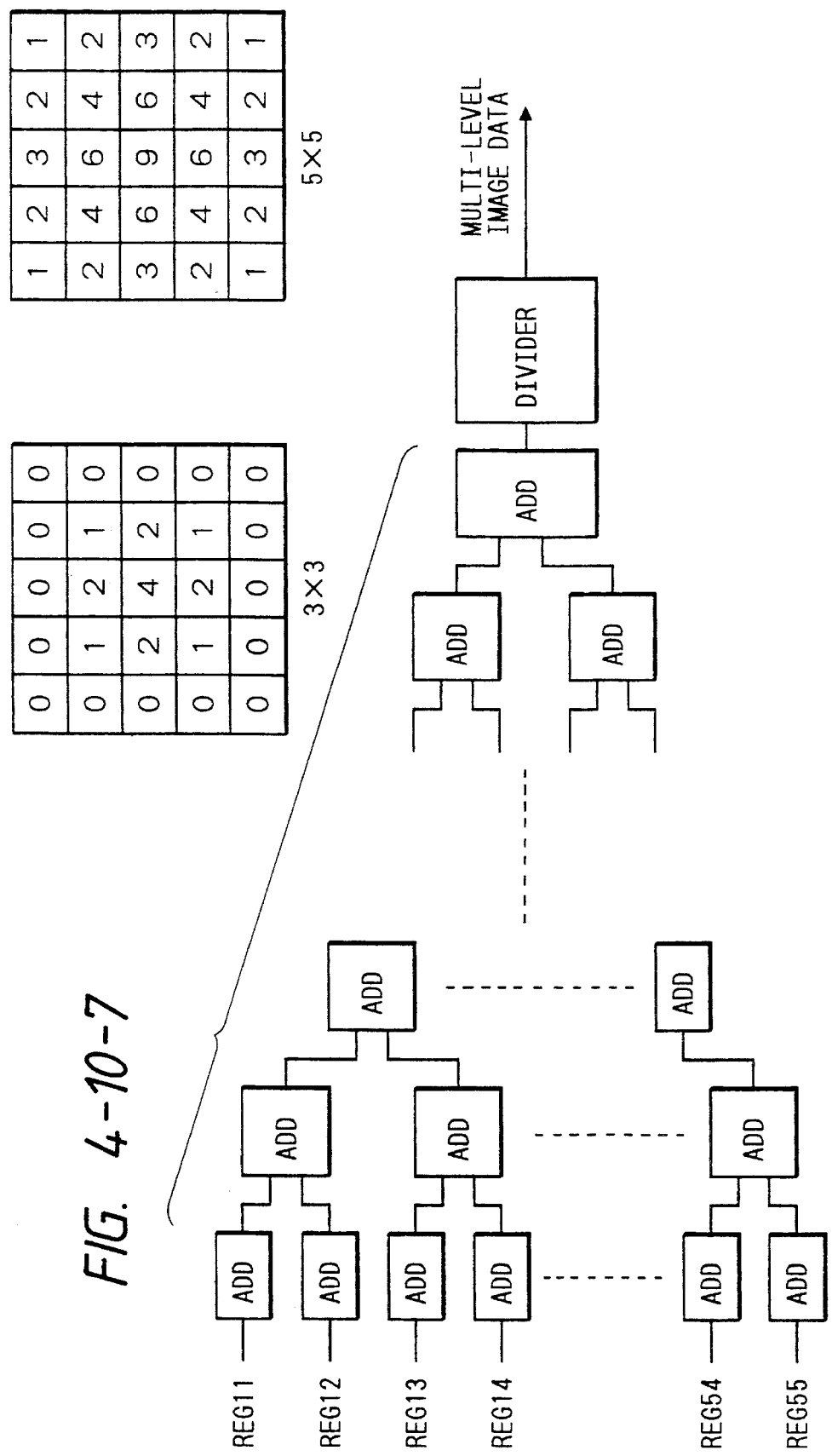
Figures 4, 5, 6, 7, 8, 9, 10:
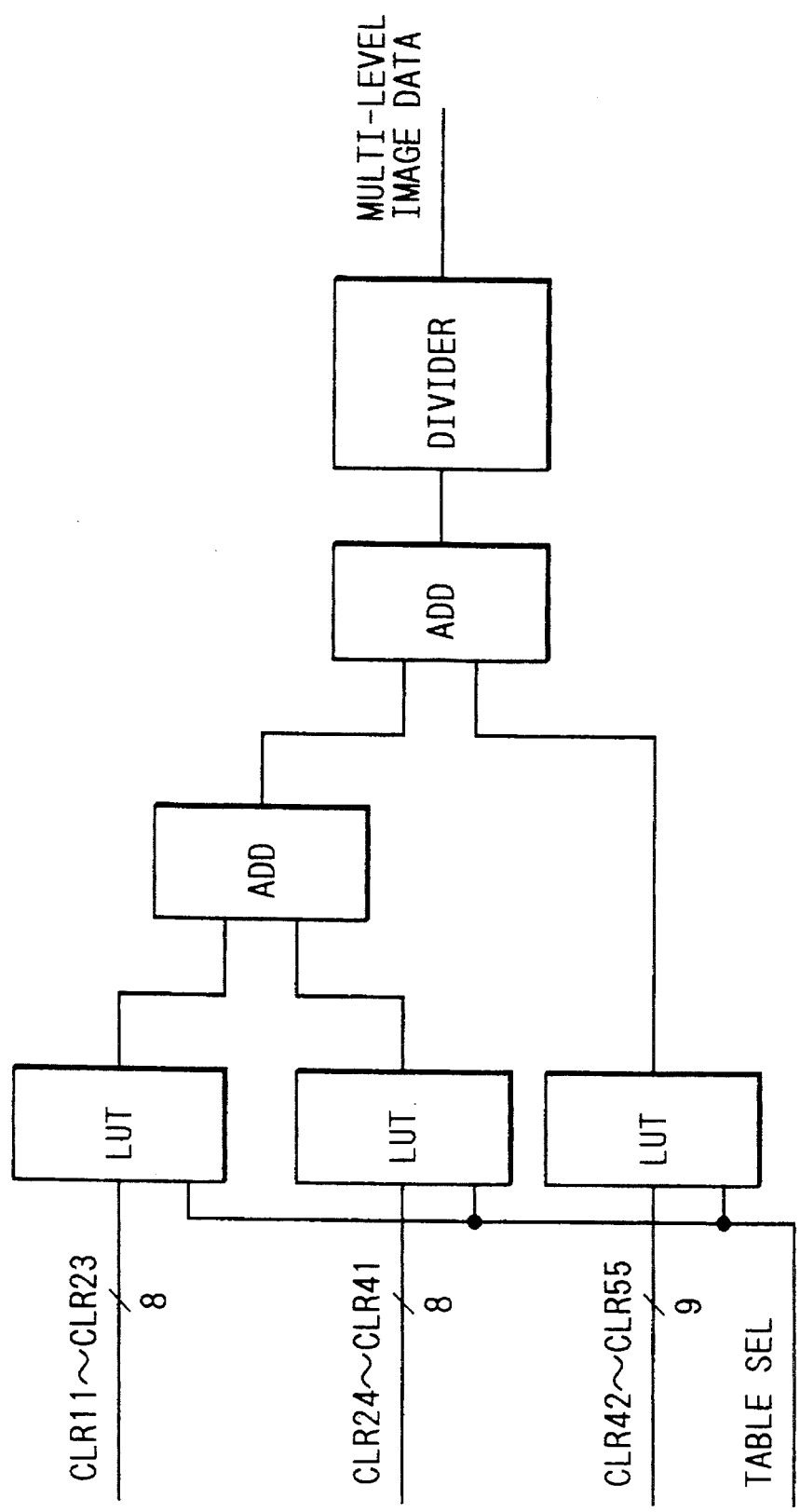
Figures 1, 4, 5, 6, 7, 8, 9, 10, 11:
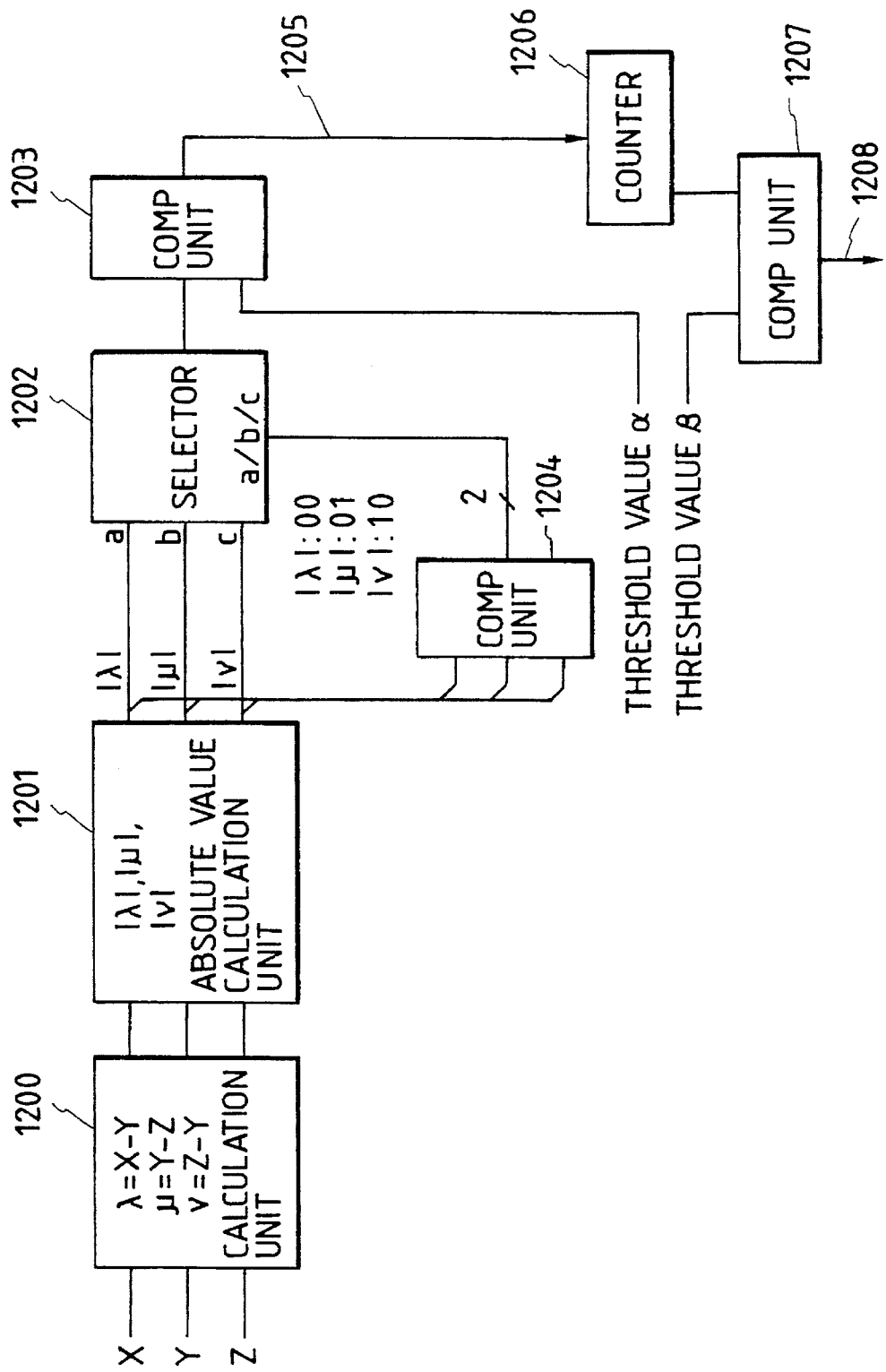
Figures 2, 4, 5, 6, 7, 8, 9, 10, 11:
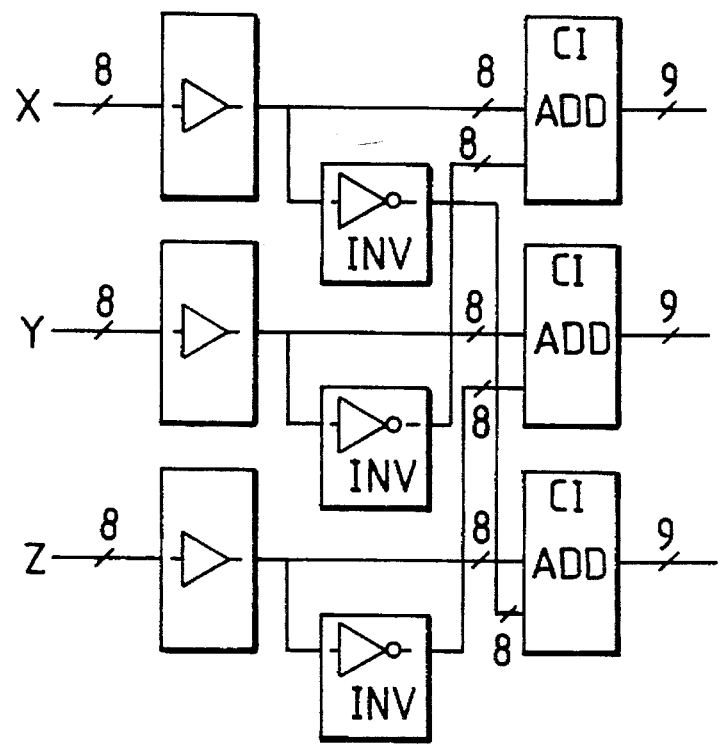
Figures 3A, 4, 5, 6, 7, 8, 9, 10, 11:
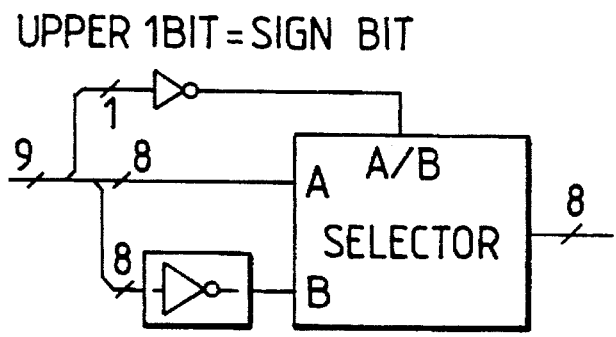
Figures 3B, 4, 5, 6, 7, 8, 9, 10, 11:
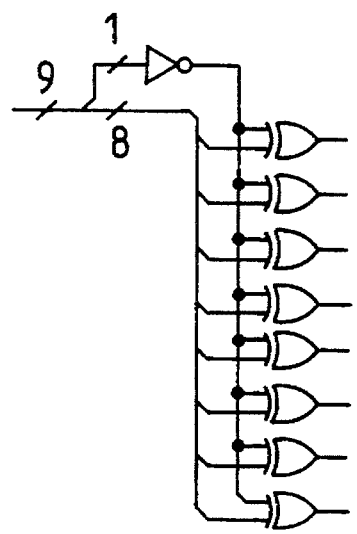
Figures 4, 5, 6, 7, 8, 9, 10, 11:
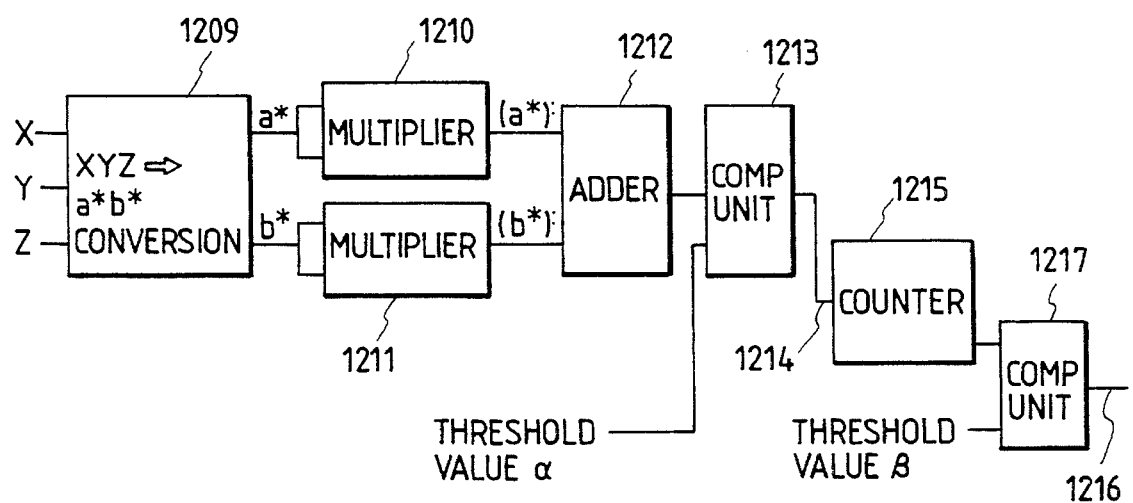
Figures 1, 4, 5, 6, 7, 8, 9, 10, 11, 12:
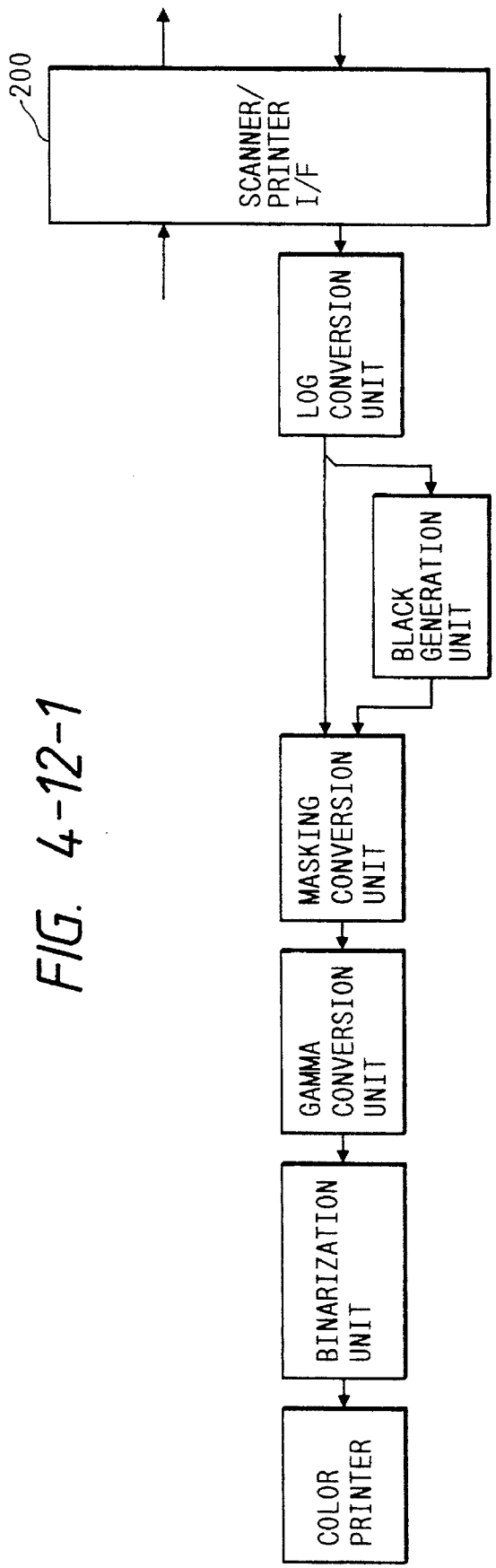
Figures 2, 4, 5, 6, 7, 8, 9, 10, 11, 12:
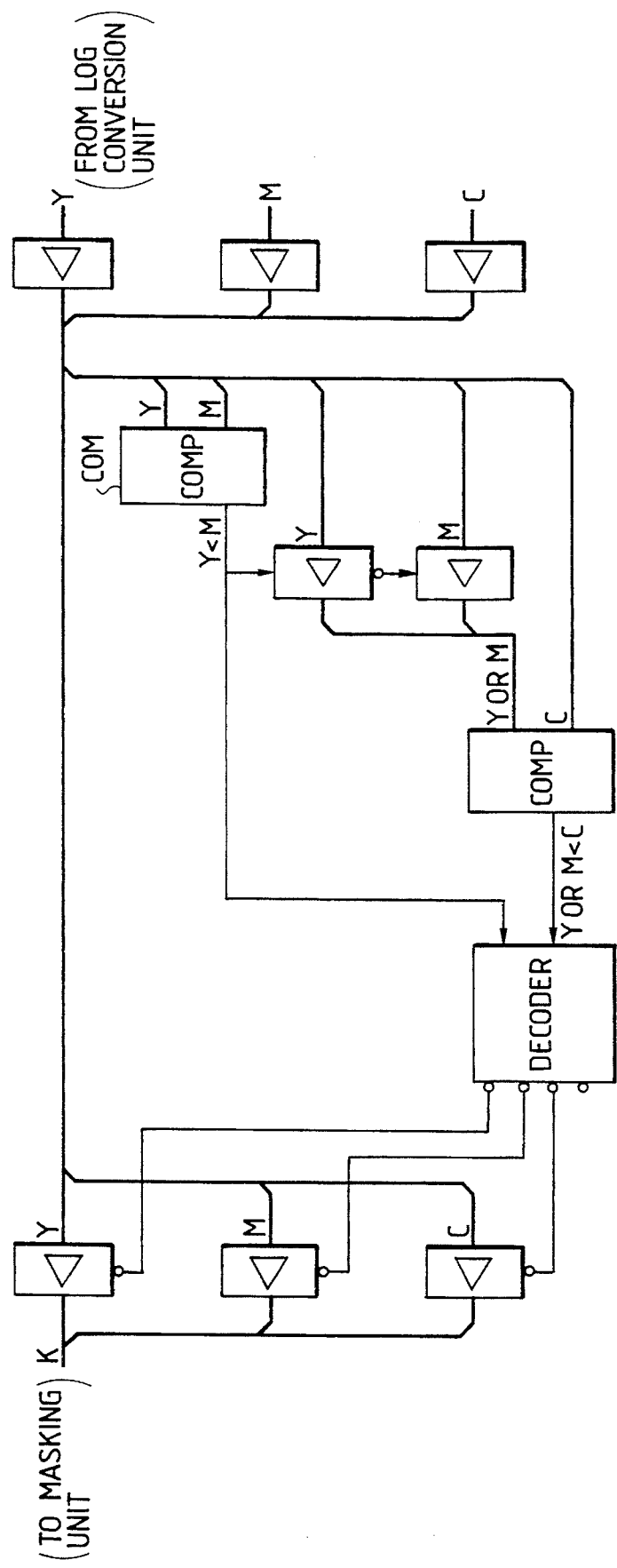

FIG. 4-6-4 shows the structure.

Kx and Ky are inter-pixel distances after conversion and are calculated by the CPU from magnifications Zx and Zy in X and Y directions after equation (4-6-3).

Designated at 700 and 701 are respectively X and Y direction output pixel counters fop calculating X and Y direction pixel clocks after conversion to provide indeces Ix and Iy indicative of the order number of pixel under processing. Thus, when multiplification is done by ¼ in Y direction, with an input consisting of 128 pixels the output consists of 32 pixels. If the multiplification is by 2, the output consists of 256 pixels. With the shuttle scan in this structure (see 3-5 Shuttle scan format), X and Y direction pixel clocks are related as shown in FIG. 4-6-5.

Designated at 702 and 703 are edge calculation units for calculating Lx1, Lx2, Ly1 and Ly2 in X and Y directions from Ix, Iy, Kx and Ky after equations (4-6-4) to (4-6-9).

Designated at 704 is a one-line buffer for storing one-line-delayed image data necessary for processing. The one-line buffer is constituted by a FIFO memory.

Designated at 705 is an interpolation pixel calculation unit fop calculating output image data q from Lx1, Lx2, Ly1 and Ly2 from the edge calculation unit and input image data p1 to p4. An example of the interpolation pixel calculation unit is shown in FIG. 4-6-6.

The structure shown in FIG. 4-6-6 implements equation (4-6-2) with multipliers MUL and adders ADD.

Operation

Operation will be described with reference to FIG. 4-6-7.

The inter-pixel distances Kx and Ky after interpolation are obtained form magnification factors preset on the opertion panel or magnification factors Zx and Zy for matching paper size capable of being dealt by the destination facsimile. These data are provided from a CPU (not shown).

A case of a magnification factor of ¼ is taken.

Data is stored in one-line buffer 704 in synchronism to Y direction input pixel clock for 128 pixels. At this time, no output picel clock is generated. It is assumed that counters 700 and 701 are reset to zero in advance.

Index Ly is increased from 1 to 32 until 32 Y direction output pixels are provided, and Y direction edge calculation unit 703 calculates Ly1 and Ly2 from each value of Iy. At this time, the count of the X direction pixel counter, and hence X direction index Lx, remains zero, and Lx1 and Lx2 from X direction edge calculation unit 702 are not changed. When processing of Y direction one line 32 pixels (the input being 128 pixels) is ended, X direction pixel clock is provided to change Lx to 1, and the same operation is repeated.

Interpolation pixel calculation unit provides interpolation result from the calculated values of Lx1, Lx2, Ly1 and Ly2 and input pixel data p1 to p4.

Binarization Section

For binarization of multi-level image data, a threshold value of binarization has to be determined. In the mean density preservation method, the mean image density in the neighborhood of a pixel to be binarized (hereinafter referred to as objective pixel) is used as threshold value. The mean image density in the neighborhood of the objective pixel is obtained by weighting already obtained binary image data in a predetermined window. The multi-level data of the objective pixel is binarized by using the threshold value obtained in this way. To preserve the density of the original image at this time, the error after binarization is distributed to non-processed neighboring pixels. Thus, at the time of binarization, the objective pixel is corrected with propagation errors from neighboring pixels before comparison to the threshold value.

This concept is shown in a block form in FIG. 4-7-1. More specifically, section 801 for "calculation of mean density" provides 12 pixels of already obtained binary data with weights as shown in FIG. 4-7-2 and takes the sum of the weighted data to obtain mean density M serving as threshold value with respect to objective pixel D. The sum weight is 255. Further, for preserving the density at the time of binarization, section 802 for "calculatioin of error" adds together binarization errors E1 and E2 of the immediately preceding pixel and a pixel in the preceding line to obtain propagation error EO.

Then section 803 for "conversion of objective pixel" adds multi-level data D of the objective pixel and propagation error EO to obtain objective pixel density D' after correction.

Subsequently, section 804 for "binarization" compares objective pixel density D' after correction and mean density M. The resut of binarization is set such that B=1 when D'-M≧0 and B=0 when D'-M<0. Binarization error e0 is delivered to section 805 for "distribution of binarization error". Section 805 distributes binarization error e0 as error e1 to the immediately succeeding pixel and as error e2 to the pixel after one line.

The ratio of distribution (i.e., error division ratio) is selected from (½, ½), (⅜, ⅝) and (¼, ¾) (FIG. 4-7-3). Further, it is possible to improve the texture of highlight portion by randomly switching the allotting of division errors e1 and e2 according to random data.

A specific example is shown below. It is assumed that the density of an objective pixel to be processed is 100 and that the result of binarization of processed pixel is as shown in FIG. 4-7-4A. By multiplying the result of binarization by weighting factors shown in FIG. 4-7-2 and taking the Sum, the mean density M is determined to be 154. If propagation error E1 from the preceding pixel is −30 and propagation error E2 from the preceding line is +20 as shown in FIG. 4-7-4B, objective pixel density D' after correction is 90. When D' is binarized by using the mean density (M=154) as threshold value, the result of binarization is zero, and propagation error is −64. When the error is distributed as e1 and e2 evenly, i.e., by one-half each, e1=e2=−32 (FIG. 4-7-4C).

When processing the end of the shuttle scan block and the immediately preceding pixel, there is no binary data already obtained for determining the mean density. Accordingly, non-processed multi-level data is weighted to an extent corresponding to FIG. 4-7-2 for using the result as binary data. This is referred to as "rear connection" or "end connection" (FIG. 4-7-5A).

To simplify the processing, the weighting factors are slightly altered. FIG. 4-7-5B shows the weighting factors. In this case, an overflow is liable when the mean density is calculated. In such a case, the mean density is clipped to 255. By so doing, there arises no problem in practice.

FIG. 4-7-6A shows the overall structure of the binarization section. Designated at 806 is a binarization processing unit, which has an inner structure as shown in FIG. 4-7-7. Designated at 807 is a FIFO memory used for preserving binarized error E2. FIG. 4-7-6B shows the bit structure of this memory. As shown of 18-bit data upper 12 bits are used for binary data ("1" or "0") a couple of lines before, and lower 6 bits are used for binarization error E2 from the pixel one line before.

Designated at 808 is a SRAM which is used for connection processing at the time of shuttle scan. The SRAM has a bit structure as shown in FIG. 4-7-6C. As shown, of 8-bit data upper 2 bits are used for binary data ("1" or "0") of the end of the preceding block and immediately preceding pixel.

FIG. 4-7-7 shows the inner processing circuit. Designated at 809 is a mask pprocessing unit for producing 12-bit mask data by shifting binary data after one- and two-line delay processing and immediately preceding processed data. Designated at 810 is a connection processing unit for rear connection at the end of shuttle scan. The unit calculates a value corresponding to weighted binnary data from multilevel data read in excess of 128 pixels.

Designated at 811 is a mean density calculation unit for calculating the mean density by performing weighting as shown in FIG. 4-7-2. Designated at 812 is an input error calculation unit for calculating propagation error from one-line delay error e2 and one-pixel delay error e1. Designated at 813 is a binarization processing unit for comparing the sum of the objective pixel density and propagation error to the mean density to produce a result of binarization. Designated at 814 is an output error processing unit for dividing the error as a result of binarization in unit 813 into e1 and e2. The unit executes division of diffusion error according to a predetermined distribution ratio.

Now, operation of the binarizing circuit will be described.

Head of Block

At the head of block pixels a, b, f, g, k and l and propagation erro E1 are read out from the SRAM, while pixels c, d, e, h, i and j and propagation error E2 are read out from the FIFO.

Binary data a to l are extracted in the mask processing unit and are weighted in mean density calculation unit 811 as data for a total of 12 pixels, i.e., 12-bit data, to calculate the mean density. Propagation errors E1 and E2 are taken as error E0 of 6 bits in the error calculation unit.

Then, sum D' of the objective pixel density and propagation error E0 is compared to mean density M. The result of binarization is set as B= 1 when D'−M≧0 and B=0 when D'−M<0. Under this condition, binarization error e0=D'−M is divided in the output error processing unit. The division ratio is selected from (½, ½), (⅜, ⅝) and (¼, ¾).

Of the division errors, e2 is tentatively stored in the FIFO, while e1 is immediately used in the next calculation.

Intermediate Part of Block

In the intermediate part of block, all binary data and propagation error E2 are read out from the FIFO, while E1 is obtained from the immediately preceding processing, as shown in FIG. 4-7-8B. Subsequent processing is the same as for the head of block.

End of Block

At the end of block, pixels a, b, c, f, g, h, k and l and propagation error E2 are read out from the FIFO, while E1 is obtained from the immediately preceding processing, as shown in FIG. 4-7-8C. Pixels d, e, i and j are obtained from the connection processing unit. After binarization as noted above, propagation error e1 is written in the SRAM for connection processing.

Block buffer 1 (BB1)

Basic structure of BB1

The block buffer is shown in FIG. 3-3, for instance. This buffer has as a double-buffer structure consisting of two buffers BB1-0 and BB1-1 so that writing from the side of the binarization processing unit and leading from the side of the CODEC can be performed simultaneously (FIG. 4-8-1).

Vertical/horizontal Conversion Function

Since writing is done from the binarization processing unit and reading is done to the CODEC side, the order of pixels is different when writing and when reading. The writing is performed for 128 successive pixels in Y direction. Then, one address is increased in X or main scanning direction, and then writing is done once again for 128 successive pixels in X direction. The reading is performed X or main scanning direction, then an address is increased in Y direction, and then reading is done once again successively for one line in X direction (FIG. 4-8-2). RM clear function (for whiting a margin portion).

The above double-buffer structure will now be described in detail.

Structure Example 1

FIG. 4-8-3 shows Structure example 1.

Designated at 900 is address generation unit 1, which successively increases addresses A0 to A6 and then increases addresses A7 to A19. FIG. 4-8-4 shows an example of address generation unit 1. The address generation unit 1 includes latch 916 for latching output from CPU and latch 917, to which a margin is specified from CPU. Counter 918 counts T/4 pixel clock, and counter 919 counts factors in the auxiliary scanning direction. Returning to FIG. 4-8-3, designated at 901, 903, 906 and 907 are buffers for selecting, according to control signals AE0, AE1, DE0 and DE1, either one of the two buffers, to which address and data are to be provided. Designated at 902 and 904 are decoders for providing a chip select signal to a buffer to be selected according to address from address generation unit 1 900 and control signals AE0 and AE1. AE0 to DE3 are provided from OE controller 916 according to output (either "0" or "1") from CPU. Designated at 908 and 909 are buffer memories. In this example, SRAMs are used for the buffer memories, but it is also possible to use DRAMs. In the latter case, however, control signals (such as RAS, CAS, REFLESH) for the DRAMs are necessary.

Designated at 901,912, 914 and 915 are buffers for selecting, according to control signals AE2, AE3, DE2 and DE3, either one of the two buffers, to which address is to be provided, and either one of the two buffers, into which data is to be read. The address at this time is provided form the CODEC side. Designated at 911 and 913 are decoders for providing a chip select signal to a buffer to be selected according to address from the CODEC side and control signals AE2 and AE3.

Operation of Structure Example 1

Writing into buffer 1

The CPU sets data in OE controller 916 to render AEO and DE0 active for selecting buffer 1. Image data (R, G, B, X) supplied in synchronism to pixel clock T is latched for each color in latch 905 and, since DEO is active, is supplied through buffer 906 to data bus 1. Meanwhiile, in address generation unit 1 900 a counter is operated under control of pixel clock T/4, and when 128 pixels are counted in Y direction, the upper address is increased by ripple-out. Further, if a margin value is set externally (fop instance from the CPU) in advance, off-set of counter 919 is brought about through latch 917. Thus, data is written in the buffer memory from a position deviated by the margin value in the printing direction. A margin thus is formed adjacent to the left edge of paper. The address generated in the above way is progressively increased from A0, and it is supplied through address bus 1 to buffer 1. Writing is done under control of $\overline{WE}$ signal.

Writing in buffer 2 and reading from buffer 1

Writing in buffer 2 is the same as writing in buffer 2 except for that $\overline{AE0}$ and $\overline{AE1}$, $\overline{DE0}$ and $\overline{DE1}$, address bus 1 and address bus 2, and data bus 1 and data bus 2 are different.

Reading from buffer 1 can be effected from the CODEC side as follows. For selecting buffer 1, the CPU sets data in latch 916 to render $\overline{AE2}$ and $\overline{DE2}$ active ("L"). Addresses A0 to A6 generated from the CODEC side are fixed, and address is progressively increased from A7. When addresses up to A19 are counted, A0 is increased. This address is supplied through address bus 1 to buffer 1 to be read out from the CODEC side data bus through buffer 914.

Writing in buffer 1 and reading from buffer 2

The writing in buffer 1 and reading from buffer 1 can be simultaneously performed by reversing buffers i and 2 in the above example and adequately controlling $\overline{AE}$ and $\overline{DE}$ signals.

Structure Example 2

FIG. 4-8-5 shows Structure example 2. Differences of this structure example from Structure example 1 will be described. In Structure example 2, buffers 920 and 921 are provided to the structure of Structure example 1, and inputs to buffers 920 and 910 are pulled up, thus forming a clear circuit.

Operation of Structure Example 2

The contents in buffer 1 are RGB data. If RGB data is "H", it represents white. Thus, when "H" is provided to the data bus for writing, nothing is printed on paper. Here, writing "H" is called clearing.

To clear buffer 1, when address is provided from address generation unit 1 or to address bus 1 from CODEC, that is, when $\overline{AE0}$="L" or $\overline{AE2}$="L", $\overline{DE4}$ is rendered active ("L") for writing. To clear buffer 2, when conversely $\overline{AE0}$="L" or $\overline{AE2}$="L", $\overline{DE5}$ is rendered active for writing. As a result, "H" is written in the designated address. Depending on the method of address generation, it is possible to provide margin portions adjacent to the opposite edges of paper by shuttle scan type address generation or provide a margin to a predetermined length from the top with raster scan type address generation.

Structure Example 3

FIG. 4-8-6 shows Structure example 3. In this example, circuits 922 to 926 are provided to the circuit of Structure example 2.

Designated at 922 and (24 are buffers, at 923 and 925 are decoders, and at 926 is an address generation unit 2 having an inner structure as shown in FIG. 4-8-7. Addresses generated from address generation unit 2 926 may be of shuttle scan type (successively increased from A0) or of raster scan type (A0 to A6 being fixed and A0 being counted after counting of A7 to A19). A difference from address generation unit 1 900 resides in that instead of driving of address generation unit 1 with T/4 pixel clock address generation unit 2 is driven by its own high speed clock.

Operation of Structure Example 3

Address generaetion unit 2 which is provided in this example generates address for initializing all the memory contents to "H".

For clearing buffer 1, address is generated by operating the counter with high speed clock. Writing is done under control of $\overline{WE}$ signal with $\overline{AE4}$ and $\overline{DE4}$ held active ("L").

Structure Example 4

FIG. 4-8-8 shows Structure example 4. In this example, color/monochrome selection circuit 917 is provided to the circuit shown in FIG. 4-8-3. For the remainder the structure is the same as the circuit shown in FIG. 4-8-3.

FIG. 4-8-9 shows the internal structure of circuit 917 shown in FIG. 4-8-8. The circuit of FIG. 4-8-9 permits selection of a variety of color designations from the CPU.

Operation of Structure Example 4

In operation, the CPU first determines a color r, g or b to be selected. When selecting g, for instance, the CPU sets "01". When the color/monochrome judgement circuits judges image to be monochrome, it provides a color/monochrome selection output of "1". As a result, the same color is provided to all the color data buses. Since g is selected in this case, data "g, g, g" is provided to the CODEC side. When color/monochrome judgement circuit judges data to be color data, "0" is set, and normal rgb data is provided to the CODEC data bus.

In this example, monochrome data is realized by selecting one of supplied color component signals and providing each selected component data as image data of a plurality of synthesis means.

In FIG. 4-8-9, designated at 1 to 6 are tri-state buffers, and at 7 is a 3-bit input decoder.

Block Buffer 2 (BB2)

Basic structure of BB2

BB2 can be thought to be basically the same as BB1 except for that writing and reading are performed in converse directions. However, the reading into the Multi-level processing unit is not done for a fixed number of Pixels, such as 128 or 256 pixels, but is done for 128+α pixels as shown in FIG. 4-9-1, thus producing an overlap at all time. Therefore, although only 128 pixels are necessary in consequence, the multi-level generation processing and printer require +αpixels as marginal pixels. Actually, therefore, reading as shown in 1, 2 and 3 is necessary on the reading side. In 1, only reading from buffer 1 is necessary. In 2, it is necessary to read data from buffers 1 and 2 consequtively. Thus, for simultaneously performing writing from the CODEC side at this time, a further buffer is necessary. For this reason, BB2 has a tri-stage buffer structure (FIG. 4-9-1).

For the remainder, the structure is the same as BB1.

Vertical/horizontal conversion function

Writing is done from the CODEC side, while reading is done into the multi-level generation processing unit. Therefore, the sequence order of pixels is different in writing and in reading. More specifically, writing is done in in X or main scanning direction, then address is increased in Y direction, and then reading is performed in X direction again. For reading, writing is done for 128 pixels in Y direction, then one address is increased in X or main scanning direction, and then writing is done for 128 pixels in Y direction.

Example

BB2 is the same as BB1 except for that writing and reading are done in converse directions and that it has a three-buffer structure, so its description is not given.

Multi-level Generation Section

Example 1

Multi-level generation is performed from a dot pattern in 3-by-3 window with reference to table.

Structure

FIG. 4-10-1 shows the structure. Designated at 1100 is a FIFO (1024 ×2 bits) used for line delay of image data. Circuits 1101 to 1104 constitute a latch train fop delaying image. Designated at 1105 is a ROM, and at 1106 a latch. The contents of the ROM have filtering as shown in FIG. 4-10-2 with some tables provided.

Operation

Binary image data is supplied to latch 1106 and FIFO 1100. The FIFO executes delay for one line, and data for a total of three lines is supplied to three-block latch train 1101 to 1104. Adjacent 3-by-3 (3×3) image data is taken out and provided as address to ROM 1105. As a result, 8-bit data is obtained. Further, the ROM has several tables, which can be switched over to one another according to a pattern SEL signal depending on a character mode, an intermediate tone mode and coexistence mode. Further, the tables are provided with a through mechanism of passing data without any processing.

Other Structure 1

In the above structure pixels of R, G, B and X ape stored point sequentially in FIFO 1100. However, by providing serial/parallel and parallel/serial conversion functions before and after the FIFO as shown in FIG. 4-10-3, only a single FIFO of 256×4×2, i.e., 256×8 bit type is necessary.

In this case, the FIFO shown in FIG. 4-10-1 is removed, and the circuit shown in FIG. 4-10-3 is provided instead. Binary data (BINARY DATA) R, G, B and X are first supplied point sequentially to serial/parrel conversion unit in synchronism to VCLK14 to be provided as parallel data.

This data is supplied to D10 to D13 and, after one line delay, is provided to D0 to D03 to be supplied to D14 to D17 for another line delay. That is, after delay for a total of two lines, the data is provided to D04 to D07.

At this time, reading and writing of image data R, G, B and X with respect to the FIFO are effected in synchronism to clock VCKL1 at ¼ the frequency.

In this way, data R, G, B and X delayed by one line and also data R, G, B and X delayed by two lines are supplied to parallel/serial conversion unit to be successively read out in synchronism to VCLK14 to obtain sesial point-sequential image data delayed by one line and also by two lines.

Further input bindary data BINARY DATA is delayed in timing control delay line by a clock portion corresponding to the delay in the serial/parallel and parallel/serial conversion units. In this way, point-sequential image data for the first to third lines are supplied to latch train 1102, 1103 and 1104 for multi-level generation processing.

Other Structure 2

FIG. 4-10-4 shows part of an example of structure for realizing ROM 1105 in the above example with a RAM. In this case, ROM 1105 is removed form the circuit of FIG. 4-10-1, Q0 to Q8 are coupled to selector SEL, and D input to D flip-flop is coupled to D output of the RAM. Either binary image data Q0 to Q8 or CPU address is selected by selector SEL to be provided as address of the RAM. In normal multi-level generation, Q0 to Q8 are selected by selector SEL, and multi-level recovery data is provided from the RAM.

Now, writing of multi-level recovery darta from CPU (not shown) in the RAM will be described.

Low 9 bits of address from the CPU are selected by selector SEL and supplied as address to the RAM. At the same time, CPU bus write signal CPUWR and chip select signal CS for selecting the RAM are supplied through a NAND gate to a select control line of selector SEL, a write enable tertminal of the RAM and buffer. Selector output is thus provided with selection of CPU address, and a write mode of the RAM is set. At the same time, the buffer is enabled, and CPU data is supplied to an input/output port of the RAM. Thus, writing of multi-level data is effected. The chip select signal CS, although not shown, is generated with decoding of upper bits of the CPU address.

Writing is thus done with respect to $2^9$ patterns of Q0 to QS. Thus, absolutely assured state of RAM is provided.

In addition, it will be obvious that in case when pattern SEL signal having been provided to ROM 1105 to RAM as in the first embodiment, writing may be done by using CPU address as such and with increased bits.

Example 2

Like Example 1, it is possible to set a window side of 5 by 5(5×5). In This case, however, 25 pixels are referred to. Therefore, it is impossible to form a table with a single memory. Accordingly, there are shown a structure, which uses product and sum calculation, and a structure, in which a table is constituted by several separate memories.

Structure, in which product and sum calculation is used

FIG. 4-10-5 shows a portion for shifting 5 by 5, i.e., 25, pixels. The structure is a mere expansion of a 3 by 3 structure. This can be commonly used for the structure using product and sum calculation and for the structure with a table constituted by several separate memories.

FIG. 4-10-6 shows the structure of a portion pertaining to the product. Each register can provide an output of the order of 4 bits. Its filter factor is written from CPU, and it provides "0" if and only if ST is "0" and provides a preset factor if ST is "1".

FIG. 4-10-7 shows the structure of a portion pertaining to the sum. This portion has an adder structure consisting of 24 adders and a divider.

Operation 25 pixels CLR11 to CLR55 taken out in shift section are supplied to ST terminal of each register in the portion pertaining to product. In each register of the portion pertaining to product, a factor is set from the CPU. Registers REG11 to REG55 provide the value of the factor if CLR11 to CLR55 are "H" and provide "0" if CLR11 to CLR55 are "L".

The portion pertaining to the sum subsequently takes the sum of all the register outputs, and the sum is divided by the divider for dynamic range adjustment.

If the transmission image can be identified to be intermediate tone image or character image according to an instruction from the operation panel or as a result of negotiation at the start of communication, the window size may accordingly be set to 3 by 3 by changing the values in the registers in the portion pertaining to product from the CPU. More specifically, the factors in the 5 by 5 matrix other than the factors in the center 3 by 3 matrix are set to "0", the tvalue of the divider is changed accordingly. FIG. 4-10-8 shows an example of mattic factors.

Structure, in which table consists of several separate memories

FIG. 4-10-9 shows the structure, in which the table consists of several separate memories. In this structure, 25 data bits of CLR11 to CLRS5 from the shift portion of FIG. 4-10-5 are divided into a group of 8 bits of CLR11 to CLR23, a group of 8 bits of CLR24 to CLR41 and a group of 9 bits of CLR42 to CLR55. These groups are provided as addresses of memories constituting table, and they are added together, followed by dyanmic range adjustment to obtain multi-level image data.

Again with this strucure it is possible to set the window size to 3 by 3 or 5 by 5 by switching the table according to table SEL signal.

Color/monochrome Judgement Section

Example 1

This section judges whether input image image is a color image or a monochrome image from X, Y and X values obtained from the input image. With a monochrome image, the values of X, Y and Z are comaratively less different. Accordingly, a judgement of monochrome is given if the difference is within threshold value $\alpha$.

Structure

FIG. 4-11-1 shows the structure.

Designated at 1200 is a subtraction unit for calculating $\lambda = X-Y$, $\mu = Y-Z$ and $\nu = Z-X$ from X, Y and Z. FIG. 4-11-2 shows an example of detailed structure. In FIG. 4-11-2, designated at INV are inversion circuits. Designated at 1201 is an absolute value calculation unit. FIGS. 4-11-3A and 4-11-3B show respective examples of the circuit structure of this unit. (More accurately, with the circuits of FIGS. 4-11-3A and 4-11-3B it is necessary to add "1" afterwards. However, these circuits may be used in this example.) Designated at 1202 is a selectorat 1203 is a comparator for comparing the selector output and threshold value $\alpha$, at 1204 a comparator for comparing three outupts from the absolute value calculation unit and selecting the greatest output, at 1205 is a color judgement signal line, at 1206 a counter, at 1207 a comparator, and at 1208 a color original judgement signal line.

Operation $\lambda = X-Y$, $\mu = Y-Z$ and $\nu = Z-X$ are calculated with sign from X, Y and Z given by subtraction unit 1200. Further, their absolute values are obtained, and according to a code (such as 2-bit code as shown) representing the greatest value among $|\lambda|$, $|\mu|$ and $|\nu|$ the greatest one of the differences of X, Y and Y with respect to one another is obtained from selector 1202. The result is compared to preset threshold value $\alpha$ in comparator 1203. If the threshold value is exceeded, color judgement signal 1205 is provided.

Counter 1206 counts the number of times of delivery of color judgement signal 1205. The number is compared to threshold value $\beta$ in comparator 1207. If the number exceeds threshold value $\beta$, color original judgement singal 1208 is inveerted to "1", which represents judgement of a color original.

Example 2

$a^*$ and $b^*$ among $L^*$, $a^*$ and $b^*$ (luminance and chromsticity) are obtained from data X, Y and Z obtained from input image, and if the sum of their squares exceeds a preset threshold value, a color judgement signal is provided.

Structure

FIG. 4-11-4 shows the structure

Designated at 1200 is a conversion unit for obtaining $a^*$ and $b^*$ from XYZ data through conversion after equation (4-11-1). As internal structure may be used a structure based on the RGB/RGB conversion table shown in FIG. 4-3-1 (for instance Structure example 3 shown in FIG. 4-3-3 or Structure example 4 shown in FIG. 4-3-4). Designated at 1210 and 1211 are multipliers, at 1212 is an adder, and at 1213 is a comparator. Designated at 1214 is a color judgement signal line, at 1215 is a counter, at 1216 is a comparator, and at 1217 is a color original judgement signal line. $a^*$ and $b^*$ are given as $$\begin{aligned} a^* &= 500\left[\left(\frac{X}{X_0}\right)^{1/3} - \left(\frac{Y}{Y_0}\right)^{1/3}\right] \\ b^* &= 200\left[\left(\frac{Y}{Y_0}\right)^{1/3} - \left(\frac{Z}{Z_0}\right)^{1/3}\right] \end{aligned} \quad (4\text{-}11\text{-}1)$$

where $X_0$, $Y_0$ and $Z_0$ are, with standard light C,
$X_0 = 98.072$
$Y_0 = 100.00$
$Z_0 = 118.225$

Operation

Unit 1209 obtaines $a^*$ and $b^*$ from input XYZ data after equation (4-11-1). Multipliers 1210 and 1211 calculate $(a^*)^2$ and $(b^*)^2$, respectively. Adder 1212 takes the sum of the results, and comparator 1213 compares the sum to preset threshold value $\alpha$. If the threshold value is exceeded, color judgement signal 1214 is provided.

Counter 1215 counts the number of times of delivery of color judgement signal 1214, and comparator 1216 compares the number to threshold value $\beta$. If the number exsceeds threshold value, color original judgement signal 1217 is inverted to "1", which is a judgement that original is a color original.

RGB (scanner)/XYZ conversion section

RGB (scanner)/XYZ conversion section has the same structure as the RGB (scanner)/RGB (NTSC) conversion section. However, the factor of the conversion equation is different, and this value varies with the scanner under consideration.

(XYZ/RGB (NTSC) conversion section)

This part of circuit is the same in structure as the RGB (scanner)/RGB (NTSC) conversion section. The conversion in this case, however, is executed after equation (4-13-1). (However, this applies to a case when reference white is standard light C and the luminance of basic excitation is 1 with R=G=B=1.

$R = 1.9106X - 0.5326Y - 0.2883Z$ $G = -0.9843X + 1.9984Y - 0.0283Z$ $B = 0.0584X - 0.1185Y + 0.8985Z$

Printer Section

FIG. 4-12-1 shows the printer section. As shown, the section includes a log conversion unit, a black generation unit, a masking conversion unit, a gamma conversion unit and a color printter, these elements being connected through scanner/printer interface 200. The individual units will now be described.

Log Conversion Unit

This unit performs logarithmic conversion of NTSC standard luminance RGB data supplied from the image processing unit to density YMCK data after equations $$C = \frac{255}{Dmax} \log_{10} \frac{R_{NTSC}}{255} \quad (4\text{-}13\text{-}1)$$
$$M = \frac{255}{Dmax} \log_{10} \frac{G_{NTSC}}{255}$$
$$Y = \frac{255}{Dmax} \log_{10} \frac{B_{NTSC}}{255}$$

where Dmax is a density value of the darkest portion which can be expressed in print. Here, 8-bit data for each of R, G and B is passed through look-up table for conversion. LUT is a quantization of these equations to 0 to 225. The structure of the LUT is similar to the structure of the gamma conversion unit in the image processing unit, and its description is not given.

Black Generation Unit

Minimum density data among density YMC data supplied from the log conversion unit, and its value is set as black K.

FIG. 4-12-2 shows the structure of the unit. Comparator COM compares the magnitudes of data Y and M, and comparator COMP compares the smaller one of these data and remaining data C. Decoder determines the smallest one of data Y, M and C, and this color is provided as data of black K from one of gates Y, M and C.

Masking Conversion Unit

Y, M and C supplied from the log conversion unit and K supplied from the black generaetlon unit are converted to Y', M', C' and K' matched to the printer. This conversion can be expressed by a mattic operation similar to the operation in the RGB/RGB conversion section, for instance as given by an equation $$\begin{pmatrix} Y' \\ M' \\ C' \\ K' \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} Y \\ M \\ C \\ K \end{pmatrix} \quad (4\text{-}13\text{-}2)$$

Factors $\alpha_{ij}$ can be obtained experimentarily, but description of any method to this end is not given here.

In addition, the circuit structure is similar to the RGB/RGB conversion section and is not described.

Operation

CPU 100 shown in FIG. 2-2 checks on the bais of communication protocol whether received data is in color mode. If the data is in the color mode, YMCK data is converted to those conforming to the color characteristics of the printer.

If it is found after communication protocol that the received data is in a monochrome mode, there are cases of encoding by MMR and encoding by MM2.

For example, when monochrome data is held only in data Y among YMCK data and data M, C and K are 0, the conversion is done as $$\begin{pmatrix} Y' \\ M' \\ C' \\ K' \end{pmatrix} = \begin{pmatrix} 0 & 0 & 0 & 0 \\ 0 & 0 & 0 & 0 \\ 0 & 0 & 0 & 0 \\ 1 & 0 & 0 & 0 \end{pmatrix} \begin{pmatrix} Y \\ M \\ C \\ K \end{pmatrix} \quad (4\text{-}13\text{-}3)$$

If monochrome data is held in all of data Y, M and C in YMCK data, K is set to 0 by the black generation unit. At this time, entirely the same matrix is used.

Gamma Conversion Unit

This conversion uses 8-bit conversion tables corresponding to Y, M, C and K $$Y'' = f(Y')$$

$$M'' = f(M')$$

$$C'' = f(C')$$

$$K'' = f(K')$$

Structure Example

Since the conversion is similar to that in the gamma conversion unit in the image processing section, a structure similar to the gamma conversion unit in the image processing section can be used, and its description is not given.

Binarization Unit

This unit performs binarization for each color of Y", M", C" and K".

Structure Example

Since the processing is similar to that in the binarization unit in the image processing section, a structure similar to the binarization unit in the image processing section, and its description is not given.

As has been shown, in this embodiment at the time of memory copy the RGB (scanner)/RGB (NTSC) conversion circuit is bypassed, and masking parameter in the color processing circuit in the scanner is set for copy. Thus, there is no need of plural times of scanning corresponding in number to the number of copies, and the image quality is such free from deterioration to an extent that there is no wasteful operation of RGB standardization.

According to this embodiment, copy operation can be performed without deteriorating the image quality, and in a case of data transmission standard data can be transmitted.

As has been shown, according to the invention with the image reading section constructed by using a line sensor covering the shuttle width of shuttle scan, it is possible to reduce the size of the image reading section a long close-contact-with-original sensor or a staggered arrangement sensor or a line sensor for scale-reducing optical system. Besides, it is possible to increase the resolution and cope with application of color filters to sensor highly accurately and with small filter size.

Other Modifications

In the above embodiment after reading image by shuttle scan the data is binarized and converted to raster form data before compression. However, where in case where the image receiving side provides image in the shuttle scan system, that is, in case where the head is short and it is inevitable to have resort to the shuttle scan as in a BJ printer, it is possible to dispense with a portion for conversion to the raster form without any problem in transmission of data after compression.

Further, it is possible to transmit image without binarization, i.e., transmit multi-level image data.

Further, it is possible to vary the scan width of the shuttle scan to be one pixel, 64 pixels, 256 pixels and so forth.

Further, overlap reading of the same image area may be readily done at the time of the shuttle scan.

In the above embodiment, a shuttle/raster conversion unit and a raster/shuttle conversion unit are provided before compression unit and after expansion unit, respectively. Such conversions are performed with respect to binary image data. Thus, image processing other than the compression and expansion may be performed with respect to shuttle scan form data. Further, the vertical/horizontal conversion in shuttle raster is performed with respect to multi-level data, and therefore in this case only one-eigth of memory in case of performing the conversion with respect to multi-level data is necessary.

As has been shown, with the above embodiment by adopting the shuttle scan system for image processing in the scanner and printer it is possible to reduce size of the scanner sensor and printer head, and further it is possible to use small size buffer for the individual image processings. Further, with conversion between raster and shuttle performed before the compression and after the expansion in the form of binary data, the memory for conversion may be small compared to the case of multi-level data. Further, image processing other than the compression and expansion can be performed with respect to shuttle scan form data. It is thus possible to provide a small scale system as a whole.

As has been described in the foregoing, it is possible to provide a communication apparatus, which permits scale reduction of system and has versatility with respect to standard communication system.

In addition, data read out in the shuttle scan system can be scan converted after matching to the color characteristics of the communication line and convertion to n-level data. Thus, versatility of communication can be obtained even with a small reading section.

With the above embodiment, RGB data of color image is received, and printed out after color correction with respect to color characteristics of the color printer.

Further, when monochrome data of YO0 or YYY (Y being luminance data here) is received instead of RGB data, printing in perfect black can be obtained.

Further, the above embodiment has the following effects.

1 It is only necessary to change a parameter of the masking circuit.

2 It is possible to process color data and monochrome data at the same timing.

As shown, with the above embodiment received image data is dealt with as single color data if it is judged by communication protocol that the received data is single color data. It is thus possible to eliminate the possibility of generation of false color by multi-level generation means or color conversion means.

Further, with the above embodiment the flow of data is the same in the color mode and in the monochrome mode.

For example, where 8-bit data for each of R, G and B is passed at the time of color data, at the time of mnochrome data 8-bit data is passed for Y, Y and Y (Y≈0.3R+0.6G+0.1B in the above embodiment) or Y, O and O.

Thus, with the above embodiment data can be passed at the same timing irrespective of whether data is color or monochrome. Besides, no circuit alteration is needed.

Further, since in the above embodiment data is transmitted as Y, Y and Y or Y, O and O, same value data can be passed by using a compression systemusing entropy encoding or variable length compression coding for a subsequent stage compression processing circuit, thus permitting compression factor increase and reducton of transmision time. The transmission time thus need not be changed so much compared to the case of transmitting single color data alone.

With the above embodiment data can be processed without greatly changing the circuit system in the single color mode and color mode.

Further, the above embodiment can communicate with a fascimile network, in which color facsimile network and monochrome facsimile network are coexistent.

Further, since the circuit for conversion to monochrome uses part of the receiving side circuit, the circuit for common use can be increased, which is advantageous cost-wise as well.

As has been described in the foregoing, according to the invention it is possible to obtain further improvement of data compression efficiency when transmitting single color image as well.

We claim:

1. An image communication apparatus comprising:

multi-level generation means for generating multi-level data from image data received in accordance with a communication protocol that determines a communication mode;

color processing means for performing color processing on said multi-level data using a given processing parameter; and setting means for setting the processing parameter for causing said color processing means to process said multi-level data as monochrome data.

2. The image communicaiton apparatus according to claim 1, wherein said received image data consists of binary bits each for each pixel.

3. The image communication apparatus according to claim 1, wherein said color processing means is color masking processing means.

4. The image communicaiton apparatus according to claim 1, wherein said received image data is compressed image data, and which further comprises:

expansion means for expanding said compressed image data.

5. The image communicaiton apparatus according to claim 1, which further comprises:

a printer for printing said single color data.

6. An image communication apparatus comprising:

means for transmitting multi-level color image data as multi-level data of a plurality of separate color components;

setting means for setting a single color transmission mode; and control means for converting multi-level data other than a particular color component data of said color image data to have a predetermined value according to the setting of said single color mode by said setting means.

7. The image communication apparatus according to claim 6, wherein said color data are RGB data.

8. The image communication apparatus according to claim 6, wherein said single color transmission mode is a monochrome mode.

9. The image communication apparatus according to claim 6, wherein said predetermined value is "0" data.

10. The image communication apparatus according to claim 6, wherein said setting means sets said single color mode according to an operator's operation.

11. A color image communication method comprising the steps of:
    making a first judgment which is whether an original image to be transmitted is a single color image or a multi-color image;
    making a second judgment which is whether the destination is a multi-color receiver or a single color receiver; and
    transmitting data in compression systems of mutually different compression efficiency depending on said first judgement and said second judgement when the destination is a multi-color receiver and the original image to be transmitted is a single color image without transmitting the multi-color image and when the destination is a single color receiver and the original image to be transmitted is a single color image.

12. The color image communication method according to claim 11, wherein said single color image is a monochrome image.

13. The color image communication method according to claim 11, wherein the second judgement is effected in a procedure after a protocol with the destination.

14. The color image communication method according to claim 11, wherein MMR encoding is effected in a case when the destination is a single color receiver.

15. The color image communication method according to claim 11, wherein whether said original image to be transmitted is a single color image or a multi-color image is judged from a color hue of said original image.

16. A color image communication apparatus having a single color transmitter function comprising:
    storing means for storing color image data to be transmitted;
    reading means for reading out the color image data from said storing means;
    converting means for converting the color image data read out by said reading means into a single color image data; and
    compression means for performing data compression in different processes when transmitting the single color image data without transmitting multi-color image data converted by said converting means to a color receiver and when transmitting the single color image data converted by said converting means to a single color receiver.

17. The color image communication apparatus according to claim 16, wherein said single color image data is monochrome image data.

18. The color image communication apparatus according to claim 16, wherein said single color receiver conforms to G4 standards.

19. The color image communication apparaus according to claim 16, wherein said compression means performs MMR encoding when transmitting data to said single color receiver.

20. The color image communication apparatus according to claim 16, which further comprises:
    means for generating said single color image data and color image data.

21. The color image communication apparatus according to claim 20, wherein said generating means is image pick-up means 22. A color image communication apparatus having a single color transmitter function, comprising:
    inputting means for inputting color image data to be transmitted;
    converting means for converting the color image data input by said inputting means into single-color image data; and
    compression means for performing data compression in different processes when transmitting the single-color image data without transmitting multi-color image data converted by said converting means to a color receiver and when transmitting the single-color image data converted by said converting means to a single-color receiver.

23. An apparatus according to claim 22, wherein the single-color image data is monochrome image data.

24. An apparatus according to claim 22, wherein the single-color receiver conforms to G4 standards.

25. An apparatus according to claim 22, wherein said cdmpression means performs MMR encoding when transmitting data to the single-color receiver.

26. An apparatus according to claim 22, wherein said input means includes means for generating the single-color image data and color image data.

27. An apparatus according to claim 26, wherein said generating means comprises image pick-up means.

* * * * *

UNITED STATES PATENT AND TRADEMARK OFFICE
CERTIFICATE OF CORRECTION

PATENT NO. : 5,483,358

DATED : January 9, 1996

INVENTOR(S): SUSUMU SUGIURA ET AL.

It is certified that error appears in the above-identified patent and that said Letters Patent is hereby corrected as shown below:

COLUMN 7

Line 1, "Shattle" should read --Shuttle--.

COLUMN 8

Line 40, "multiplification" should read --multiplication--.

COLUMN 10

Line 35, "buffer 210." should read --buffer 211.--.
    Line 57, "interface 209" should read --interface 210--.
    Line 58, "buffer 210." should read --buffer 211.--.
    Line 60, "section 211" should read --section 212--.

COLUMN 11

Line 49, "NNTSC" should read --NTSC-- and "and G" should read --and B--.
    Line 51, "(step Data" should read --(step S7). Data--.
    Line 52, "gammer" should read --gamma--.
    Line 65, "converted to" should read --converted--.

UNITED STATES PATENT AND TRADEMARK OFFICE
CERTIFICATE OF CORRECTION

PATENT NO. : 5,483,358

DATED : January 9, 1996

INVENTOR(S): SUSUMU SUGIURA ET AL.

It is certified that error appears in the above-identified patent and that said Letters Patent is hereby corrected as shown below:

COLUMN 12

Line 39, "2 $\bar{2}$09." should read --209.--.

COLUMN 14

Line 62, "↑" should read --①--.
    Line 66, "2" should read --②--.

COLUMN 16

Line 15, "pather's" should read --partner's--.
    Line 25, "recoverey" should read --recovery-- and "(step S21)." should read --(step S23).--.
    Line 46, "FIG. 3-11." should read --FIG. 3-10.--.
    Line 52, "FIG. 4-2-1" should read --FIG. 4-1-2--.

COLUMN 19

Line 37, "403," should read --408,--.
    Line 38, "to 409" should read --to 405--.
    Line 39, "506" should read --406--.
    Line 65, "and are" should read --and 423 are--.
    Line 66, "428" (second occurrende) should read --429--.

UNITED STATES PATENT AND TRADEMARK OFFICE
CERTIFICATE OF CORRECTION

PATENT NO. : 5,483,358

DATED : January 9, 1996

INVENTOR(S) : SUSUMU SUGIURA ET AL.

It is certified that error appears in the above-identified patent and that said Letters Patent is hereby corrected as shown below:

COLUMN 20

Line 28, "$2_{15}$x8 bits)." should read --$2^{15}$x8 bits).--.

COLUMN 22

Line 27, "L1≈5" should read --L1>>5--.
    Line 32, "L2=~~(166D)~~" should read
    --LZ=16-L1                    (4-6-9)--.

COLUMN 25

Line 53, "leading" should read --reading--.
    Line 67, "RM" should read --RAM--.

COLUMN 26

Line 60, "buffer 2" (second occurrence)
        should read --buffer 1--.

COLUMN 27

Line 8, "buffers i" should read --buffers 1--.
    Line 18, "910" should read --921--.
    Line 43, "(24" should read --924--.

UNITED STATES PATENT AND TRADEMARK OFFICE
CERTIFICATE OF CORRECTION

PATENT NO. : 5,483,358

DATED : January 9, 1996

INVENTOR(S) : SUSUMU SUGIURA ET AL.

It is certified that error appears in the above-identified patent and that said Letters Patent is hereby corrected as shown below:

COLUMN 28

Line 36, "1, 2 and 3" should read --①, ② and ③--.
Line 37, "↑," should read --①,--.
Line 38, "2," should read --②,--.

COLUMN 29

Line 25, "ape" should read --are--.
Line 46, "sesial" should read --serial--.
Line 48, "bindary" should read --binary--.

COLUMN 30

Line 16, "QS." should read --Q8.--.
Line 67, "mattic" should read --matrix--.

COLUMN 31

Line 5, "CLRS5" should read --CLR55--.
Line 23, "X values" should read --Z values--.
Line 57, "and Y" should read --and Z-.

COLUMN 32

Line 3, "chromsticity)" should read --chromaticity)--.

UNITED STATES PATENT AND TRADEMARK OFFICE
CERTIFICATE OF CORRECTION

PATENT NO. : 5,483,358

DATED : January 9, 1996

INVENTOR(S): SUSUMU SUGIURA ET AL.

It is certified that error appears in the above-identified patent and that said Letters Patent is hereby corrected as shown below:

COLUMN 33

Line 63, "bais" should read --basis--.

COLUMN 35

Line 54, "luminanee" should read --luminance--.
    Line 57, "↑" should read --①--.
    Line 59, "2" should read --②--.

COLUMN 36

Line 45, "communicaiton" should read --communication--.
    Line 51, "communicaiton" should read --communication--.
    Line 56, "communicaiton" should read --communication--.

COLUMN 37

Lie 2, "mode" should read --transmission mode--.

UNITED STATES PATENT AND TRADEMARK OFFICE
CERTIFICATE OF CORRECTION

PATENT NO. : 5,483,358

DATED : January 9, 1996

INVENTOR(S) : SUSUMU SUGIURA ET AL.

It is certified that error appears in the above-identified patent and that said Letters Patent is hereby corrected as shown below:

COLUMN 38

Line 43, "cdmpression" should read --compression--.

Signed and Sealed this

Sixth Day of August, 1996

Attest:

BRUCE LEHMAN

Attesting Officer      Commissioner of Patents and Trademarks